US012632018B1

(12) United States Patent
Barham et al.

(10) Patent No.: US 12,632,018 B1
(45) Date of Patent: May 19, 2026

(54) SYSTEMS AND METHODS FOR MONITORING AND CONTROL OF ENERGY CONSUMPTION FOR A STRUCTURE

(71) Applicant: Community Energy Labs, Portland, OR (US)

(72) Inventors: Tanya Barham, Portland, OR (US); Jennifer Worrall, Portland, OR (US)

(73) Assignee: Community Energy Labs, Portland, OR (US)

( * ) Notice: Subject to any disclaimer, the term of this patent is extended or adjusted under 35 U.S.C. 154(b) by 427 days.

(21) Appl. No.: 18/206,297

(22) Filed: Jun. 6, 2023

Related U.S. Application Data

(60) Provisional application No. 63/349,781, filed on Jun. 7, 2022.

(51) Int. Cl.
| | |
|---|---|
| *F24F 11/64* | (2018.01) |
| *F24F 11/46* | (2018.01) |
| *G05B 13/04* | (2006.01) |

(52) U.S. Cl.
CPC ............ *G05B 13/042* (2013.01); *F24F 11/46* (2018.01); *F24F 11/64* (2018.01)

(58) Field of Classification Search
CPC .......... G05B 13/042; F24F 11/46; F24F 11/64
See application file for complete search history.

(56) References Cited

U.S. PATENT DOCUMENTS

| | | | | |
|---|---|---|---|---|
| 11,783,203 | B2 * | 10/2023 | Camilus ................. | G06F 30/13 |
| | | | | 700/291 |
| 2015/0167996 | A1 * | 6/2015 | Fadell ...................... | F24F 11/64 |
| | | | | 700/276 |
| 2017/0300599 | A1 * | 10/2017 | Becerik-Gerber ...... | G06F 30/13 |
| 2020/0151836 | A1 * | 5/2020 | Lingras ................ | G06Q 50/163 |

OTHER PUBLICATIONS

Gunay, H. Burak, et al. "Sensitivity analysis and optimization of building operations." Energy and Buildings 199 (2019): 164-175. (Year: 2019).*

Ioannou, Andri, and Laure CM Itard. "Energy performance and comfort in residential buildings: Sensitivity for building parameters and occupancy." Energy and Buildings 92 (2015): 216-233. (Year: 2015).*

Eisenhower, Bryan, et al. "Uncertainty and sensitivity decomposition of building energy models." Journal of Building Performance Simulation 5.3 (2012): 171-184 (Year: 2012).*

* cited by examiner

*Primary Examiner* — Christopher E. Everett
(74) *Attorney, Agent, or Firm* — FisherBroyles, LLP; Alan D. Minsk

(57) ABSTRACT
Systems, apparatuses, and methods of data collection for more efficiently configuring and calibrating a building energy management service, particularly for a small to medium sized building. In some embodiments, the disclosed approach significantly reduces the time, cost, and level of expertise needed to collect data and configure a model of energy consumption.

20 Claims, 40 Drawing Sheets

Human or Computer

Data Store

*Human or Computer*

*Object and Attributes Stored in Metadata Graph Database*

SYSTEMS AND METHODS FOR MONITORING AND CONTROL OF ENERGY CONSUMPTION FOR A STRUCTURE

CROSS REFERENCE TO RELATED APPLICATION

This application claims the benefit of U.S. Provisional Application No. 63/349,781, filed Jun. 7, 2022, and titled "Systems and Methods for Efficient Data Collection", the contents of which is incorporated in its entirety (including the Appendices) by this reference.

BACKGROUND

There is a continued effort to improve management of the energy consumption of buildings and structures. This effort is partially in response to climate change but is also a reflection of a broader effort to conserve resources, reduce energy expenditures, and more efficiently introduce alternative energy sources to the electric grid. In the past few years, the buildings sector alone accounted for 30% of the global energy consumption (primarily driven by heating and cooling applications) and 27% of total energy sector emissions[1]. This makes investing in building energy management an opportunity to provide a significant decrease in energy costs and carbon emissions. However, because heating and cooling applications drive most energy use, advanced building energy management requires complex measurement, processes, and models to effectively balance energy reduction with occupant comfort. For example, a school without air conditioning might use less energy, but few parents would be happy about letting their children take an exam in 100-degree weather.

[1] Chiara Delmastro et al., Buildings Sectorial overview, International Energy Agency, September 2022.

The complexity of managing energy usage for buildings has encouraged the development of automated systems for more effectively and efficiently managing the energy consumption of a building. One such advanced application is a model predictive controller (MPC). MPC is a control algorithm that uses a mathematical model of a system to predict its future behavior and make optimal control decisions. By considering future states and constraints, MPC can handle complex dynamics and account for system limitations, enabling it to make proactive decisions for optimal control in a wide range of applications, such as process control, robotics, autonomous vehicles and building energy management.

A key aspect to implementing an MPC to manage the energy consumption of a building is the configuration of an energy control model. When an energy control model is integrated into an MPC it produces energy savings up to 28% beyond state of the art proportional-integral-derivative or rule-based control architectures without negatively impacting comfort. MPC can also more flexibly respond to dynamic signals such as emerging time of use utility prices and carbon or grid signals.[2],[3] MPC approaches depend on mathematically derived building energy models for prediction; however, generating building energy models typically requires vast amounts of data collection as buildings typically have multiple units, each with different properties, sizes, and access to sources of heating and cooling.

[2] Drgoha, Ján, et al. "All You Need to Know about Model Predictive Control for Buildings." Annual Reviews in Control, vol. 50, 2020, pp. 190-232., doi:10.1016/j.arcontrol.2020.09.001.

[3] Privara, Samuel, et al. "Building Modeling as a Crucial Part for Building Predictive Control." Energy and Buildings, vol. 56, 2013, pp. 8-22., doi: 10.1016/j.enbuild.2012.10.024.

According to Blum et al.[4], setup and calibration of the model used for solving the optimal energy control problem "could take 70-75% of the implementation effort." The configuration process may involve setting parameters, such as building or unit volume, thermal properties, airflow within and between units, or desired temperature ranges within a unit, as non-limiting examples. Configuring a system may also involve setting initial values for measurable quantities, such as temperature, humidity, and airflow within a unit or group of units, as examples. Additionally, data representing the building's physical and structural characteristics, and static or time-varying factors that may impact heating and cooling (and hence both comfort and energy usage) may need to be collected and evaluated.

[4] Blum, D. H., et al. "Practical Factors of Envelope Model Setup and Their Effects on the Performance of Model Predictive Control for Building Heating, Ventilating, and Air Conditioning Systems." Applied Energy, vol. 236, 2019, pp. 410-425.

The inventors have recognized that part of the process (i.e., data collection and system configuration necessary for an energy control model to function) has proven to be complicated and resource intensive. This is unsustainable, particularly for small and mid-sized commercial building customers with limited staffing and may result in difficulty in implementing advanced energy management systems, and/or discourages their adoption.

Moreover, small to medium size buildings such as schools and other municipal commercial buildings may make up 21% of the total energy usage in the US.[5] The inventors have recognized that these building operators often lack the budget or staff to install or maintain expensive control software to connect with the grid, integrate renewable sources of energy, and maximize the value of local energy sources, such as solar or wind, while simultaneously keeping occupants comfortable.

Embodiments of the systems and methods described herein are directed to solving these and related problems individually and collectively.

[5] "U.S. Energy Information Administration—EIA—Independent Statistics and Analysis." Energy Information Administration (EIA)—Commercial Buildings Energy Consumption.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As mentioned, a difficulty in applying advanced building energy management technologies to small and medium sized buildings in the commercial, municipal, university and school building markets is the amount of work required to collect the static and time-varying data needed to configure and commission an energy control model. For a large corporate building, such work is only a small fraction of the total cost of the system, but for smaller buildings it can be a significant time sink and expense. A further difficulty with conventional approaches is the inability to provide sufficiently accurate values for use in models or simulations of the energy usage of a building or set of offices, rooms, or buildings. The models or simulations are used to generate "optimal" decisions regarding energy management, user comfort, and cost, and this is not possible or reliable in the absence of reasonably accurate values for the parameters and inputs into the models or simulations.

In contrast, an embodiment of the disclosed process flow provides a relatively fast and affordable data collection and configuration approach for an energy control model for a small to medium sized building. The disclosed process may significantly reduce a building operator's effort (e.g., from 30-80 hours of effort to 3-8 hours), saving time, labor and cost compared to conventional approaches to data collection and model configuration, without impacting the quality of the data or comfort of the building's occupants. This time and cost savings increases incentives to adopt an advanced energy control system by reducing or eliminating many of the factors currently discouraging adoption, such as costs, skills, and data accuracy as examples.

Embodiments of the disclosure are directed to systems, apparatuses, and methods of data collection for more efficiently collecting data and configuring a building energy control model or service, particularly for a small to medium sized building. In some embodiments, the disclosed system and methods of data collection may be performed in accordance with the following process flow (as illustrated in FIG. 1(a)):

STAGE 1—Initial Data Collection: A first step or stage is to gather contact information for people who can provide data on the site/building based on a predefined Document Checklist. The checklist may include, site location and structure types, building mechanical, electrical and elevation drawings as non-limiting examples (as illustrated in FIGS. 1(b) and 2). As described further herein, the backend of the disclosed system (as described in the metadata and inputs sections herein) enables either a human or a computer to upload the collected information, and for the information to be used to in stage 2 determine an initial reference model for purposes of automation or control of energy and comfort;

STAGE 2—Identify Initial Set of Parameters: As described further herein, the backend of the disclosed system enables either a human or a computer to identify an appropriate ASHRAE (American Society of Heating, Refrigerating and Air-Conditioning Engineers) building reference model and an initial set of parameters required to generate an energy control model for the structure (as illustrated in FIGS. 1(b) and 1(c)). An ASHRAE building reference model is a standardized framework that represents typical buildings and serves as a benchmark for an energy performance analysis. It includes key parameters such as building geometry, systems, and usage patterns, and enables comparisons and simulations to optimize energy efficiency and design;

Data collection requirements for the initial set of parameters are translated into one or more Data Collection Workflows that can be carried out by a computer, and/or by a human Data Collector using flow charts and checklists, automated spreadsheets, or custom web interfaces, as non-limiting examples (as illustrated in FIG. 1(d)). Each workflow collects start and end timestamps and cost (whether in processing cost for a computer or in an hourly rate for a classification of worker) for each process step—generating a time, cost and duration estimate for each Data Collection Workflow;

STAGE 3—Reduce Set of Data Parameters: One or more of the following steps or stages may be used to reduce the initial set of parameters to be collected, and thus the time and cost to collect, store, transform and use the collected data for setup and calibration of an energy control model:

Requirements for a minimum set of parameters for configuring an energy control model may be developed via parameter sensitivity analysis in concert with applied learnings from actual data (see FIGS. 7 and 3) or carried out by a computer and building energy simulation software, APIs and code (as is illustrated in FIG. 3, "Building Energy Monitoring"). For example, an initial set of possible parameters may be reduced by evaluating the impact on calculations and system outputs using a sensitivity analysis that examines, for every parameter removed, whether or not the model can meet a predetermined accuracy threshold for prediction of indoor air temperature (comfort) or energy, as examples (as illustrated in FIG. 1(e));

STAGE 4—Generate Simplified Workflow for Data Collector: For each of the reduced set of parameters a human or computer selects the Data Collection Workflow with the minimum time/cost for collecting values/variables necessary to generate an energy control model. As disclosed and/or described further herein, the backend of the disclosed system enables either a human or a computer to input values into the reduced set of parameters for use by an energy control model without significant (if any) further transformation. The data collection "system" may be automated spreadsheets, custom web interfaces or customer relation management systems, as non-limiting examples (as illustrated in FIGS. 1(e) and 1 (f);

For those Data Collection Workflows that require a field visit or sensor installation, a Site Visit is conducted using a guided workflow focused on collecting site data at the structure in accordance with a site Data Collection Workflow and verifying values/variables for the reduced set of parameters identified prior to the Site Visit. Based on the data collection requirements for any of the remaining set of parameters, a human or computer generates a simplified Data Collection Workflow by retrieving site details (including (if applicable) user notes, and uploaded documents such as mechanical or electrical drawings, as examples) and generating a guided Data Collection Workflow for the remaining parameters (as illustrated in FIG. 1(g));

STAGE 5—Generate Inputs and Configuration Settings for an Energy Model: A final step in some embodiments is collection of additional field data or installation at the site of one or more sensors (if desired data is not already available through internet connected thermostats and/or energy meters, as examples), and gateway devices to connect the building to the building energy management service which is typically being provided through a cloud data center (such as a SaaS or multi-tenant platform). The devices are configured using the data collection points and setpoints determined in the Data Collection Workflow for the Data Collector. The installers commission (deploy, activate) the gateway devices, sensors, and data loggers, and connect them over the Internet into the building energy management service. Field site data is stored in a database for use by the energy control model for the structure (as illustrated in FIGS. 1(f), 1(g), and 1(h)).

In one embodiment, the disclosed system may include one or more non-transitory computer-readable media including a set of computer-executable instructions and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to one or more non-transitory computer-readable media including a set of computer-executable instructions, wherein when the set of instructions are executed by an electronic processor or co-processors, the processor or co-processors (or a device or apparatus of which they are part) perform a set of operations that implement an embodiment of the disclosed method or methods.

In some embodiments, the systems and methods disclosed and/or described herein may provide services through a SaaS or multi-tenant platform. The platform provides access to multiple entities, each with a separate account and associated data storage. Each account may correspond to a user, set of users, a building, a set of buildings, or an organization, for example. Each account may access one or more services, a set of which are instantiated in their account, and which implement one or more of the methods or functions disclosed and/or described herein.

Other objects and advantages of the systems, apparatuses, and methods disclosed may be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in detail herein. However, the embodiments are not intended to be limited to the exemplary or specific forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, in which.

Note that the same numbers are used throughout the disclosure and figures to reference like components and features.

DETAILED DESCRIPTION

Figure 1A:
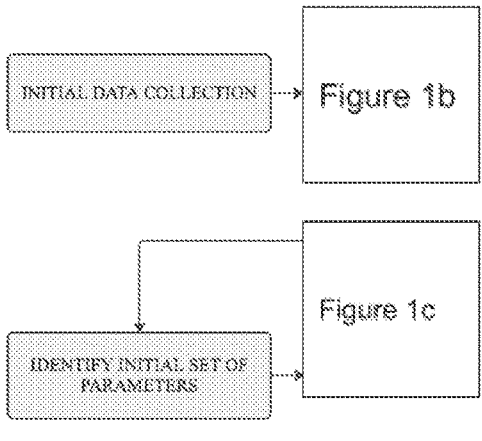
FIGS. 1(a) through 1(g) are diagrams illustrating a method, process, set of operations, or set of functions for collecting and processing data, in accordance with some embodiments.
Figure 1A:
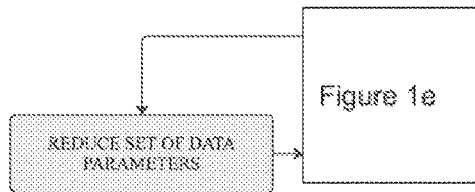
Figure 1A:
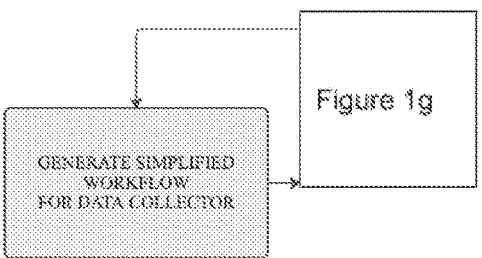
Figure 1A:
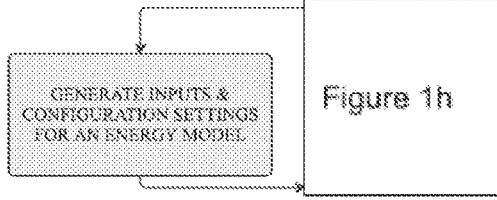
Figure 1A:
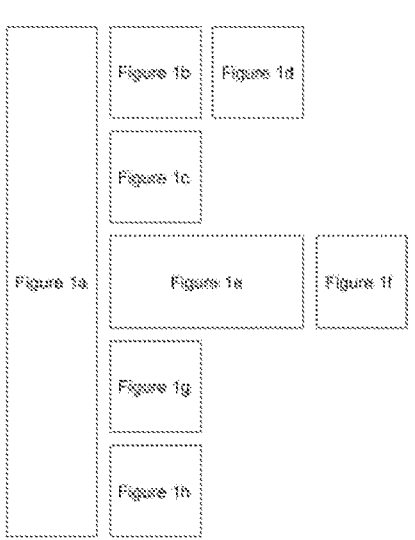

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter have been described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by a suitable processing element or elements (such as a processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user over a network (e.g., the Internet) through a transfer of instructions or an application that executes a set of instructions.

In some embodiments, the systems and methods disclosed and/or described herein may provide services to end users through a SaaS or multi-tenant platform. The platform provides access to multiple entities, each with a separate account and associated data storage. Each account may correspond to a user, set of users, a building, a set of buildings, or an organization, for example. Each account may access one or more services, a set of which are instantiated in their account, and which implement one or more of the methods or functions disclosed and/or described herein.

In some embodiments, one or more of the operations, functions, processes, or methods disclosed and/or described herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

Throughout the disclosure, the term "parameter" has been used to identify a model input or configuration element, whereas the term "variable" or "value" has been used to indicate a measurable quantity.

Automated control of systems may include use of one or more of the following control approaches or strategies: (1) Model Predictive Control (MPC), (2) rules-based control, or (3) use of a Proportional-Integral-Derivative (PID) controller. Each are described in greater detail below:

Model Predictive Control (MPC)

A control strategy that utilizes a mathematical model of the system being controlled to make predictions about its future behavior. Such an approach considers both the current state of the system and the future trajectory to determine optimal control actions. MPC formulates an optimization problem based on a cost function and system dynamics and solves it repeatedly over a finite time horizon. The approach of using MPC is known for its ability to handle constraints and multivariable systems effectively. MPC is commonly used in complex industrial processes, such as chemical plants and power systems;

Rules-Based Control

Rules-based control, also known as heuristic control or expert systems, relies on a set of predefined rules to determine control actions. These rules are typically derived from expert knowledge and experience in the specific domain. The control actions are based on if-then conditions, where the system's current state triggers specific actions according to the rules. Rules-based control is relatively straightforward to implement and interpret, making it suitable for simple systems or applications where explicit knowledge is available. However, it may not handle complex or uncertain situations as effectively as other methods;

Proportional-Integral-Derivative (PID) Controllers:

PID (Proportional-Integral-Derivative) controllers are a widely used type of feedback control. They are based on continuously measuring a system's output and adjusting the control signal based on the error between a desired setpoint and the actual value. The control signal is calculated by combining three terms: the proportional term, which responds proportionally to the current error; the integral term, which accumulates past errors to eliminate steady-state errors; and the derivative term, which anticipates future errors based on the rate of change. PID controllers are versatile, simple to implement, and can handle a wide range of systems. They are commonly used in industrial processes, robotics, and automation.

As described, Model Predictive Control (MPC) uses a mathematical model to predict the system behavior and optimize control actions. Rules-based control relies on predefined rules to determine control actions based on the system's current state. PID controllers adjust the control signal based on the error between the desired setpoint and the system's actual value using proportional, integral, and derivative terms. Each control strategy has its strengths and weaknesses, and the choice of which to use depends on the specific requirements and characteristics of the system being controlled.

The differences between the different types of control approaches reflect the different situations or uses in which each may be most effective. As an example, a scenario in which MPC is preferable to a traditional control approach (such as rules-based control) is where a system is being configured to respond to multiple goals (such as to save energy, guarantee comfort, and effectively respond to utility prices). As recognized by the inventors, MPC is best suited to use in providing a solution to the problem of controlling energy consumption subject to multiple goals because of its ability to handle constraints and multivariable systems effectively.

In contrast, rules-based control is not flexible enough to deal with changing and dynamic system conditions such as changes in prices, weather, or occupancy. PID control can guarantee comfort in a single zone (i.e., by using logic to achieve a setpoint), but cannot handle multivariate problems such as looking at overall energy consumption or carbon generation as part of generating control signals for multiple devices.

Figure 1B:
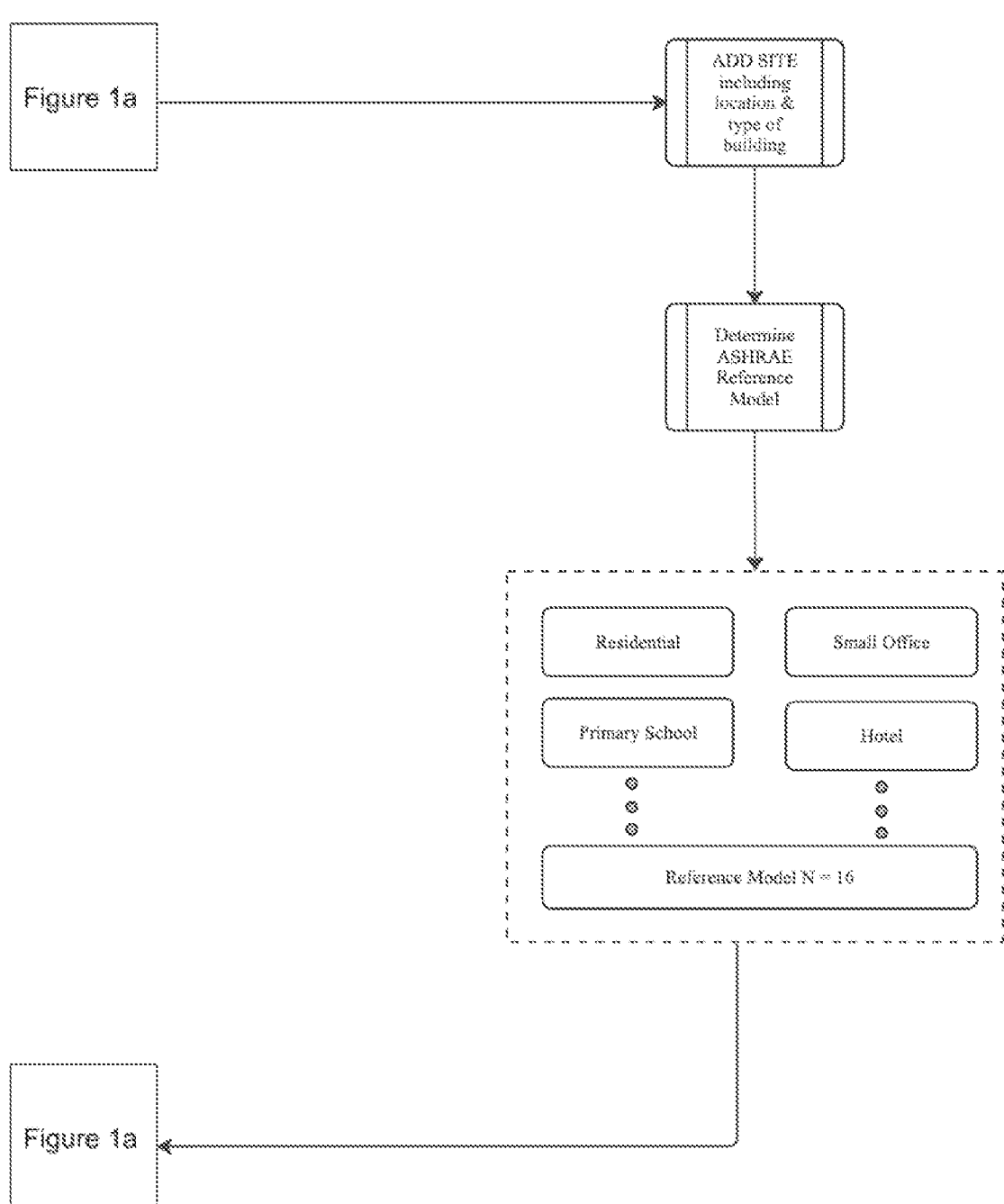
Figure 1C:
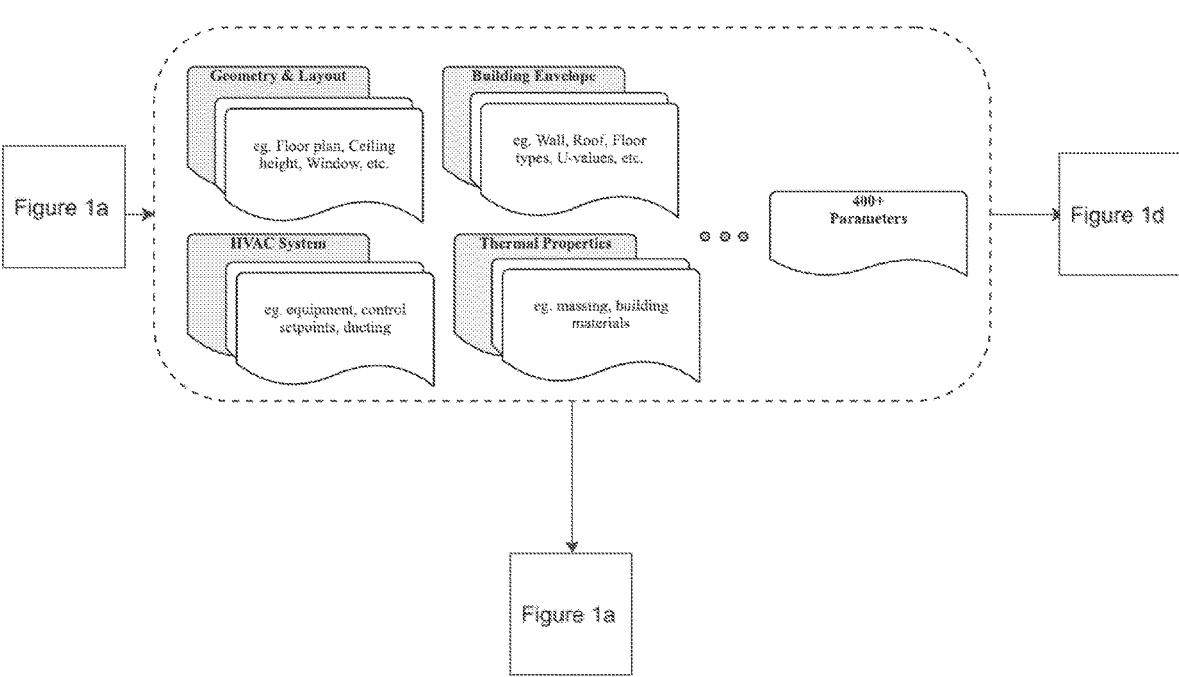
Figure 7:
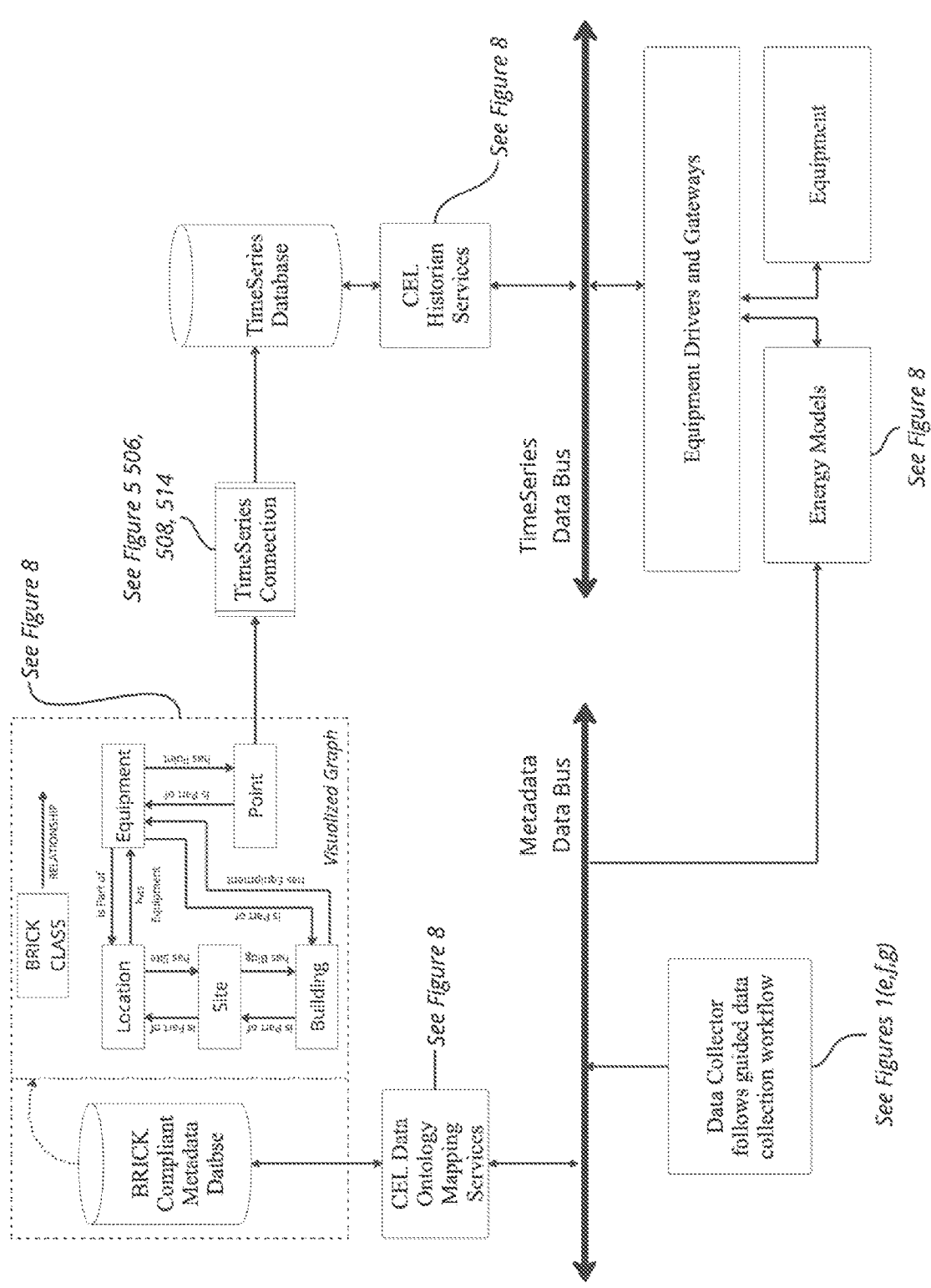
FIG. 7 is a flowchart or flow diagram illustrating a method, process, set of operations, or set of functions for using collected data to configure an energy control model (with reference to the Energy Models in FIGS. 7 and 8) that in some embodiments can be used in a Model Predictive Control (MPC) algorithm that analyzes data, predicts future building behavior, sends and receives read/write commands via equipment drivers or API endpoints (as examples) to effectuate equipment operation changes (see Equipment Drivers and Gateways and Equipment) that optimize energy usage, comfort, and other desired objectives in a subject structure.
Figure 8:
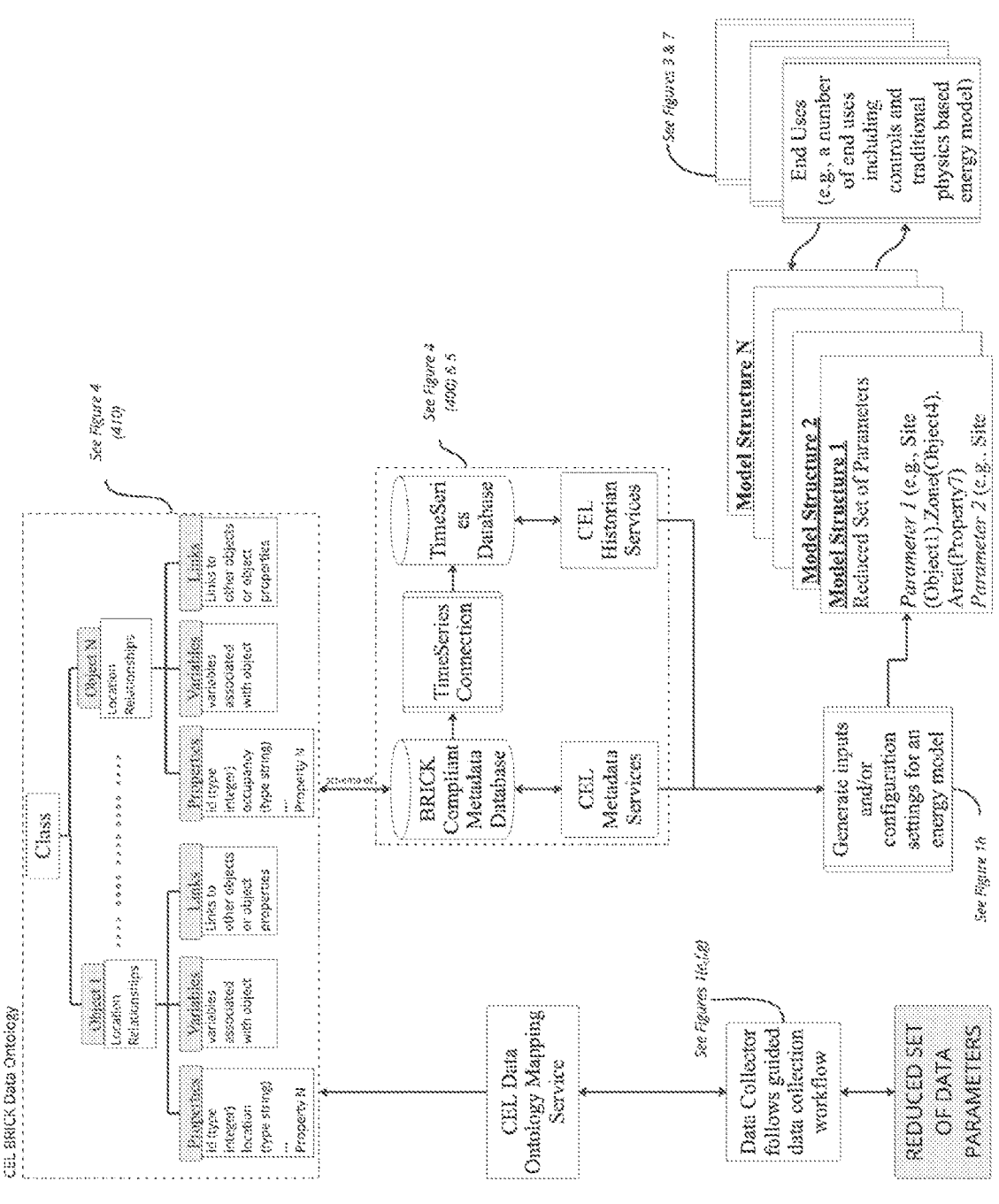
FIG. 8 is a flowchart or flow diagram illustrating a method, process, set of operations, or set of functions that in some embodiments can be used to implement autonomous energy control model configuration and calibration using the data collected in previous steps.

FIG. 1(a) is a flowchart or flow diagram illustrating a method, process, set of operations, or set of functions for collecting data used to configure an energy control model, in accordance with some embodiments. The figure provides an overview of the disclosed data collection process. A high-level description of the steps or stages is provided in the following subsections, with additional details provided herein. A goal of stages 1 through 4 (as illustrated in FIGS. 1(b)-1(g)) is to populate a structured data schema with sufficiently detailed data so that stage 5 (as illustrated in FIGS. 1(h), 7, and 8) results in the successful configuration of an energy control model (FIG. 8) and activation of the building energy management service for the site (FIG. 7) with minimum time and cost. Additional details are provided herein with reference to in FIGS. 1(a) through 1(h).

Figure 2:
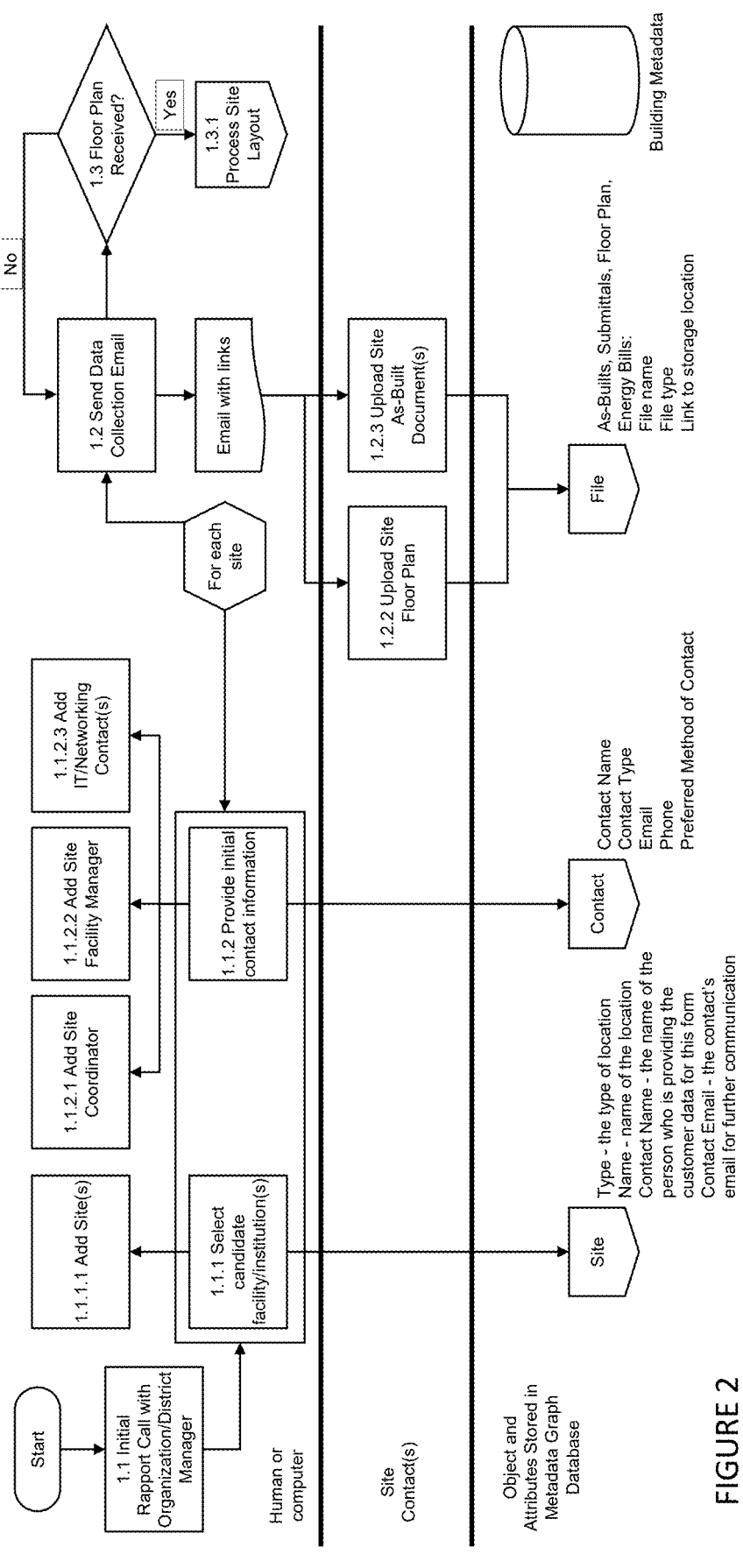
FIG. 2 is a flowchart or flow diagram illustrating a method, process, set of operations, or set of functions for collecting data to identify an initial set of parameters for an energy control model, in accordance with some embodiments.

Stage 1—Initial Data Collection:

A first step or stage is to gather contact information for people who can provide data on the site/building based on a predefined Document Checklist. The checklist may include, site location and structure types, building mechanical, electrical and elevation drawings as non-limiting examples (as illustrated in FIGS. 1(b) and 2); As described further herein, the backend of the disclosed system (as described in the metadata and inputs sections) enables either a human or a computer to upload the collected information, and for the information to be used in stage 2 to determine an initial reference model for purposes of automation or control of energy and comfort. The data collection system may be automated spreadsheets, custom web interfaces or customer relation management systems, as non-limiting examples. In some embodiments, the approach may apply either OCR or human effort to process and "tag" collected data.

Stage 2—Identify Initial Set of Parameters:

Once the designated contacts have collected the requested data, a human or computer identifies an appropriate ASHRAE building reference model based on data collected in stage 1. Based on the reference building type selected, a computer generates an initial set of parameters required to generate an energy control model for the structure (as illustrated in FIGS. 1(b) and 1(c)).

An ASHRAE building reference model is a standardized framework that represents typical buildings, serving as a benchmark for energy performance analysis. It includes key parameters like building geometry, systems, and usage patterns, enabling comparisons and simulations to optimize energy efficiency and design.

Figure 1D:
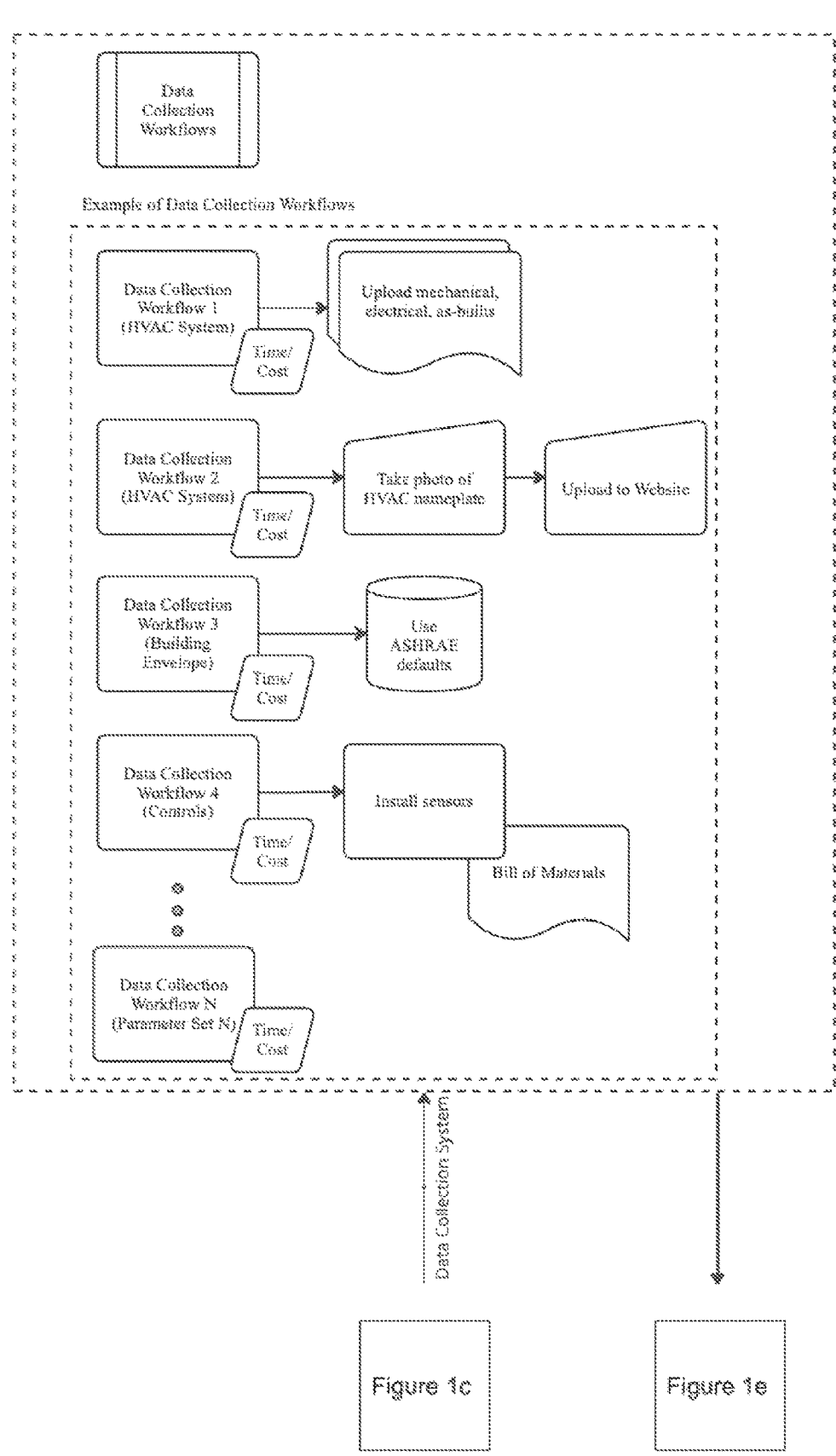
Figure 5:
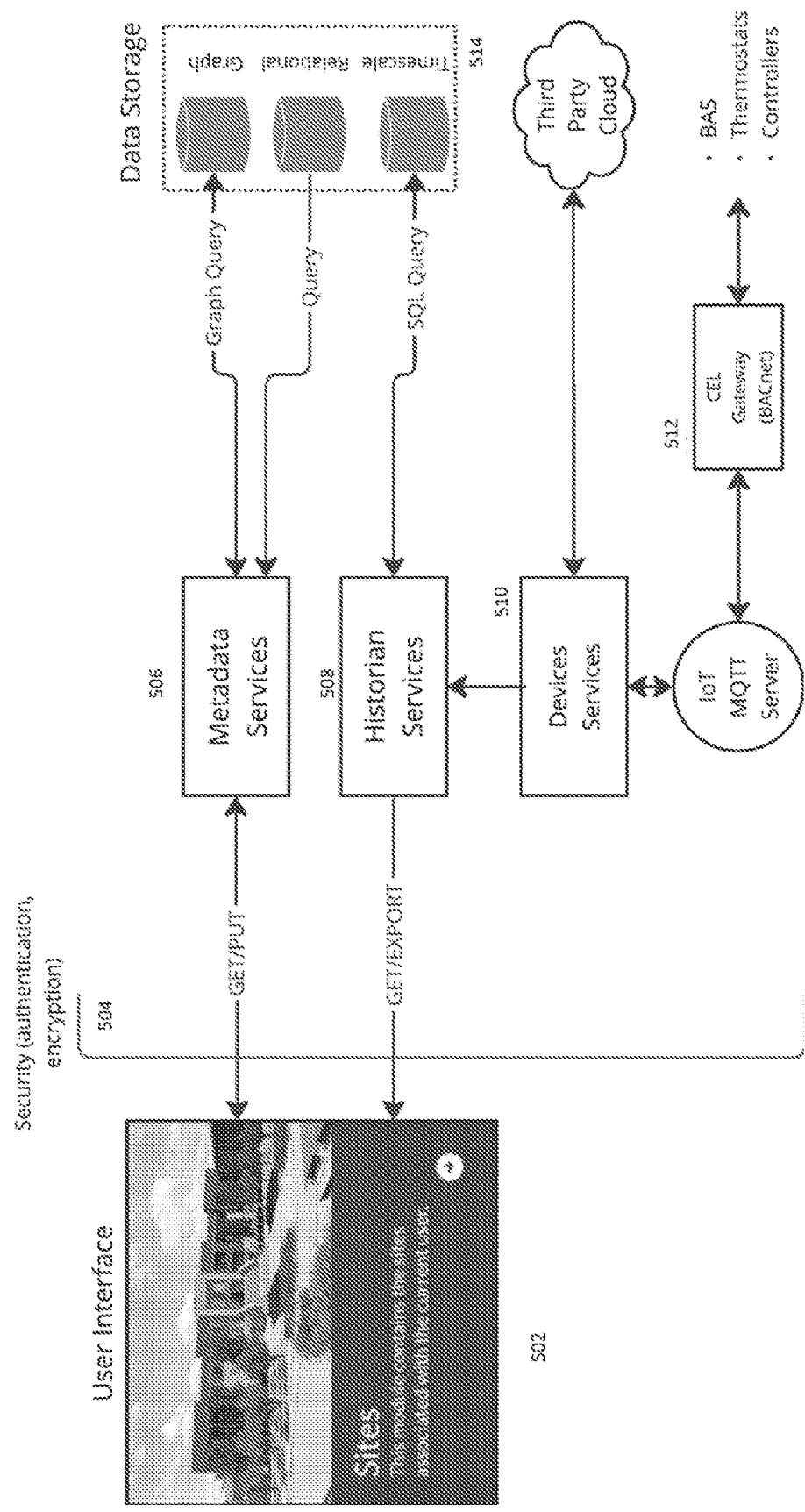
FIG. 5 is a diagram illustrating an architecture for a multi-tenant or SaaS platform that may be used in implementing an embodiment of the systems and methods disclosed herein.
Figure 5A:
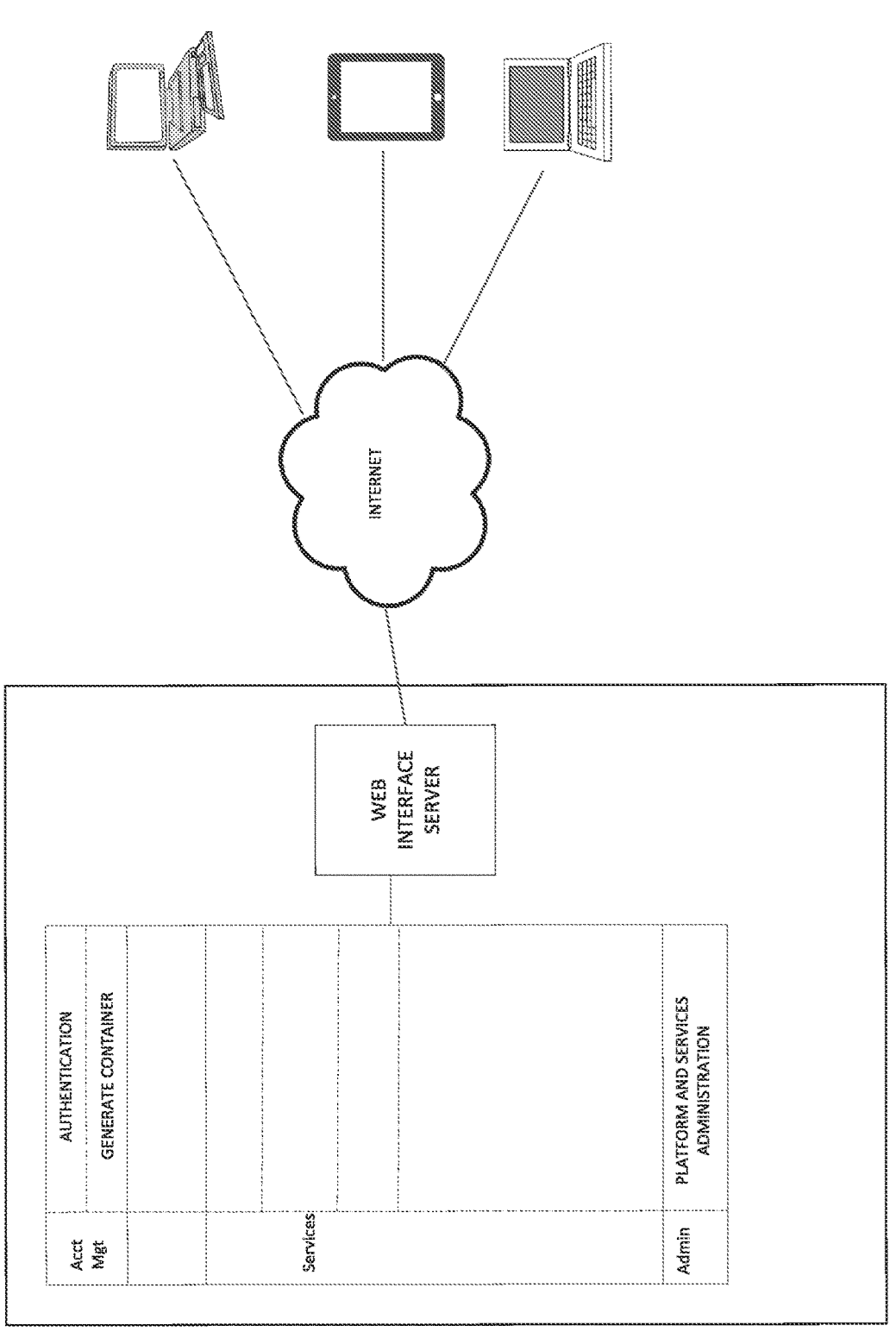
FIGS. 5(a)-5(c) provide additional details of the elements or components of the multi-tenant distributed computing service platform of FIG. 5, including an integrated business system (a), an enterprise network (b) or an operating environment (c) in which an embodiment of the invention may be implemented.
Figure 5B:
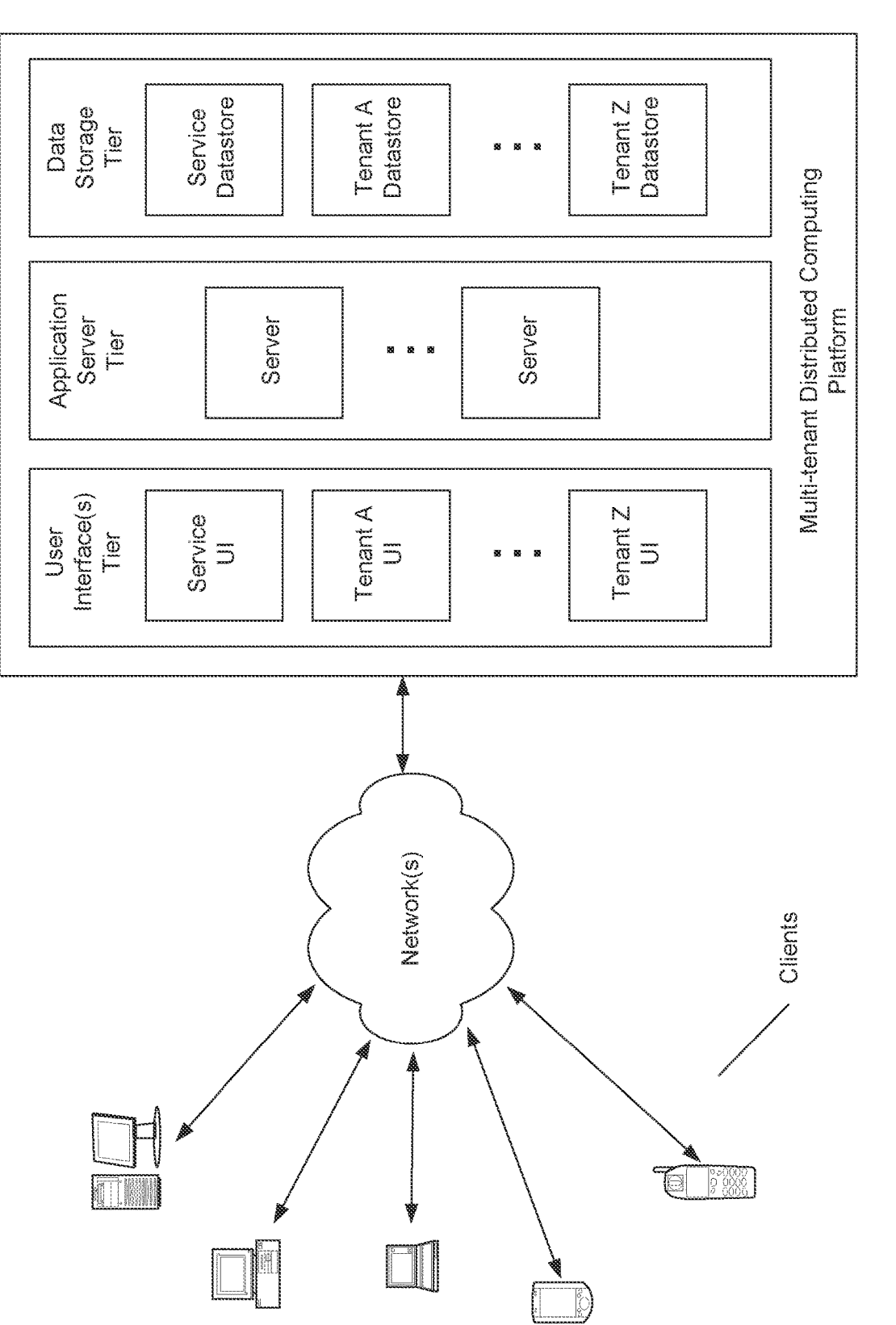

Data collection requirements for the initial set of parameters are translated into one or more Data Collection Workflows that can be carried out by a computer, or human field data collector using flow charts and checklists, automated spreadsheets, or custom web interfaces, as non-limiting examples (as illustrated in FIGS. 1(d) and 5(b)).

Figure 6A:
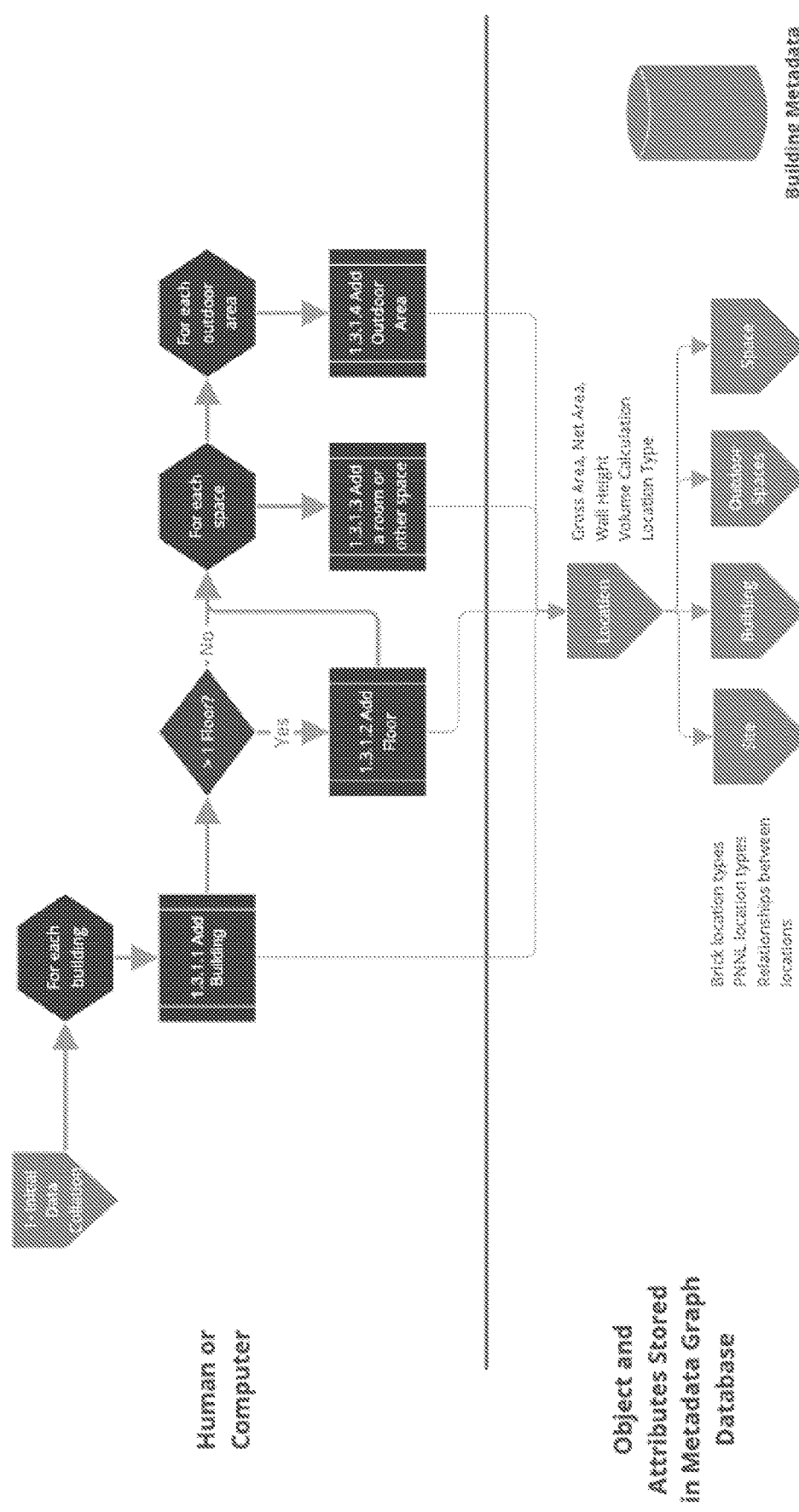
FIGS. 6(a) through 6(w) are diagrams illustrating aspects of the data collection and processing workflows that may be implemented in accordance with some embodiments.
Figure 6B:
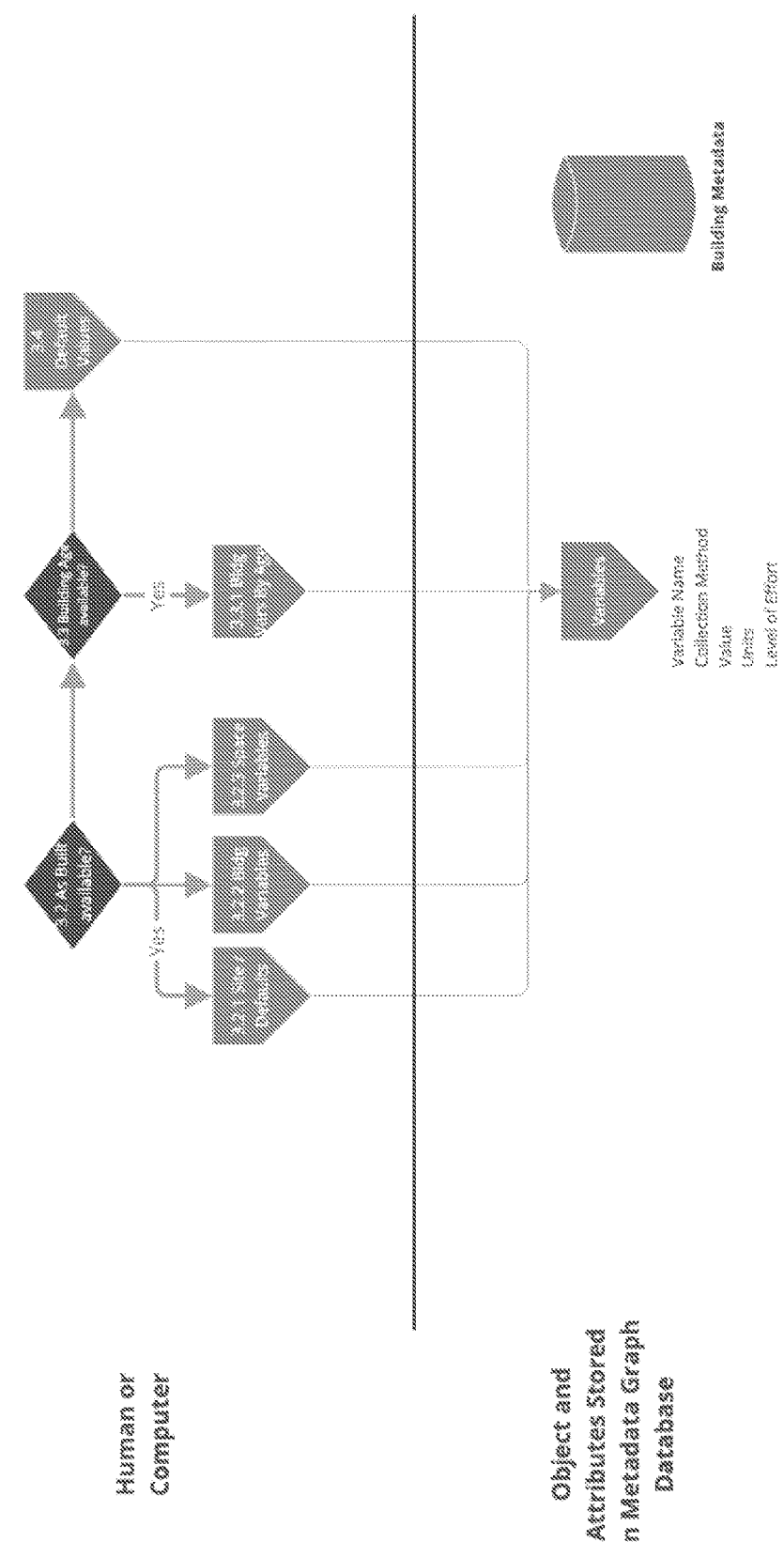
Figure 6C:
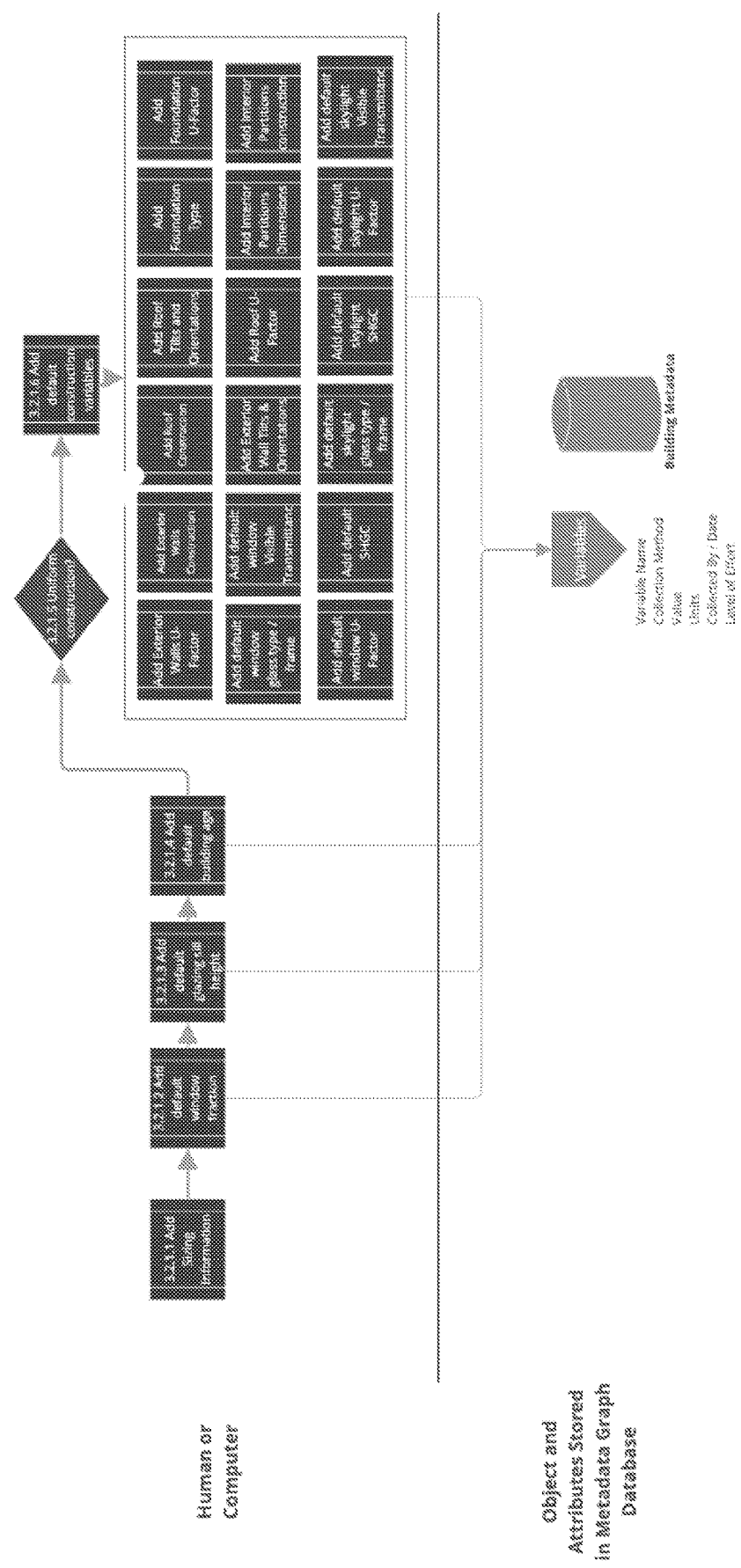
Figure 6D:
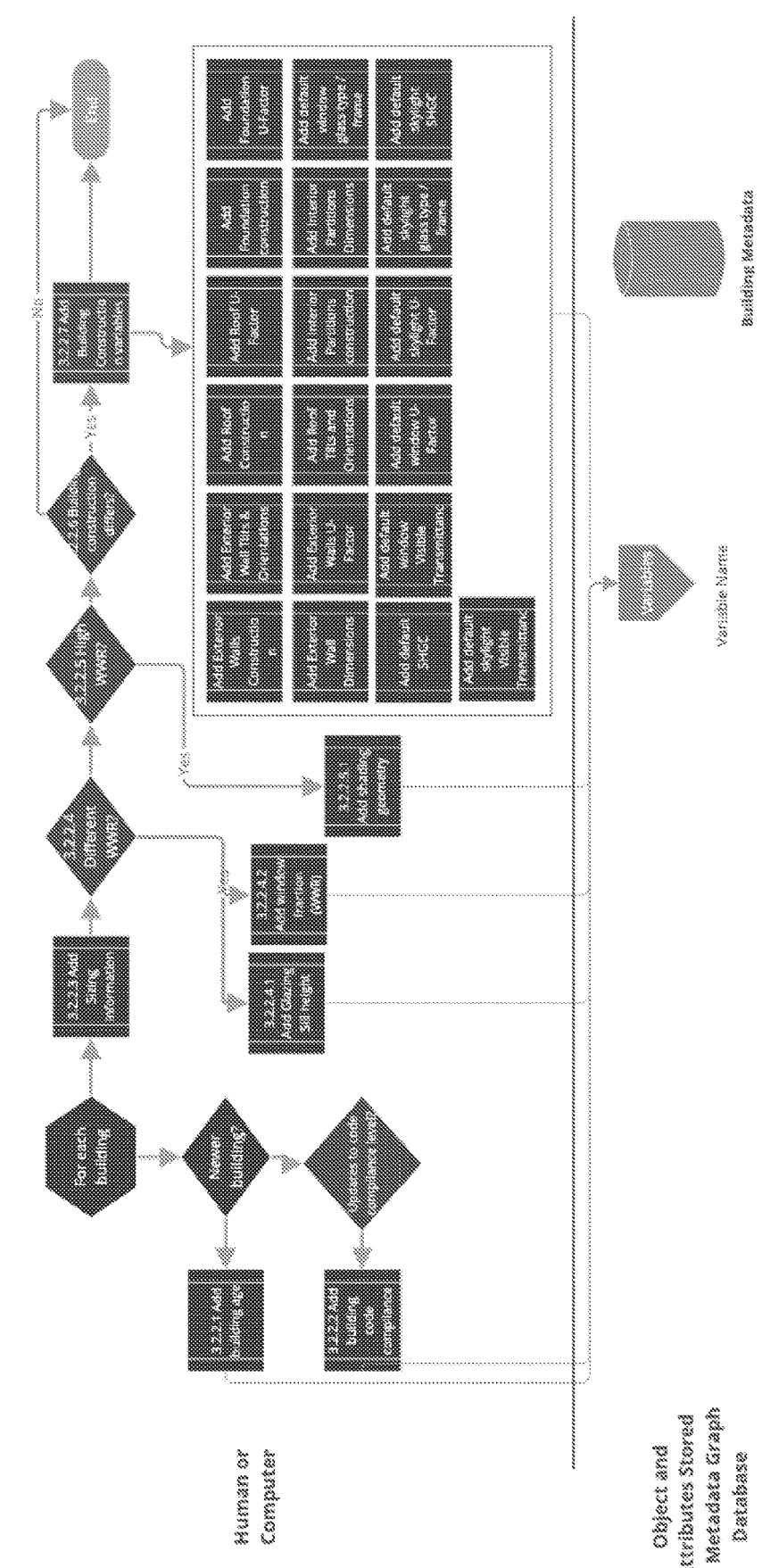
Figure 6E:
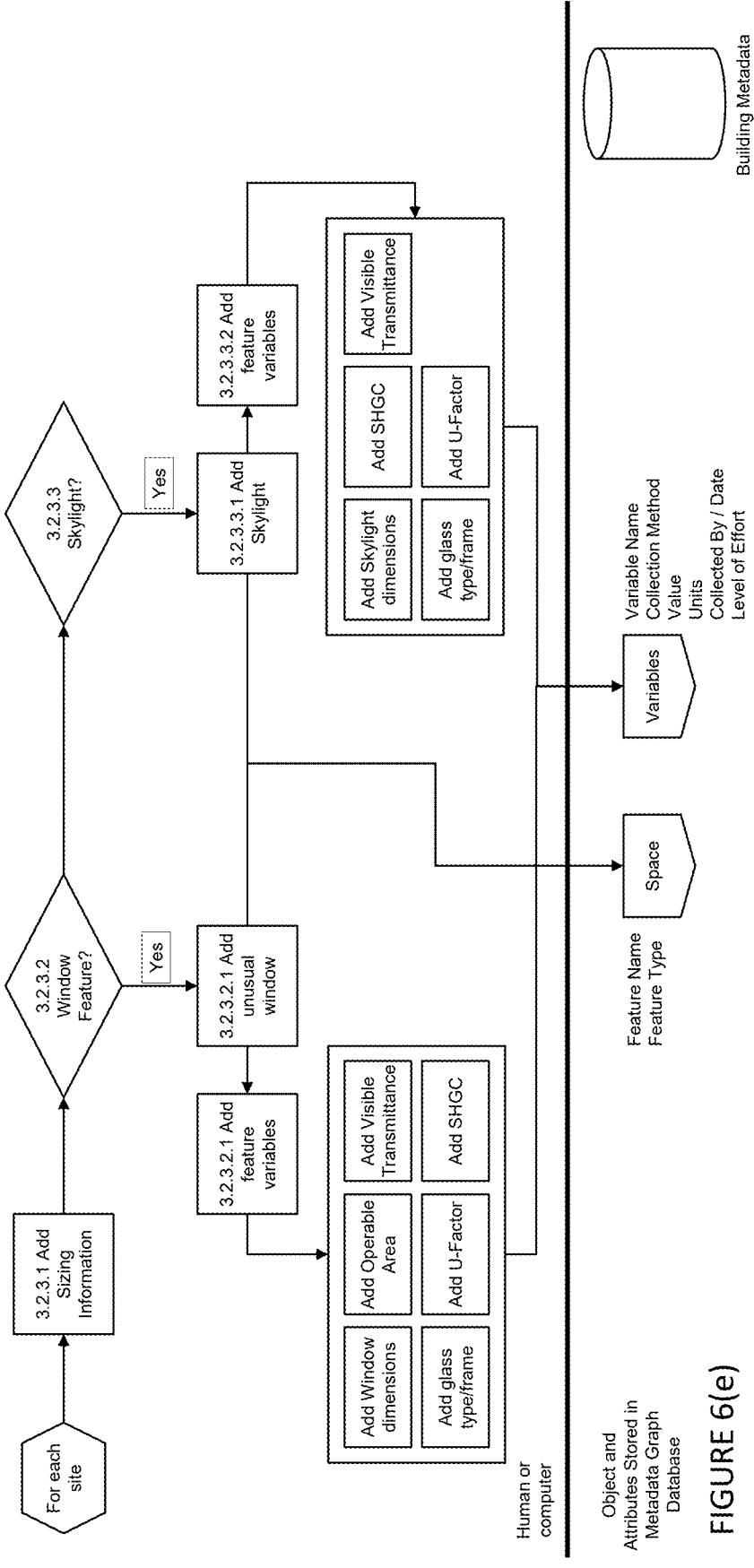
Figure 6F:
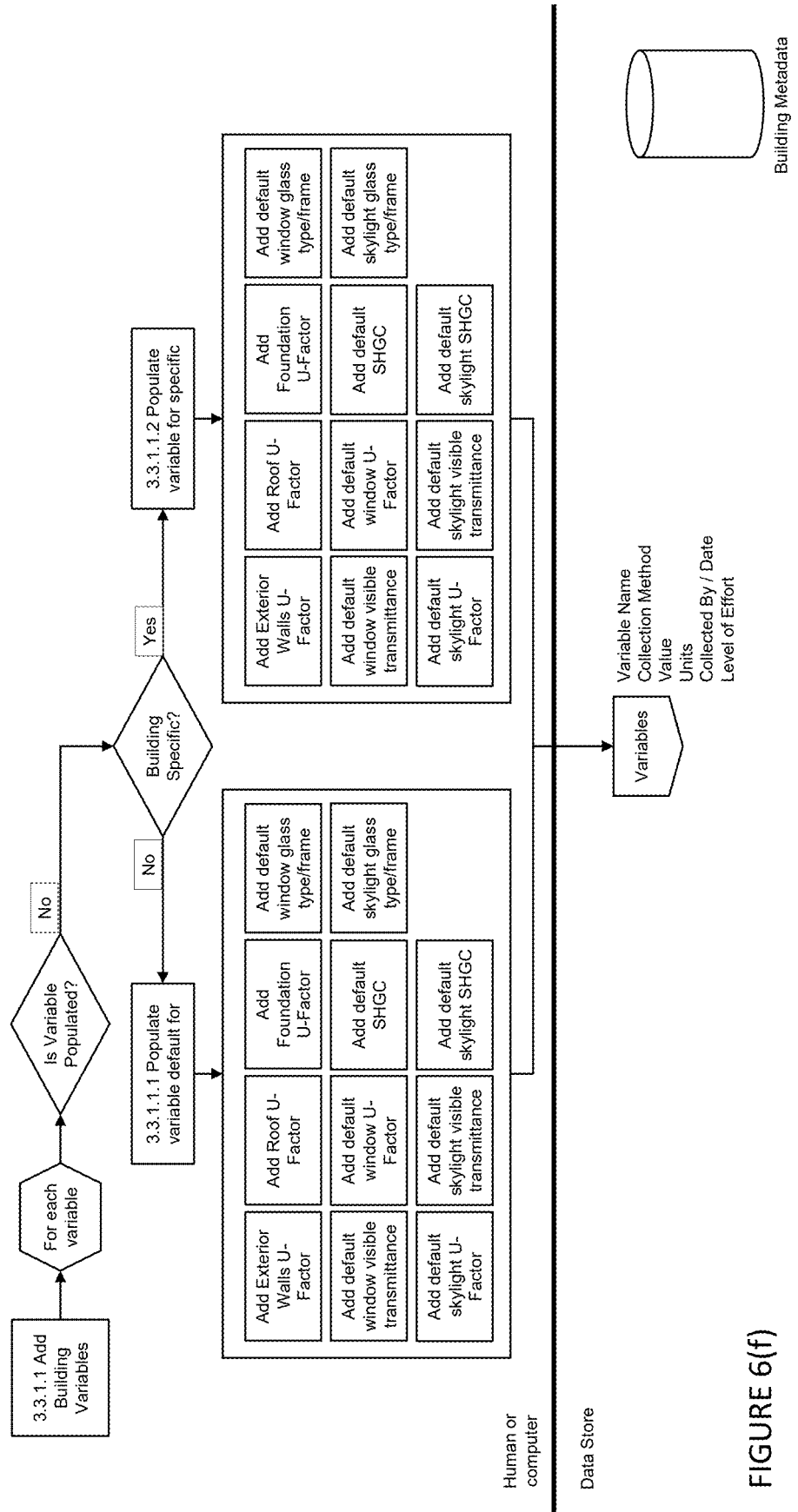
Figure 6G:
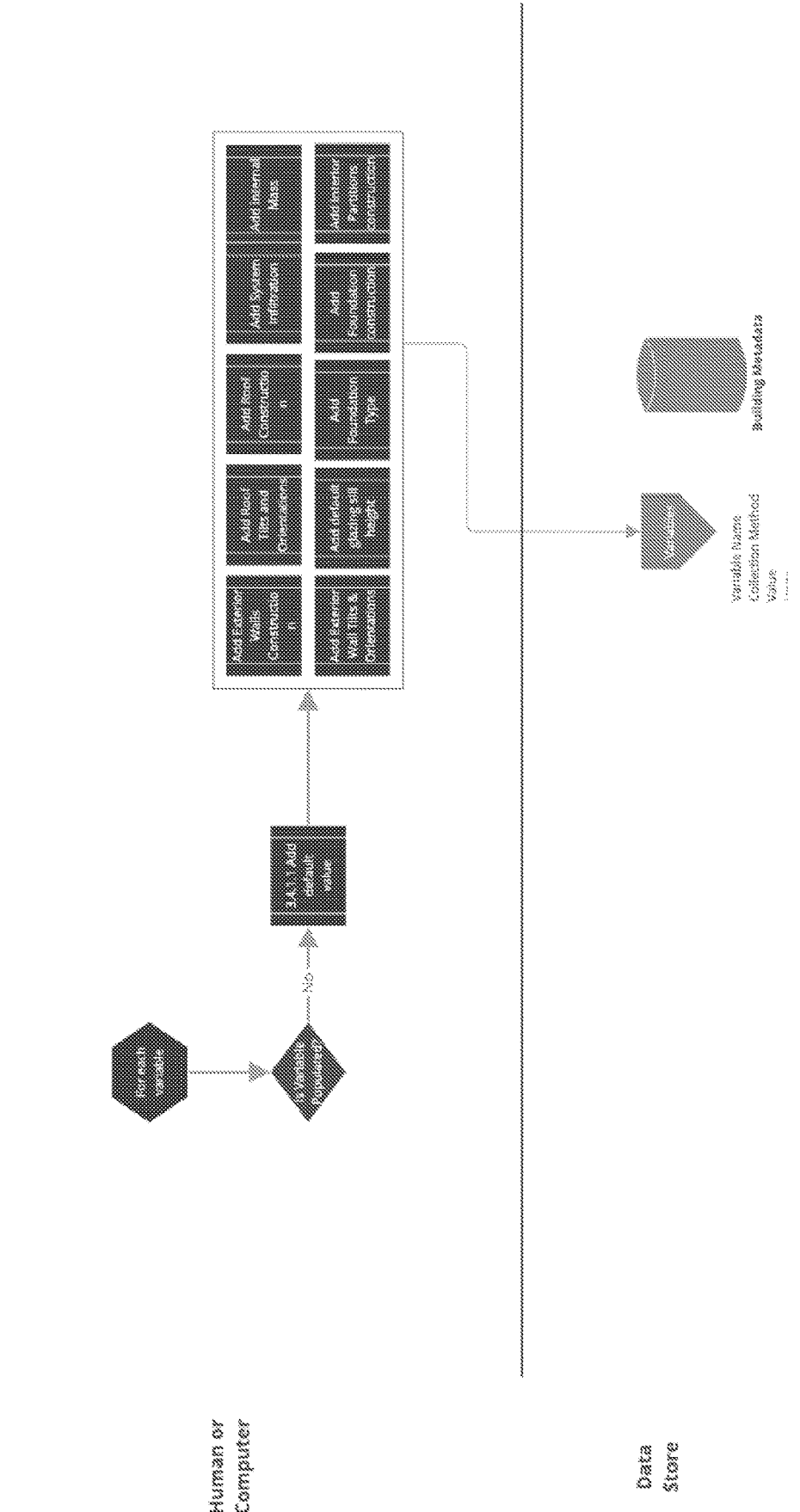
Figure 6H:
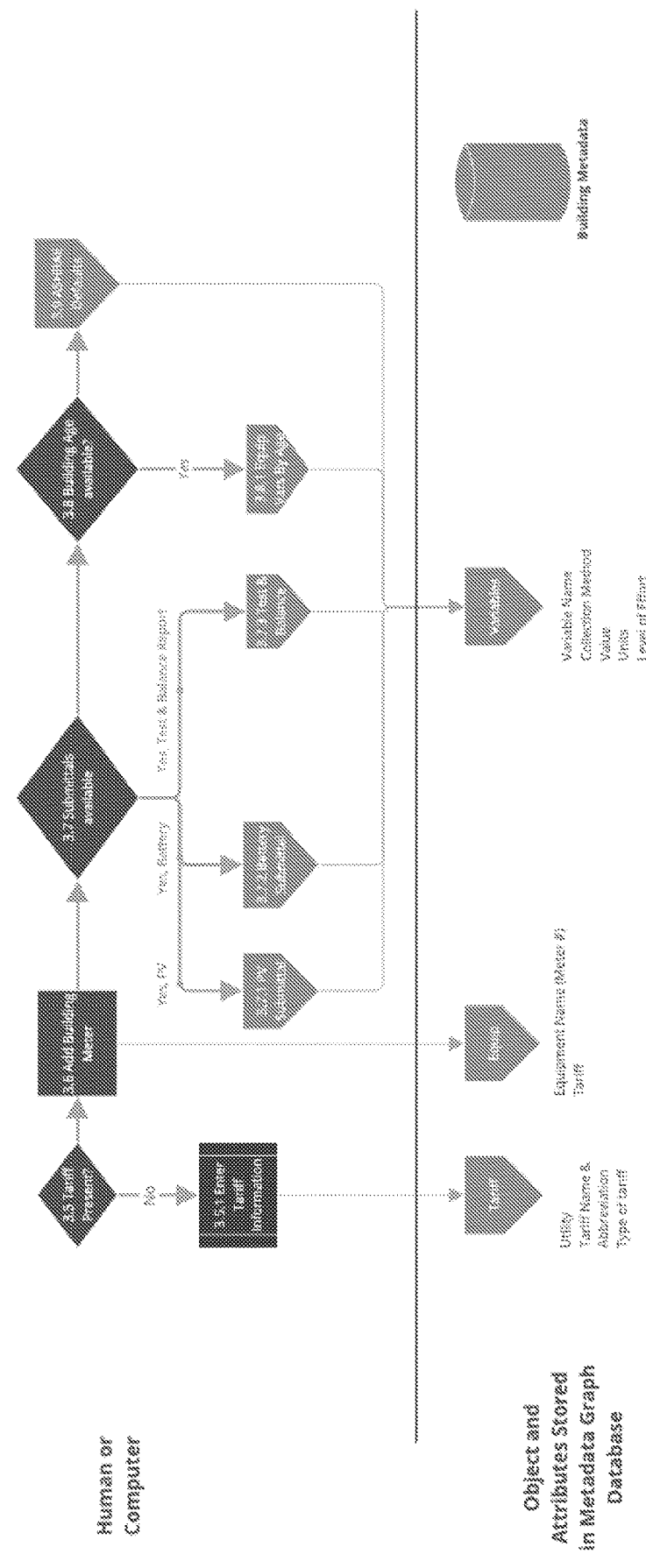
Figure 6I:
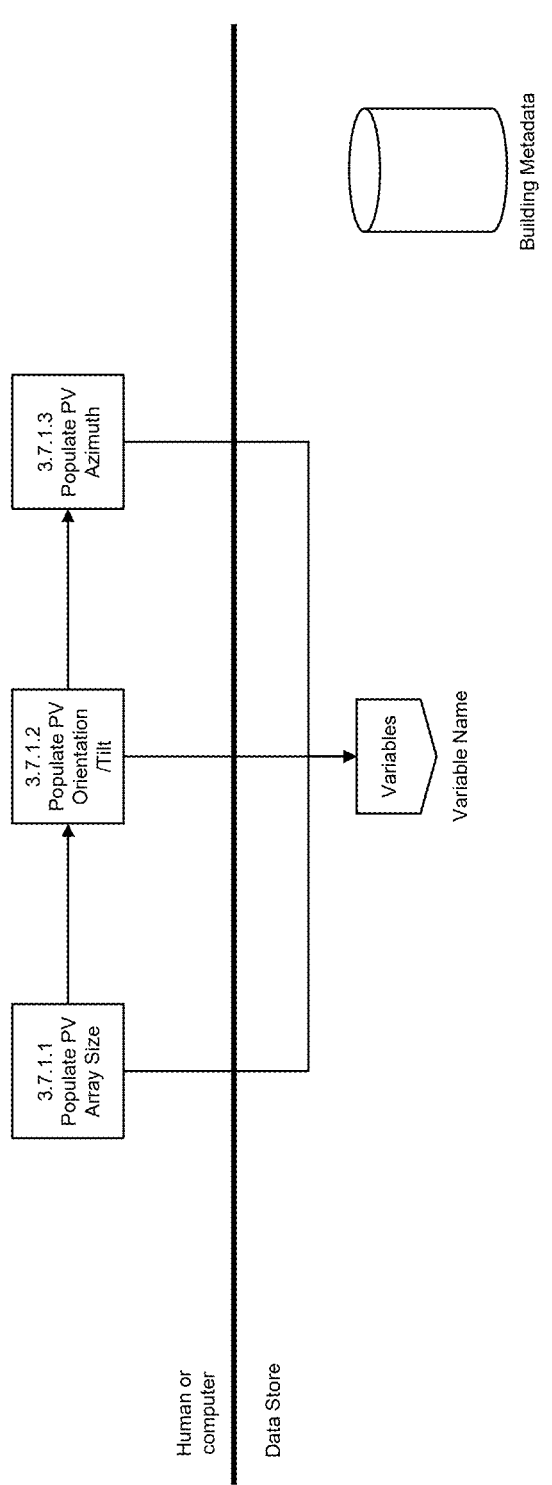
Figure 6J:
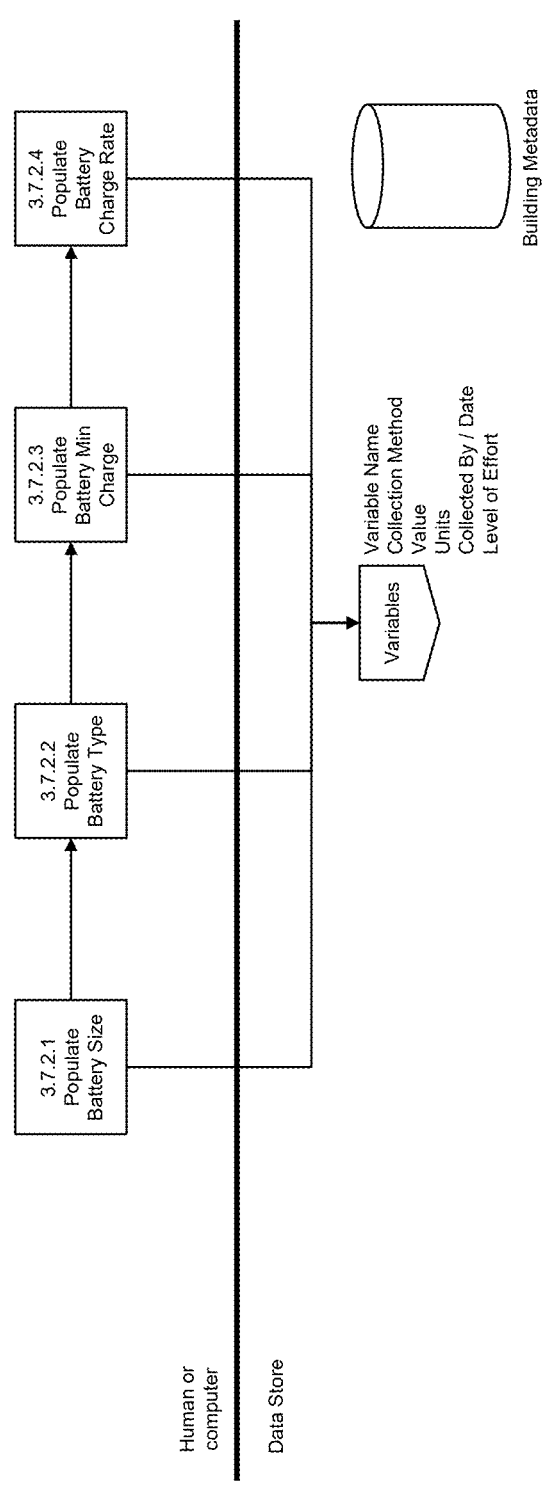
Figure 6K:
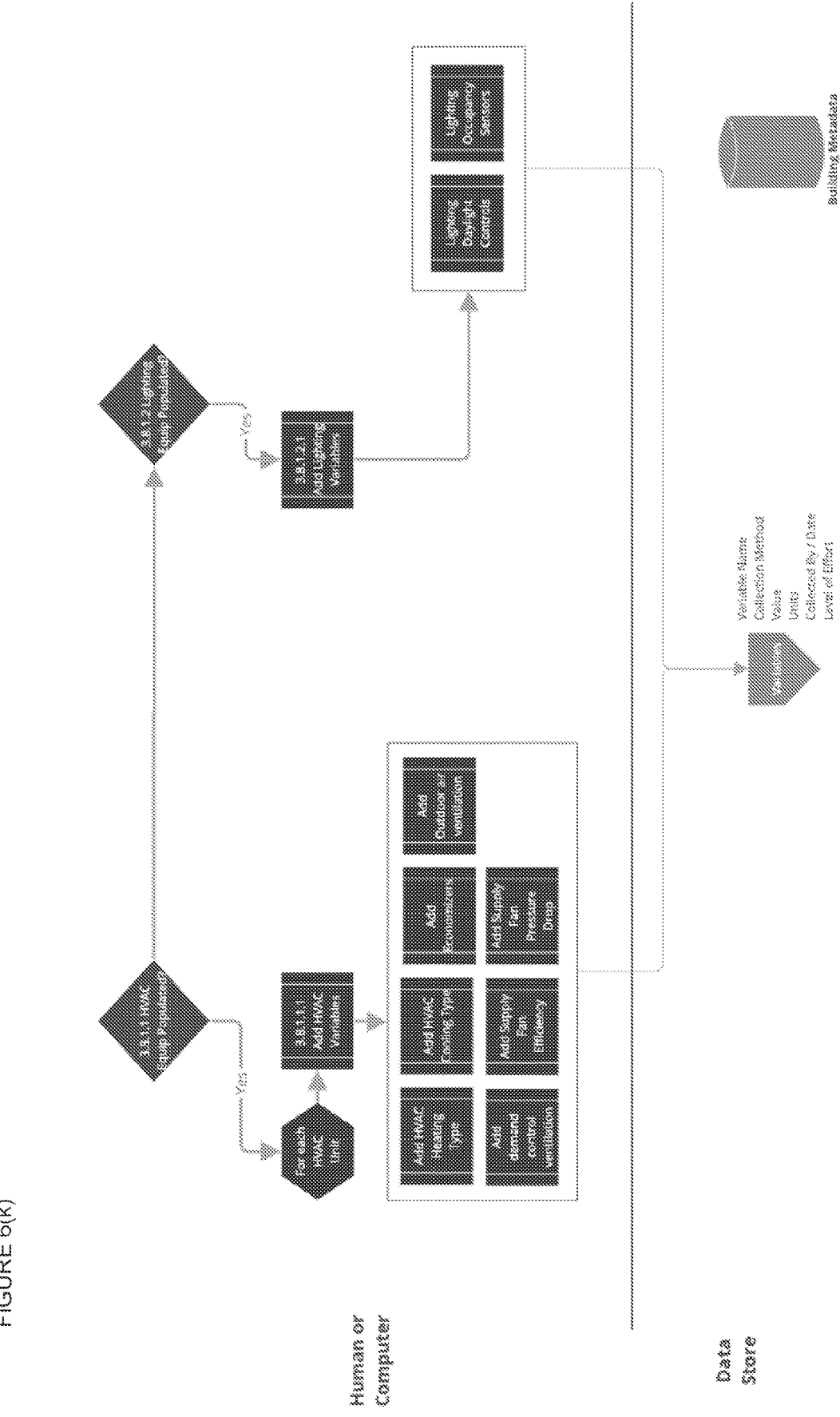
Figure 6L:
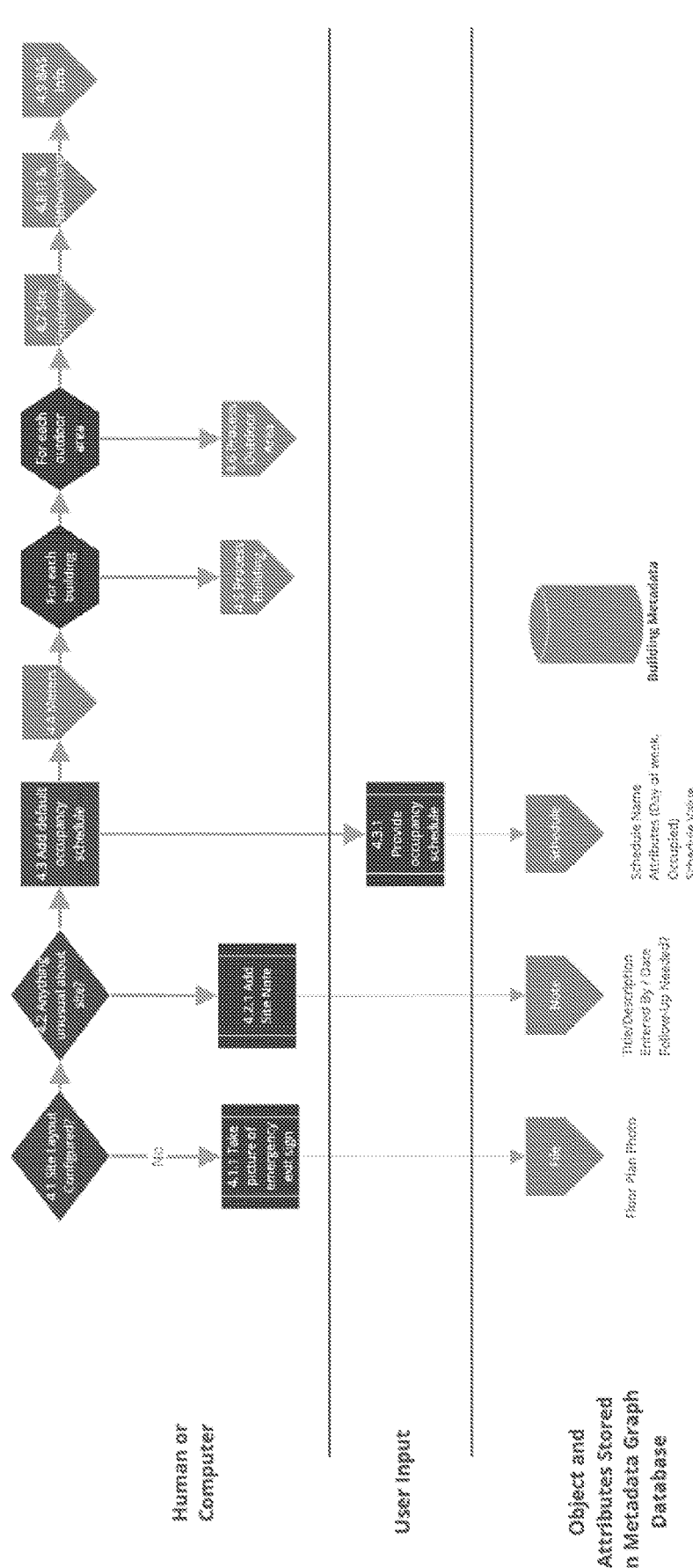
Figure 6M:
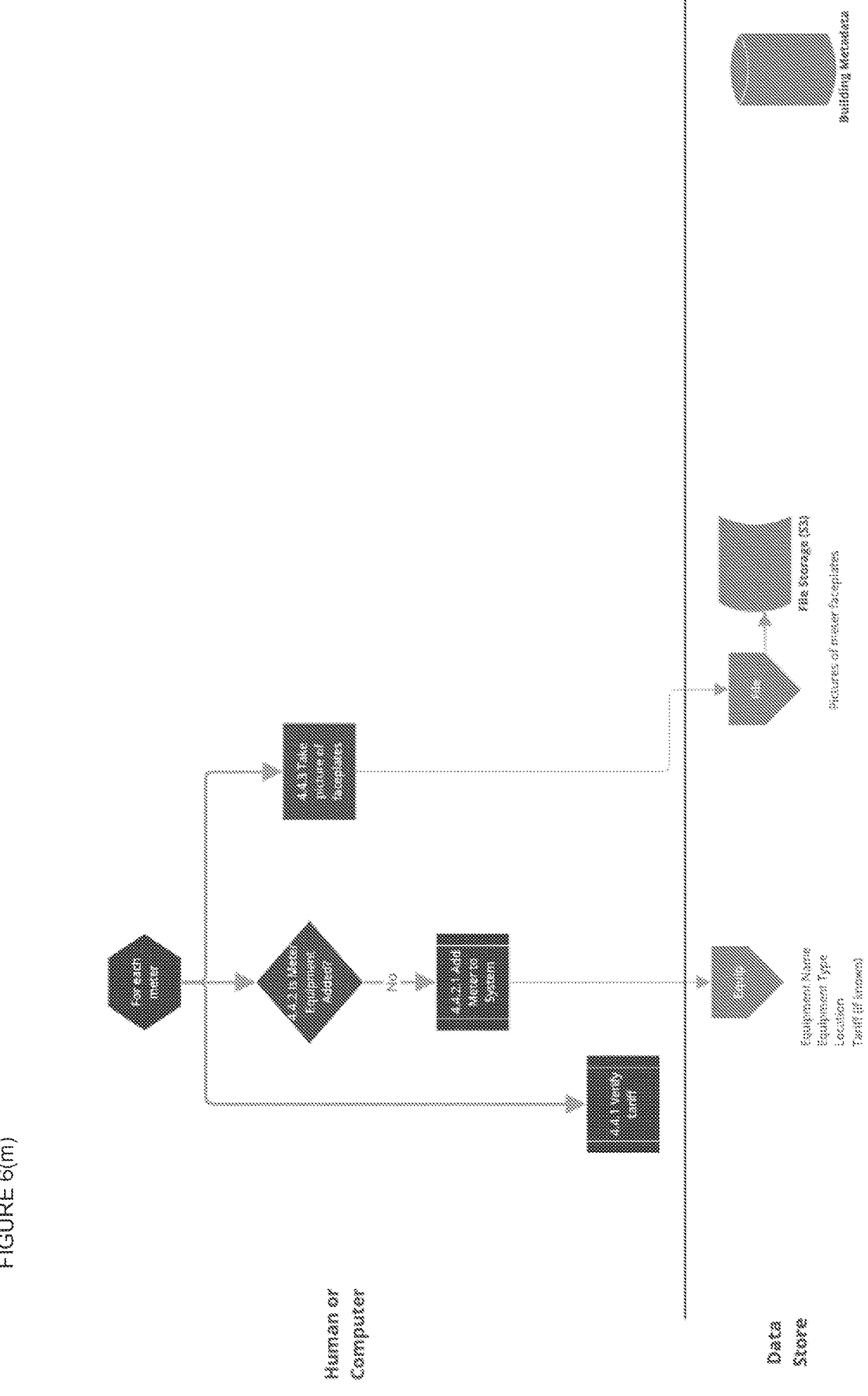
Figure 6N:
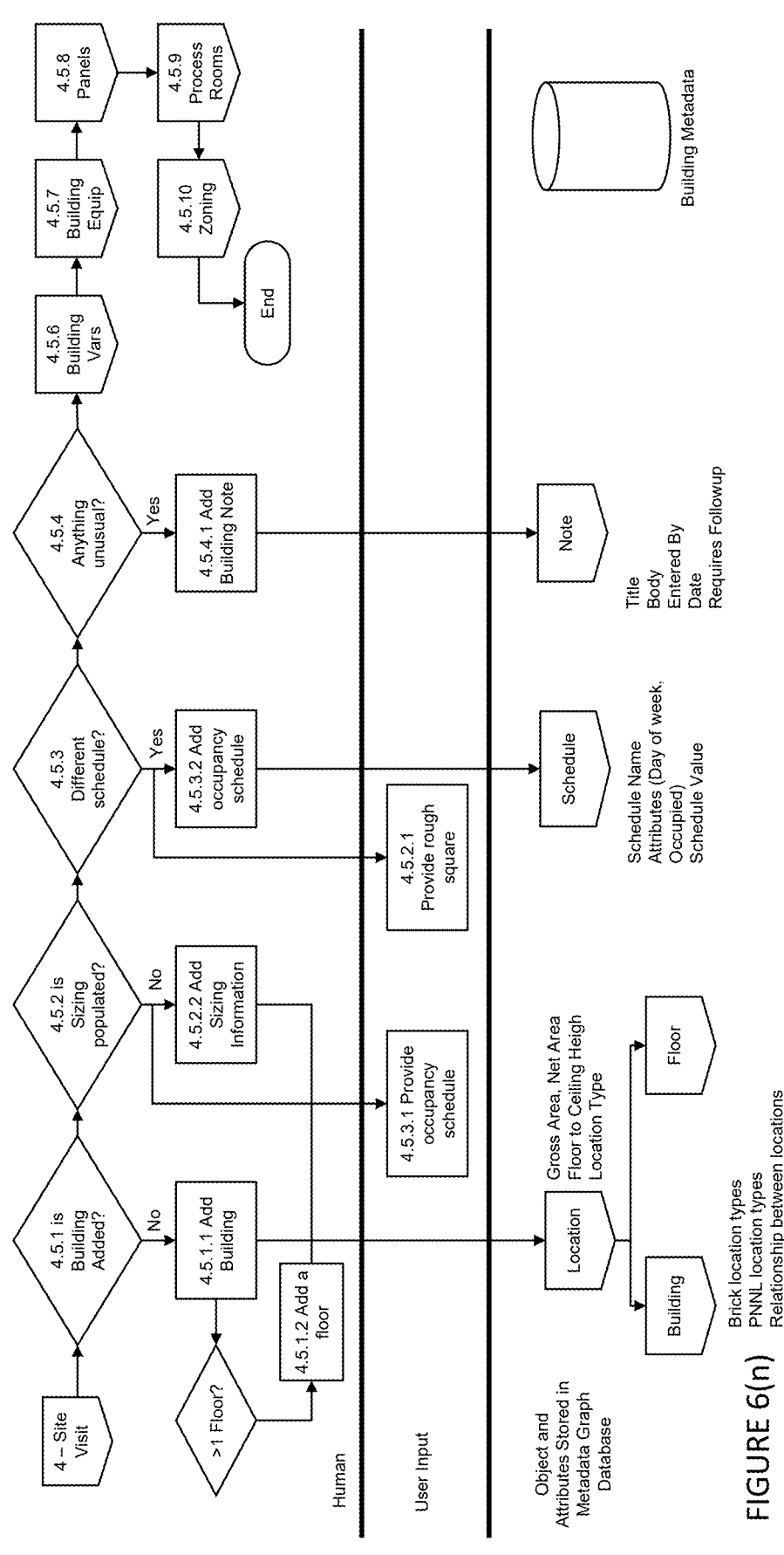
Figure 6O:
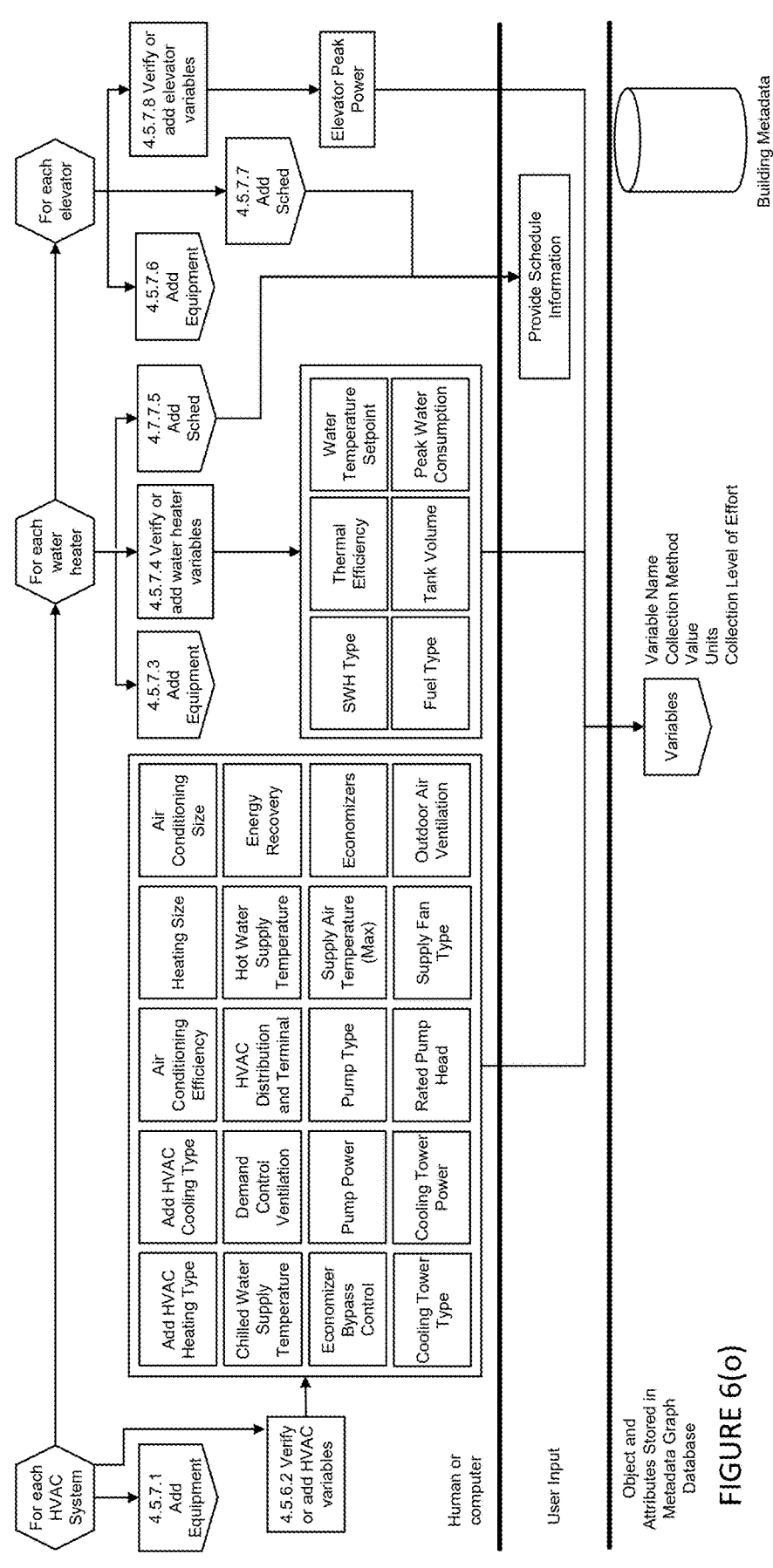
Figure 6P:
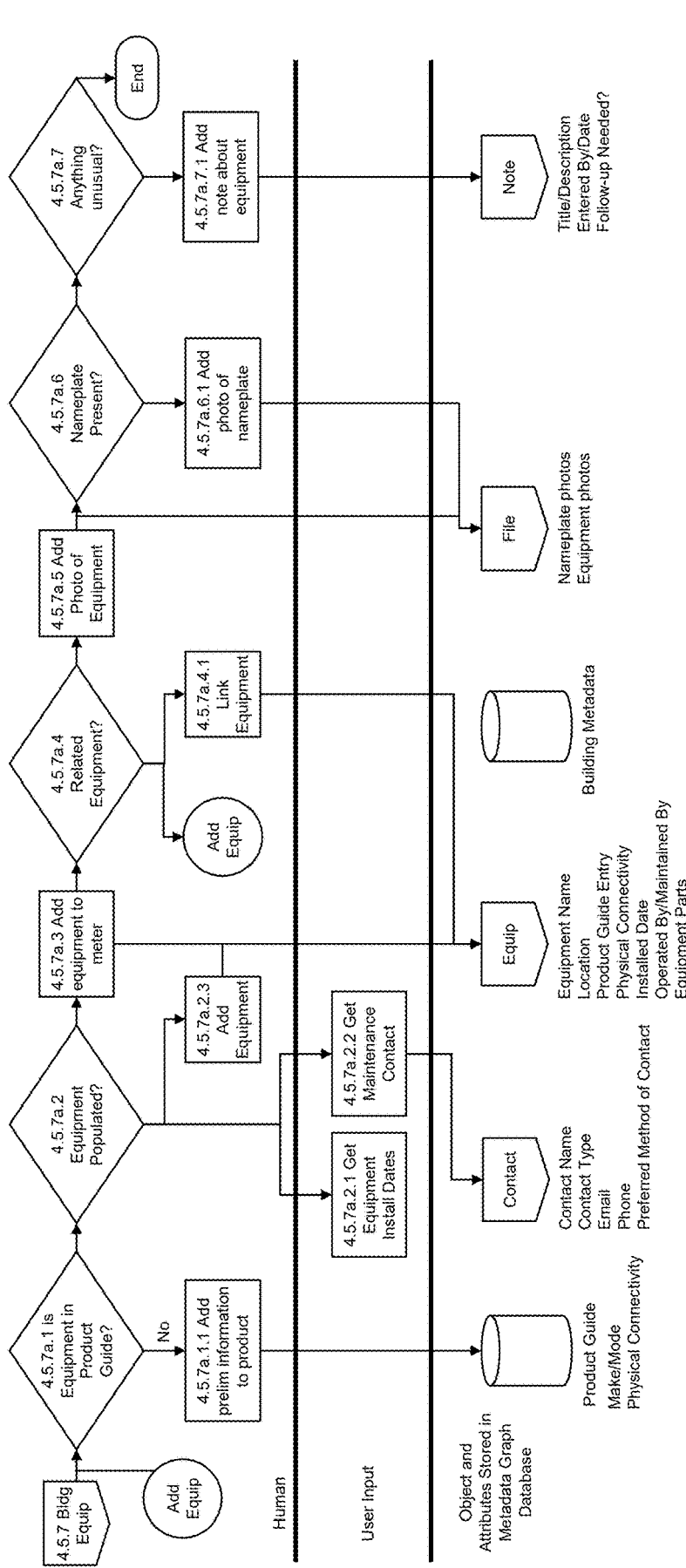
Figure 6Q:
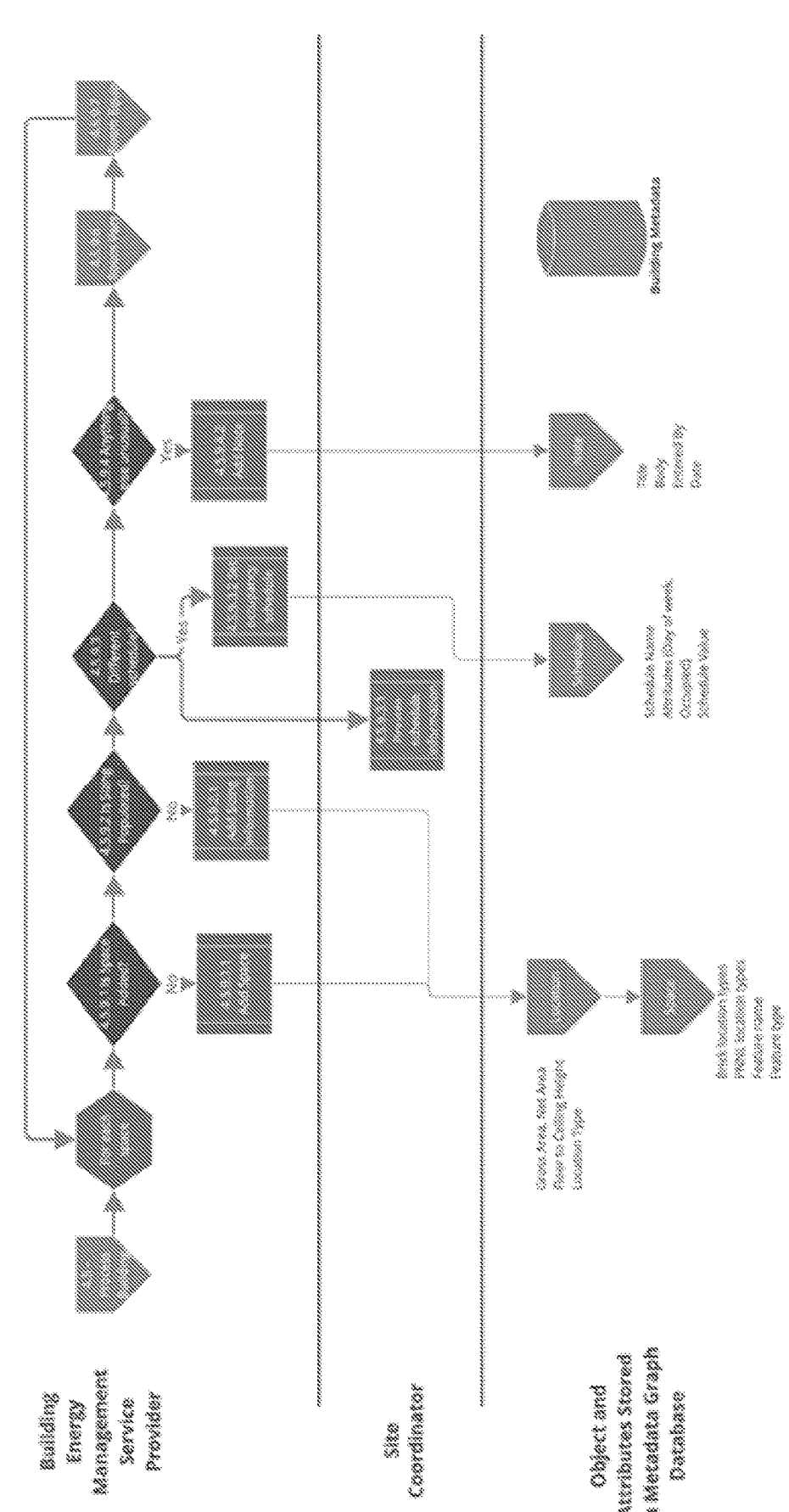
Figure 6R:
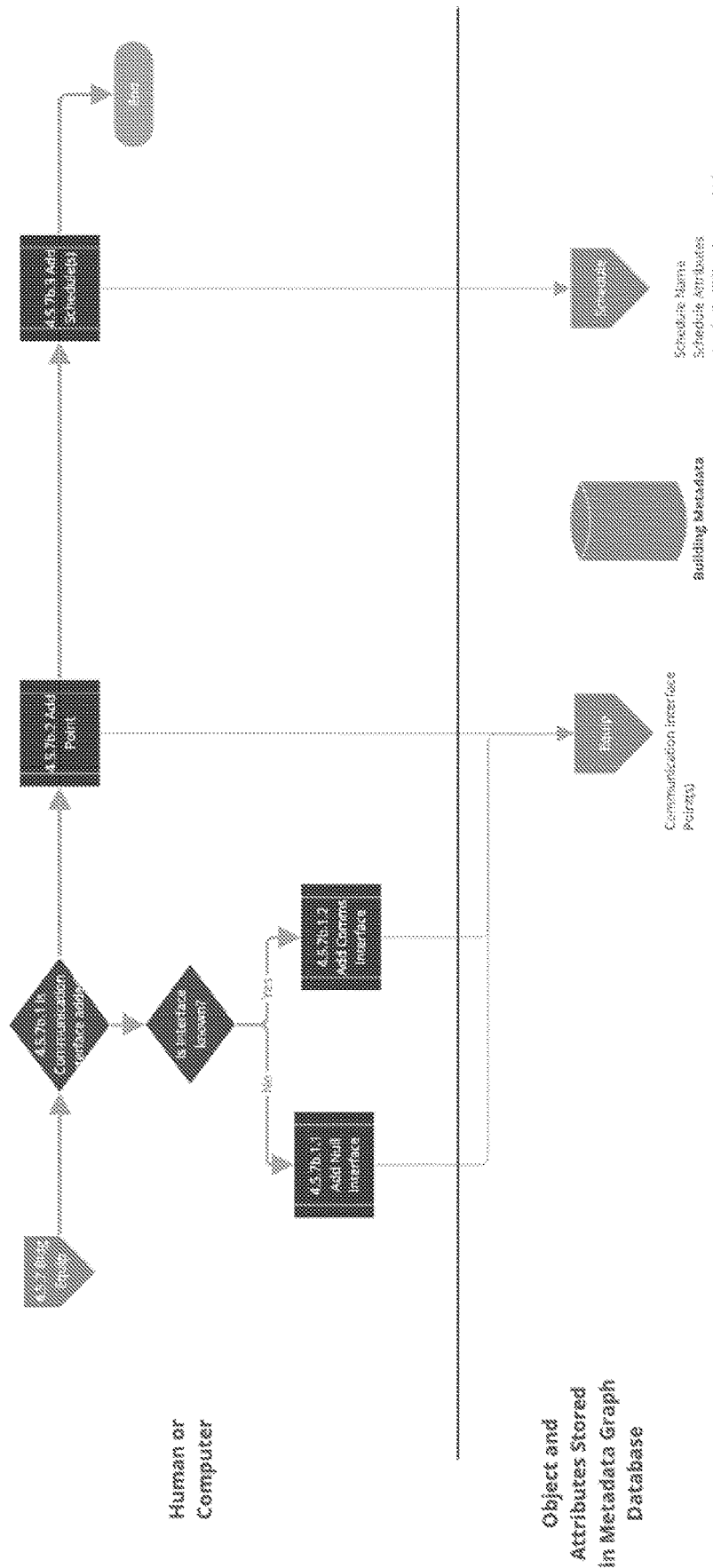
Figure 6S:
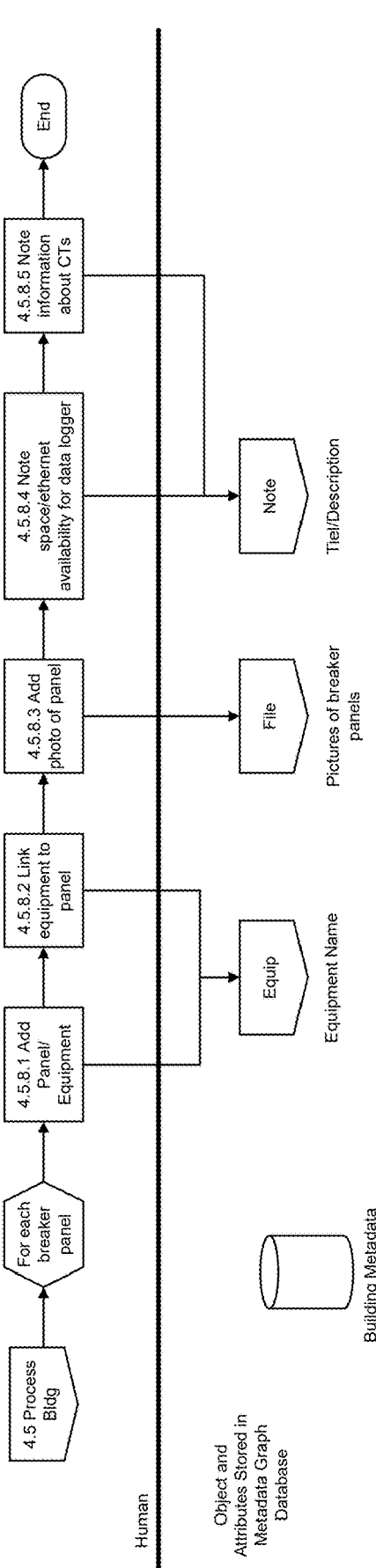
Figure 6T:
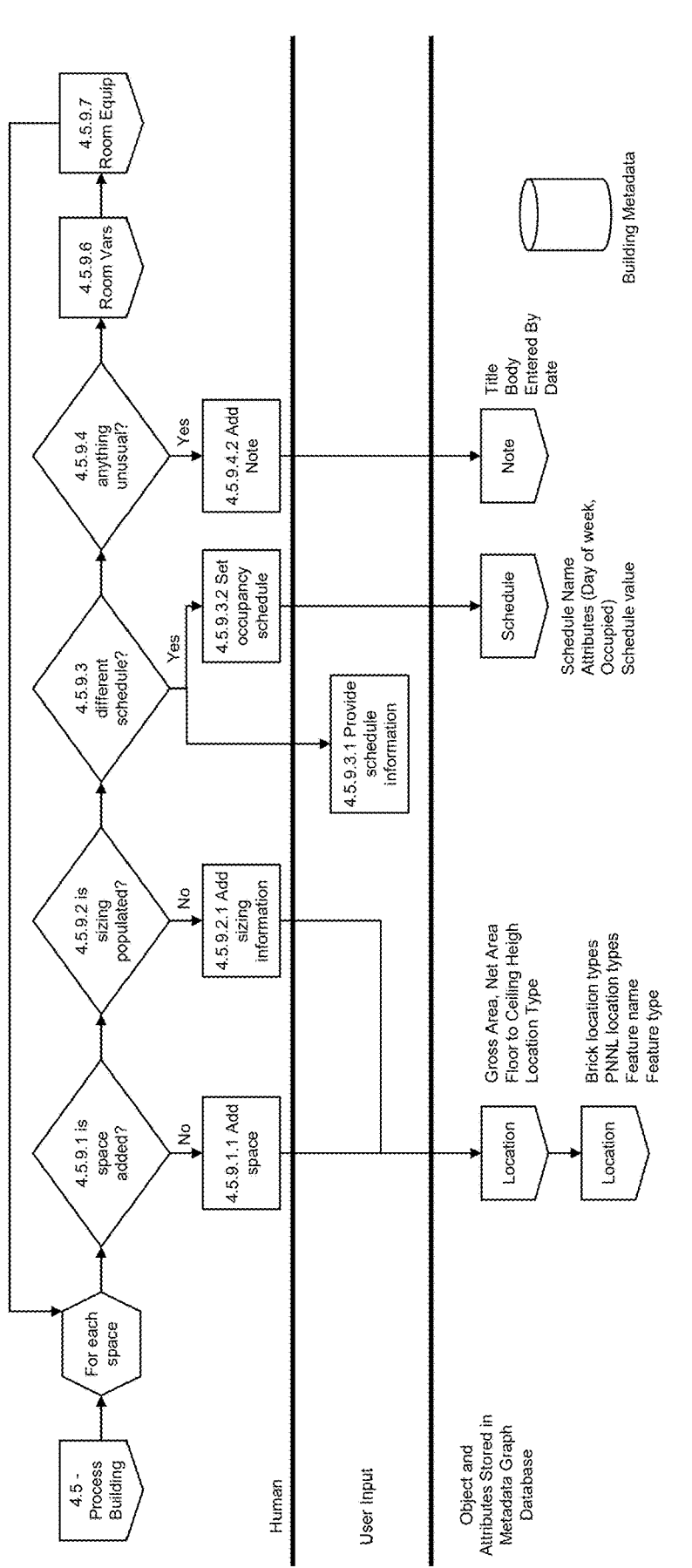
Figure 6U:
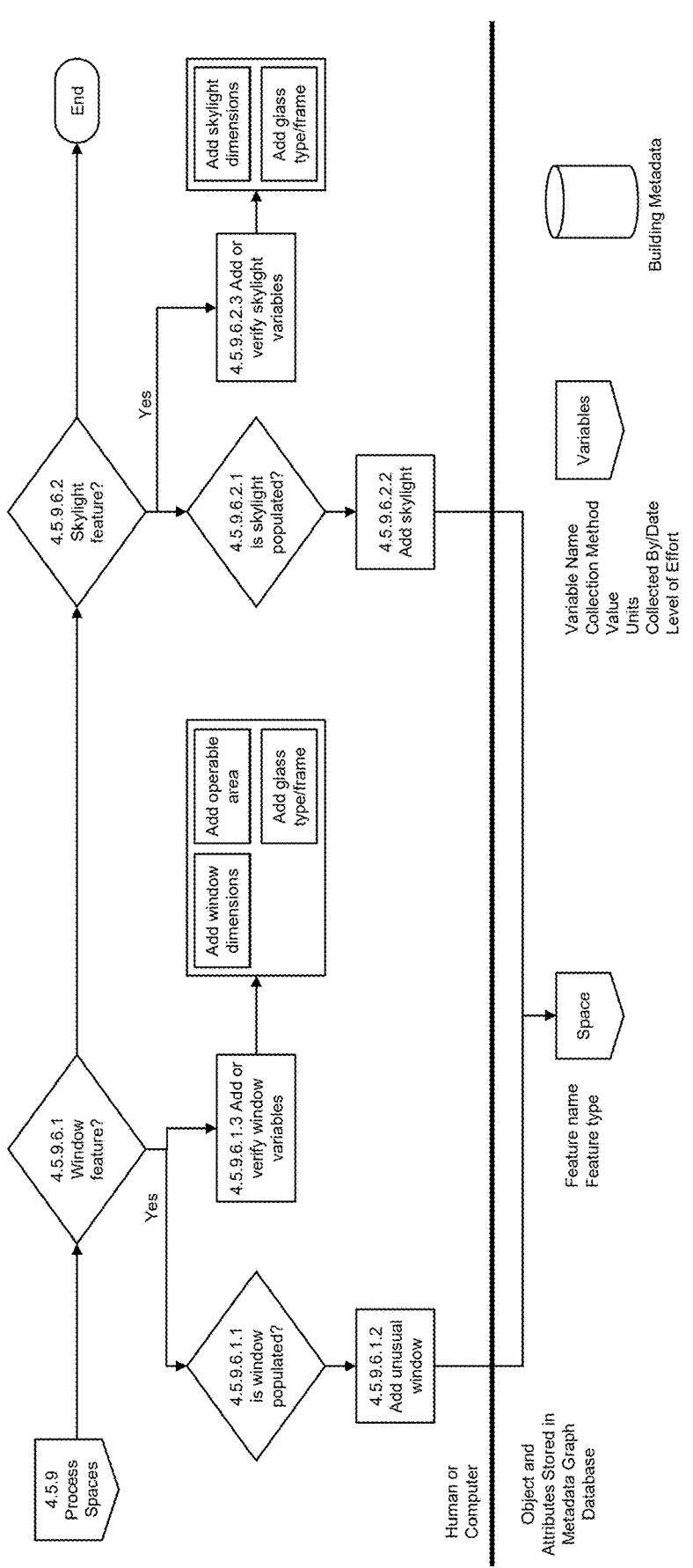
Figure 6V:
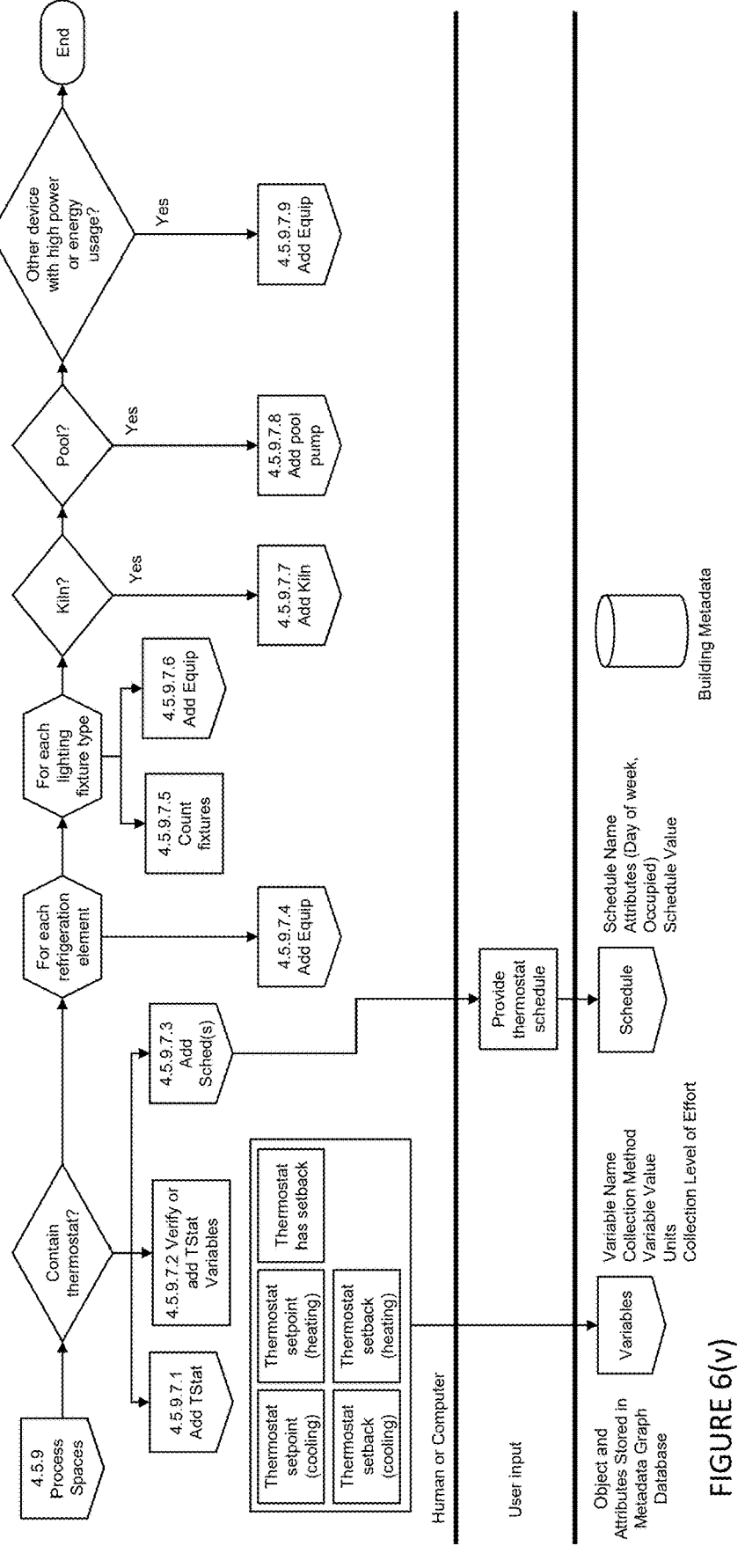
Figure 6W:
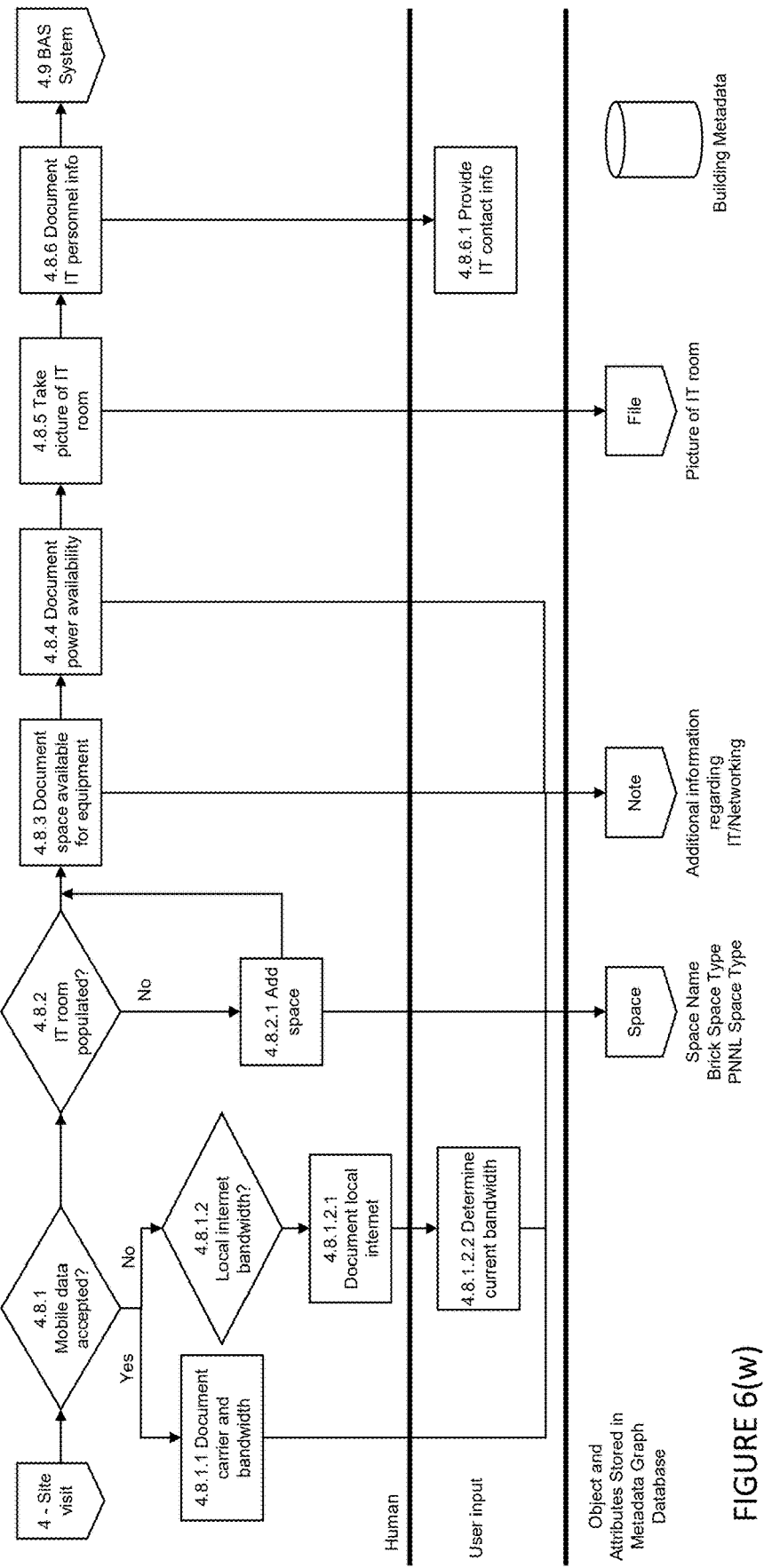

In some embodiments the Data Collection Workflows generated in Stage 2 may be performed in accordance with the process flows illustrated in FIGS. 1(d) and 6(a)-6(w), as non-limiting examples. Data Collection Workflows contain sequential steps and related documents and instructions for collecting data on building, equipment and other parameter sets for which values/variables are required to generate an energy control model. A parameter set and the values/variables required can have multiple Data Collection Workflows defined that can be performed by a human and/or a computer.

For example, a parameter measuring building envelope attributes may require specific values and variables for the window and wall measurements to calculate window to wall ratio and heat transfer rates in the resulting energy model. Multiple Data Collection Workflow and Data Collector combinations can be used to provide this value/variable, such as: an as-built document reviewed by a building engineer, or an object detection algorithm applied to a publicly available street view image. A variety of external data sources may be utilized. Examples include, but are not limited to or required to include:

Real estate APIs;

ASHRAE 90.1 building prototype data;

Parameter estimates based on the age of the building or equipment; or

Templates created from other buildings of a similar type in the same geographical region or constructed as a default for a particular site;

Optical Character Recognition (OCR) may be used to detect printed or handwritten text characters inside uploaded digital images and documents;

Algorithmic feature recognition based on specific building unit or equipment properties may also be utilized.

Requirements for the initial set of parameters may be translated into multiple Data Collection Workflows where each workflow step is carried out by a computer, and/or human field Data Collector using flow charts and checklists, automated spreadsheets, or custom web interfaces, as non-limiting examples. For a human collector, start/stop timers, automated screen capture/keylogging, automated screenshots, and level of mousing/clicking in 10-minute intervals (as non-limiting examples) may be used to generate timestamps for each process step in the workflow.

For computer Data Collectors, Data Collection Workflow steps are typically implemented by one or more modules of software code/instructions that are maintained on and executed by one or more servers that are part of the platform's Application Server Tier (see FIG. 5(b)). Timestamps are generated using the current date and time, obtained from the operating system when the functions, methods, processes, or operations as determined by the execution of a software application or set of instructions for each workflow step begin or end. This information is formatted according to a specified standard, such as Unix time or a custom date/time format, for use in tracking events or recording data.

Timestamps are used to calculate cost estimates (whether in processing cost for a computer and/or hourly rate for a classification of worker). Each Data Collection Workflow is then characterized by the average time, cost, and duration to complete the entire workflow.

Figure 1E:
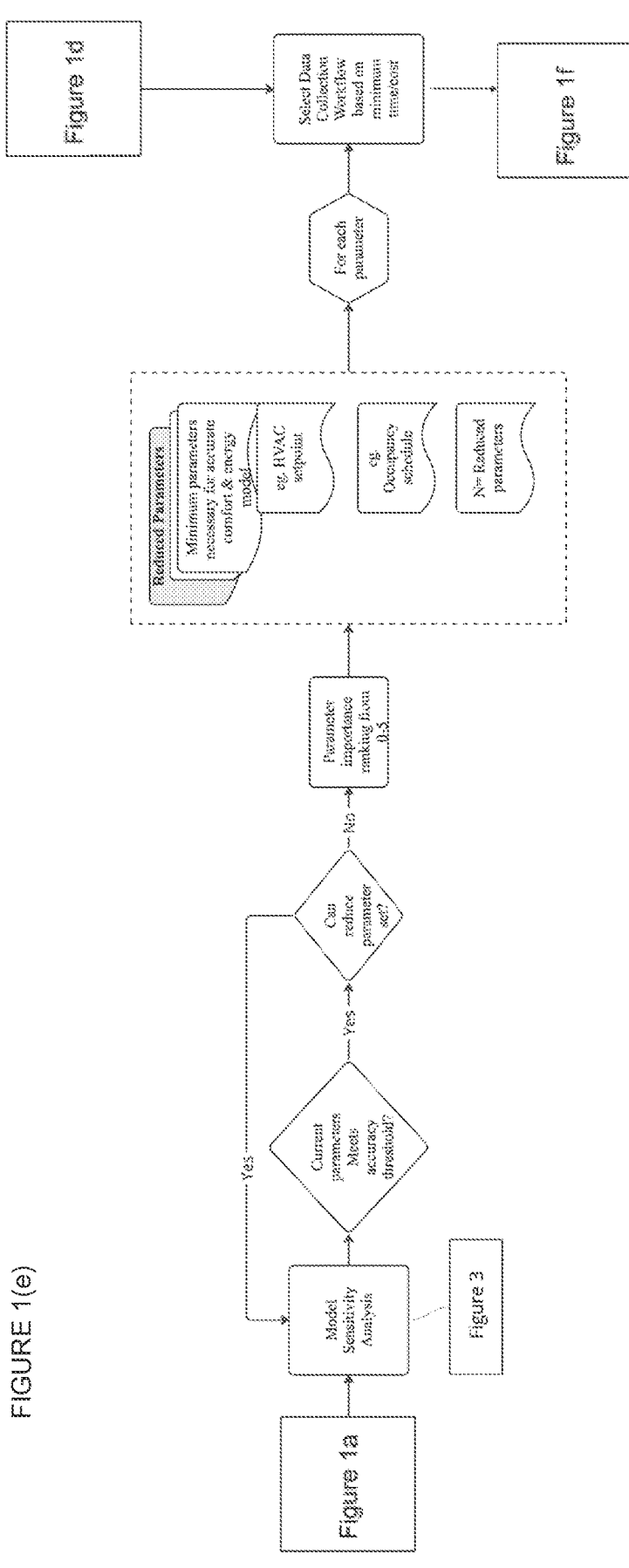
Figure 3:
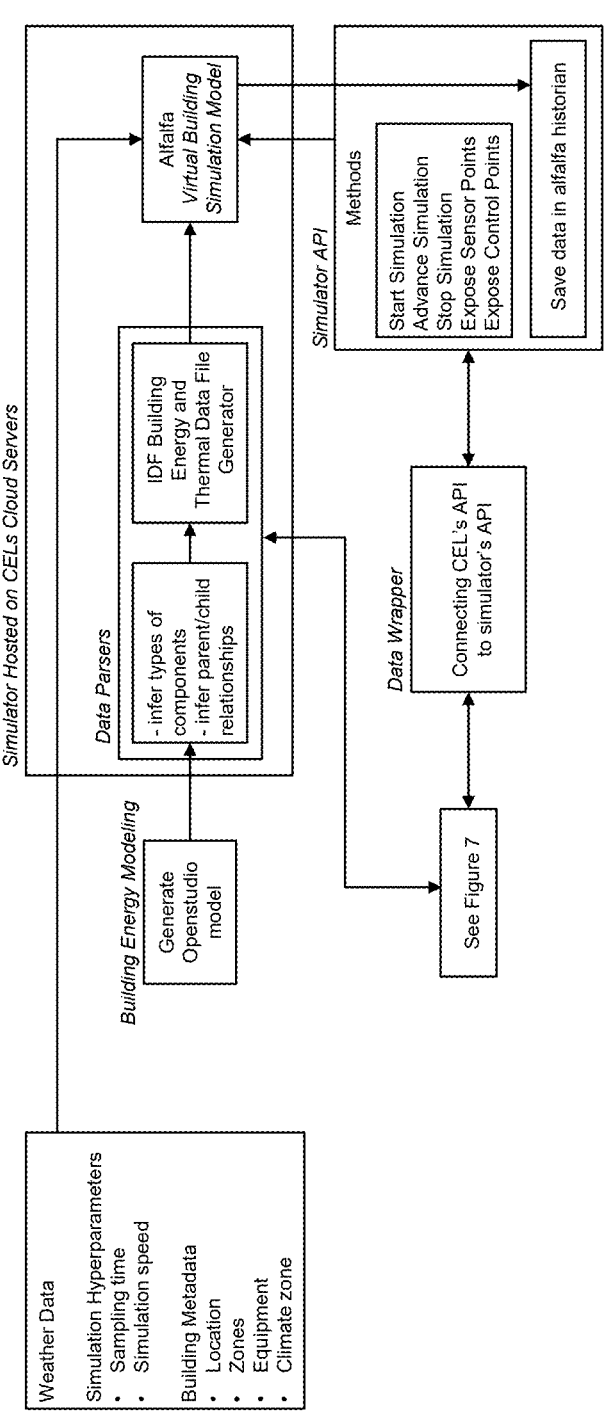
FIG. 3 is a flowchart or flow diagram illustrating a method, process, set of operations, or set of functions for simulating building data in order to conduct a sensitivity analysis used to reduce the initial set of parameters, in accordance with some embodiments.

Stage 3—Reduce Set of Data Parameters:

To save data collection time/cost and to improve data accuracy through reducing opportunity for user error, the following steps or stages may be used to reduce the initial set of parameters to be collected through a parameter sensitivity analysis in concert with applied learnings from actual data collection. In some embodiments these steps may be carried out by a computer and building energy simulation software, APIs and code (as illustrated in FIGS. 1(e) and 3), as examples.

For example, the initial set of parameters may be reduced by evaluating the impact on energy control model calculations and energy management system outputs using a sensitivity analysis that examines, for every parameter removed, whether or not the model can meet a predetermined accuracy threshold for a prediction of outputs (such as indoor air temperature (comfort) or energy as used in an energy management system). For an example of this process, see the step labeled "Model Sensitivity Analysis" through the decision logic "Can reduce parameter set?" of FIG. 1(e). A further example of one embodiment is shown in FIG. 3.

The resulting reduced parameter set is a combination of the minimum parameters required to meet the prediction threshold for a use case. As an example, in one embodiment the disclosed and/or described system may rank parameters and outputs by the minimum parameters required to generate an energy control model that can predict indoor air temperature with 70% accuracy and within plus or minus half a degree Celsius over a 6-hour time horizon to provide occupant thermal comfort while conserving energy. For this particular use case and accuracy threshold, the volume of the zones, window dimensions, window directionality, HVAC size, and HVAC fuel type are examples of parameters to be collected to accurately configure the energy control model for use in an energy management system.

Results from a simulation conducted by the inventors during research and development of the disclosed approach combined with initial field study data suggested that one could safely eliminate 326 parameters from a total of 435 parameters.

During the analysis, each parameter is ranked with an importance ranking, ranging from 0-5, which indicates how sensitive the building model is to having an accurate estimate of the parameter, with 5 being the most sensitive and 0 the least. A reduced parameter set for that use case will be the minimum set of parameters necessary to meet the accuracy threshold for the use case.

For each parameter in the reduced parameter set a human and/or computer may sort the Data Collection Workflows available for the parameter in question and select the Data Collection Workflow from the potential set of workflows based on the minimum time/cost and duration, repeating this step until a Data Collection Workflow has been selected for every parameter in the reduced parameter set (as illustrated in FIG. 1(e).

In conventional building energy management data collection processes, this step is missing. For example, in a typical K12 primary school the number of measured building parameters for model-based building energy management can be as many as 435 data values/variables—many of which a human would either collect in the field or calculate from collected field data. In contrast, in some cases, the disclosed approach has been able to reduce this number to 20 or fewer parameters without adversely impacting model configuration or prediction accuracy of a resultant model or supervisory control application. The reduced number of parameters requiring values/variables to be measured using the disclosed and/or described Data Collection Workflows provides savings of time and reduces potential for collection and data input errors in configuring an energy control model or models.

Stage 4—Generate Simplified Workflow for Data Collector:

Based on the remaining data collection requirements for the reduced set of parameters a human and/or computer selects a simplified Data Collection Workflow or workflows to collect data that meets the requirements for the reduced set of parameters. For each of the reduced set of parameters a human and/or computer selects the Data Collection Workflow(s) with the minimum time/cost for collecting values/variables necessary to generate an energy control model using the reduced parameter set. In some embodiments, one or more of the operations, functions, processes, or methods disclosed herein may be implemented as illustrated in FIGS. 1(d)-(g).

FIGS. 5 and 5(a)-(c) are diagrams illustrating an architecture for a multi-tenant or SaaS platform that may be used in implementing one embodiment of the systems and methods disclosed herein. FIG. 8 is a flowchart or flow diagram illustrating a method, process, set of operations, or set of functions that in some embodiments can be used to store and/or access data related to the parameter values/variables collected using the Data Collection Workflows.

As described further herein, in some embodiments, the backend of the disclosed system enables either a human and/or a computer to input values into the reduced set of parameters for use by an energy control model without significant (if any) further transformation (as suggested by FIG. 8). The inputs may be automated spreadsheets, custom web interfaces or customer relation management systems, as non-limiting examples (as illustrated in FIGS. 1(f), and 5, 5(a)-5(b)). In some embodiments of STAGE 4 (Generate Simplified Workflow for Data Collector), the simplified data collection may be performed in accordance with one or a combination of Data Collection Workflows (as illustrated in FIGS. 6(a)-6(w) as examples).

In some embodiments of STAGE 4 (Generate Simplified Workflow for Data Collector), the data collection stage may utilize one or more system elements or components to input, store, access, retrieve, and/or modify the data requirements specified in a Data Collection Workflow. The requirements of that system include, but are not limited to (or required to include):

The system should provide the ability to search for sites, buildings, rooms, zones, equipment, products, and related time-series data via the main page of the system and any subpages that are not correlated to a specific element type;

The system should provide the ability to search within a site for buildings, rooms, zones, and equipment and related time-series data;

The system should provide the ability to search within a building for rooms, zones, and equipment and related time-series data;

The system should provide the ability to search within a zone for rooms and equipment;

For data collection and retrieval workflows requiring a human Data Collector, the system should provide links on any given page to allow the user to easily navigate to the top-level element of that location. For example, the links on a piece of equipment located in a space would include Site>Building>Floor>Space with a link to these elements;

The system should allow "traversal queries" based on the application of graph algorithms to find patterns, paths, and other relationships in the existing datasets.

In some embodiments, the Data Collection Workflow(s) selected may be performed by a computer. Such functions are carried out by modules of software code/instructions that perform data collection and transfer through automated means such as fetching data via APIs, through OCR or feature recognition algorithms, or through the application of graph traversal which explores and navigates a graph database structure to retrieve, analyze, or modify data. Examples may include, but are not limited to:

Populate Building Variable Defaults from ASHRAE Building Prototype Data;

Fill in Equipment Variables based on Equipment Age and Relevant Codes;

Fill in Equipment Variables Based on ASHRAE Building Prototypes;

Fill in Building and/or Equipment Variables based on the application of graph traversal algorithms to find patterns, paths, and/or other relationships in existing datasets;

Fill in Building and/or Equipment Variables based on the application of algorithmic feature recognition of specific building unit or equipment properties.

As an example, in one embodiment the Data Collection Workflow may be carried out by a computer that retrieves values based primarily on the initial ASHRAE building prototype model. Values for the reduced set of parameters specified in STAGE 3 are then simulated using, for example, ASHRAE/Openstudio reference models with "high" and "low" potential value ranges for each of the reduced set of parameters. The simulation may generate energy control model calculations and energy management system outputs using prototypes from these "high" and "low" parameter value ranges and then populate the parameter value using an average or statistically derived default value from the range (as suggested by FIG. 3). Those parameter variables identified as controlling the most significant difference between the high and low model outputs may be flagged for verification by the Data Collector, who in this or future stages may access the values through a system that allows input, storage, access, retrieval, or modification of the values (as an example see FIGS. 5, 5(a)-(c) and 7)).

Figure 1F:
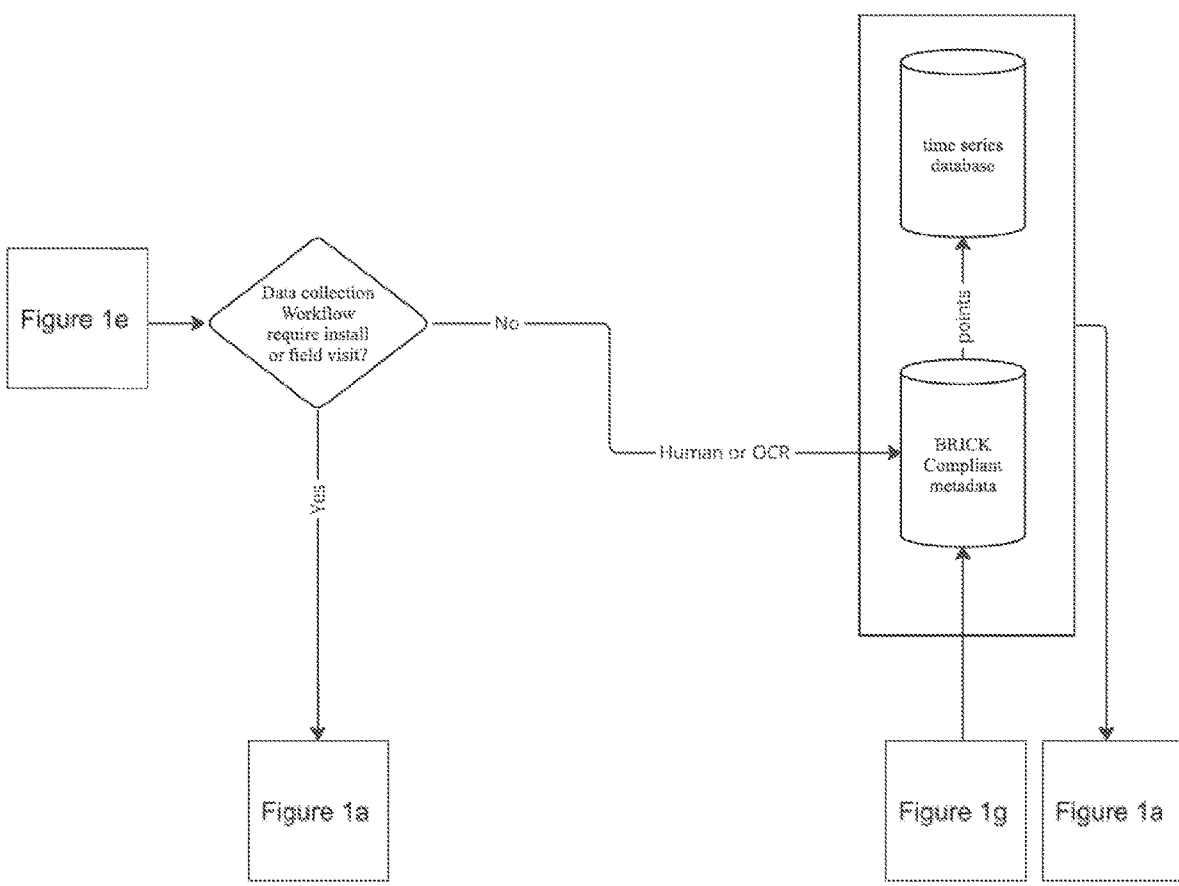

In some embodiments values, values/variables may be obtained via "traversal queries" based on the application of graph algorithms to find patterns, paths, and other relationships in the existing building and equipment datasets (See FIGS. 1(f), 3, and 7). In this embodiment a software code/instruction executes a traversal query to retrieve, analyze, modify, or transform data that has been placed into a graph database through Data Collection Workflows. This data may include (but is not limited to or required to include) weather data collection through a weather API, time-series sensor data collected from temperature and $CO_2$ sensors in a building, or Data Collector or User Inputs regarding heating and cooling setpoints and schedules (See FIG. 7).

As described in further detail below (in the metadata and inputs sections) and illustrated in FIG. 8 the CEL Data Ontology Mapping Service allows "traversal queries" based on the application of graph algorithms to find patterns, paths, and other relationships in this complex dataset (including Metadata and Time Series Data) that can then be used to update values for a reduced set of energy control model parameters. These modules and other applications and functionalities may advantageously be integrated and executed by a single code base accessing one or more integrated databases as necessary. The data is then retrieved, analyzed, modified, or transformed to specify values for the reduced parameter set.

Traversal queries provide a powerful way to navigate and explore connected data structures such as graphs. They enable efficient and flexible retrieval of related data, allowing for deep exploration of relationships and uncovering complex patterns. Traversal queries facilitate advanced analytics, recommendation systems, and graph-based data modeling, enhancing decision-making and insights. Enabling code to execute Data Collection Workflows using traversal queries is a less expensive and often more accurate means to quickly estimate parameter values for building energy control model development. It is also well suited to building thermal dynamic data.

While building (site) data is hierarchical by nature (e.g., a room is part of a building, and a building is a part of a site, etc.), the relationships of the rooms as they are combined into heating/cooling zones, which equipment is connected to which zones, or which share walls (as examples) can be complex. Graph traversal queries quickly and affordably display these relationships for human understanding and machine readability, while retrieving values for the reduced set of parameters, which is important for accurately configuring a building energy control model capable of balancing occupant comfort with energy use. For example, knowing the relationship between the number of zones and spaces within a building is important for the development of a simplistic Resistance Capacitance Model used in operational MPC, or energy model control. Understanding the relationships between heating and cooling zones using a traversal query of a graph database makes calculating impedance faster and more accurate than a human calculation or data entry.

As is illustrated in FIG. 8, MPC and control function(s) do not have to be the only endpoint/use case for the models generated using inputs derived from the queries. Values derived from collected site data may be used in different applications and models that require building data. The models may include machine learning (ML) models, where a portion of the collected site data and schema/ontology may be used to label or annotate training data, may include a set of generated rules that define operational parameters for a control system, may assess and improve indoor thermal comfort, may analyze the impact of climate conditions (such as outdoor air temperature) on building performance and energy consumption for code compliance, or may assess the impact of occupancy patterns and usage scenarios on energy demand as examples, as non-limiting examples.

In some embodiments, Data Collection Workflows required to collect remaining values/variables may guide the Data Collector through input fields that are required to collect values that are missing. This differs from standard practice which typically collects all elements for all users. In some embodiments, the values may be collected through automated spreadsheets, custom web interfaces or customer relation management systems, as non-limiting examples (and as illustrated in FIGS. 1(e), 1(f), 4 and 7)).

For those Data Collection Workflows that require a field visit or sensor installation, the Data Collector conducts a Site Visit focused on collecting site data and verifying data inputs flagged for review at the structure in accordance with the site Data Collection Workflow or workflows.

In some embodiments, based on the data collection requirements for the remaining set of reduced parameters, a computer process collates the outputs from automated Data Collection Workflows with outputs from Data Collection Workflows carried out by human Data Collectors, as illustrated in FIGS. 1(f) and 7.

Figure 1G:
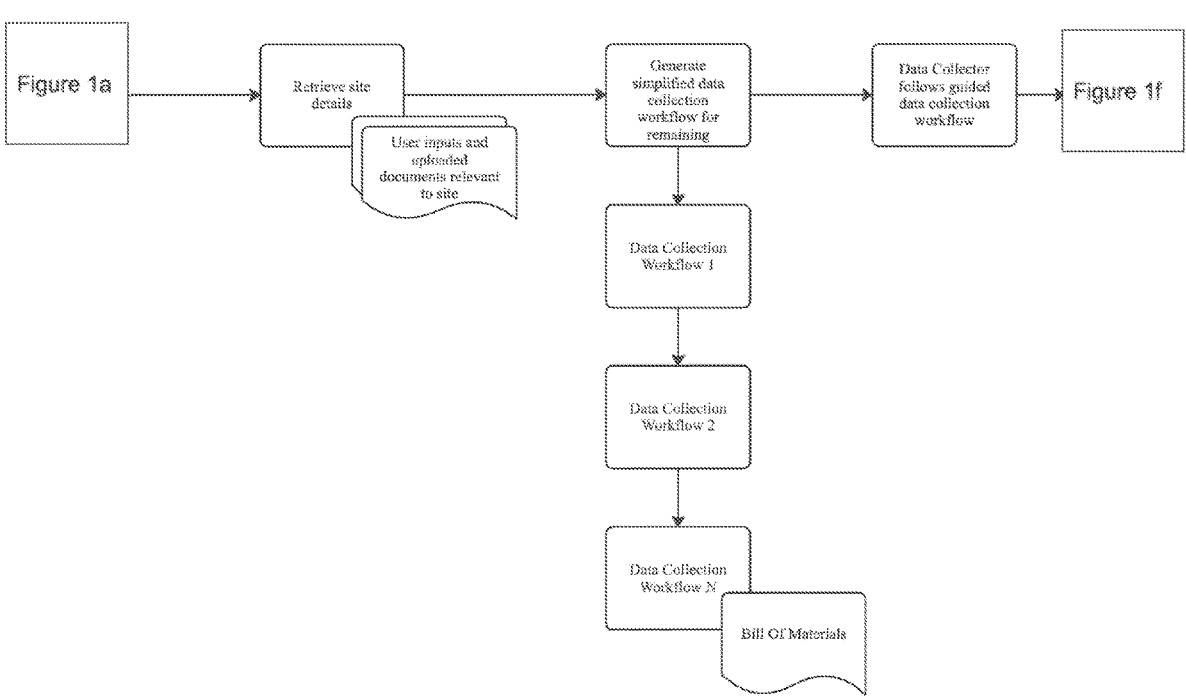
Figure 1H:
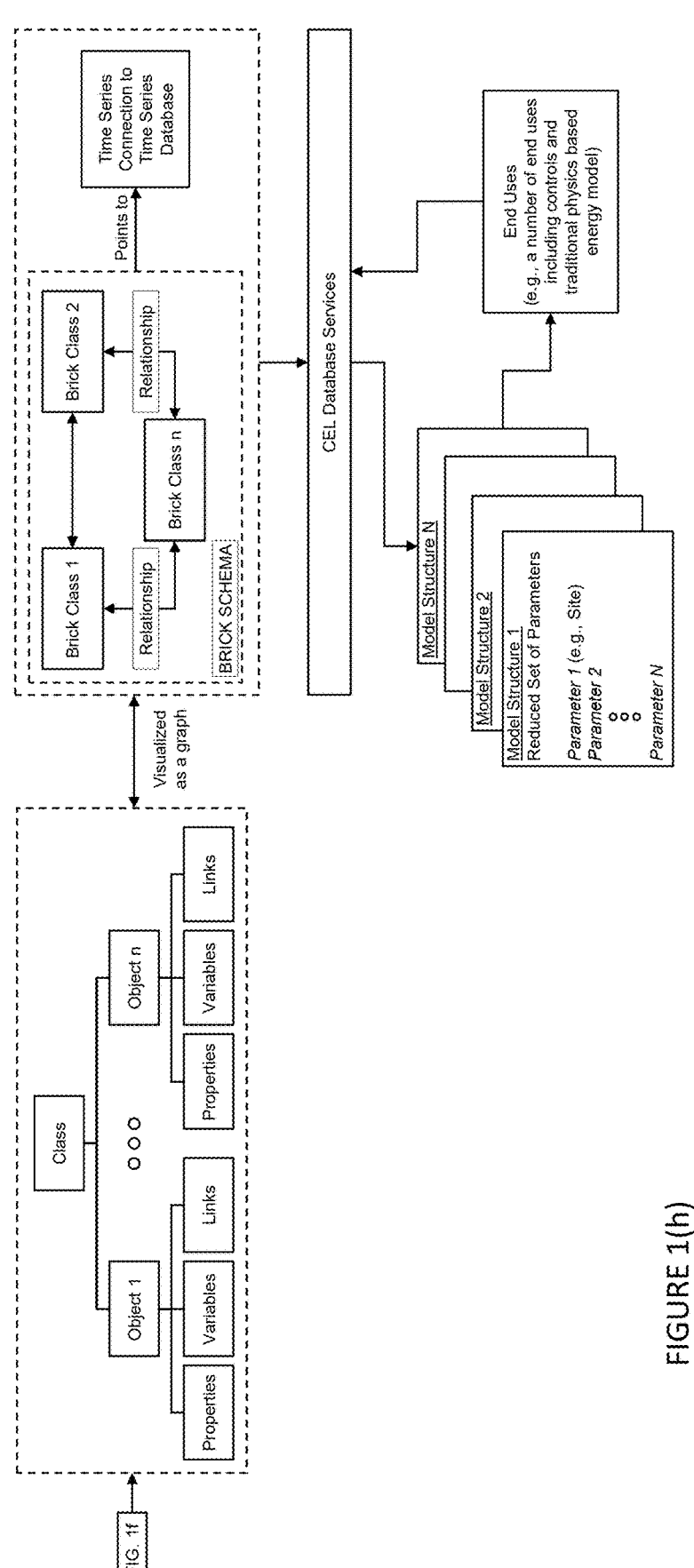
FIG. 1(h) is a flowchart or flow diagram illustrating a method, process, set of operations, or set of functions for collecting data used to configure an energy control model for use in an energy management system, in accordance with some embodiments.

The workflows required to collect the remaining variables are obtained in the same manner as described above. A computer process and/or human selects the Data Collection Workflow or workflows with the minimum time/cost for collecting the remaining values necessary to configure an accurate energy control model using a reduced set of parameters. A computer generates a guided Data Collection Workflow that a Data Collector can use for either collecting or verifying flagged values for those variables remaining in a reduced set of parameters (as illustrated in FIGS. 1(g), 5 and 7).

The simplified Data Collection Workflow for the field visit or install may include but is not limited to retrieval of data collection steps and relevant site details (documents such as user notes, and any uploaded documents such as mechanical or electrical drawings), parameter verification task descriptions, sensor installation, commissioning and data verification task descriptions, bills of materials, or other site, building, equipment, product, space, or zone details.

In some embodiments, a human Data Collector may follow a guided Data Collection Workflow generated by software code that may be implemented using devices (including mobile devices), software applications, systems, apparatuses, networks, or other configurable components that may be used by multiple users for data entry, data processing, application execution, data review, and which have user interfaces or user interface components that can be configured to present an interface to a user as is illustrated in FIGS. 5, 5(*a*)-(*c*).

The guided Data Collection Workflow walks the Data Collector through installation steps and data collection fields required by their particular use case during a Site Visit. The guided Data Collection Workflow provides instructions, documents, information, and data input fields for missing or flagged values necessary to configure an accurate energy control model using a reduced set of parameters. Thus, the data collection process is streamlined, changing the focus of a Site Visit or installation to verification of a small subset of the reduced set of parameters rather than data collection for all values/variables for an initial set of parameters as might be done in standard practice.

In this step or stage, the data gathered through the guided Data Collection Workflow is intended to verify any constraints or to collect any remaining values/variables needed for operational control. Such variables may include but are not limited to (or required to include):

The operating data points (telemetry, or time series data) that are to be collected from the site;

Communication interfaces and details from device endpoints (such as equipment drivers and gateways) necessary to read/transmit time series data from and write/control commands to the structure or related equipment;

The operational constraints of the equipment (such as when a structure is occupied and at what temperature range indoor zones should be maintained during occupied hours);

The equipment setpoints that need to be modified; and

Any missing data required to configure the energy control model or effectuate control.

Data collection workflows contained in the guided data collection, may make recommendations for additional sensors to be installed or activated to increase the accuracy of resulting model(s), or to allow remote, autonomous, and continuous commissioning of the MPC. In traditional building energy modeling and control applications, this step is missing, requiring multiple trips to troubleshoot monitoring equipment and to tune or recommission the energy model or controllers.

A final step in some embodiments is installation at the site of new sensor and gateway devices to connect the building to the building energy management service running in a cloud data center (See FIGS. 5 and 7). These devices are configured using the data collection points and setpoints determined in the previous steps. The installers (who are typically the same as the Data Collector) commission the gateway devices, sensors, and data loggers, and connect them over the Internet into the building energy management service. The installers also educate the building management team on how to operate the service through configuring their dashboard, and commence calibration, measurement, and verification activities for activation and operation of the service. The data collection carried out in previous steps and information presented in the guided Data Collection Workflow allows the installers to plug the required equipment and sensors in and begin measurement and verification activities immediately.

Generating the Simplified Workflow for Data Collector (Stage 4) represents a significant advancement in the state of the art. In common practice this step is missing. Most building energy management systems use rules-based control or PID controllers for energy control applications.

As described, rules-based control, also known as heuristic control or expert systems, relies on a set of predefined rules to determine control actions. These rules are typically derived from expert knowledge and experience in the specific domain. The control actions are based on if-then conditions, where the system's current state triggers specific actions according to the rules. Rules-based control is relatively straightforward to implement and interpret, making it suitable for simple systems or applications where explicit knowledge is available. However, it may not handle complex or uncertain situations such as changes in occupancy, utility rates, or balancing energy reduction strategies with occupant thermal comfort.

As also described, PID (Proportional-Integral-Derivative) controllers are a widely used type of feedback control. They are based on continuously measuring a system's output and adjusting the control signal based on the error between the desired setpoint and the actual value. A control signal is calculated by combining three terms: the proportional term, which responds proportionally to the current error; the integral term, which accumulates past errors to eliminate steady-state errors; and the derivative term, which anticipates future errors based on the rate of change. PID controllers, while ideal for use cases such as optimal startup of a single HVAC system in one building zone, lack the ability to perform supervisory controls of multiple structures or systems to meet complex or multivariate objectives.

Further, as described, Model Predictive Control (MPC) is a control strategy that utilizes a mathematical model of the system being controlled to make predictions about its future behavior. It considers both the current state of the system and the future trajectory to determine optimal control actions. MPC formulates an optimization problem based on a cost function and system dynamics and solves it repeatedly over a finite time horizon. It is known for its ability to handle constraints and multivariable systems effectively. MPC is commonly used in complex industrial processes, such as chemical plants and power systems and is well suited to evolving use cases in building operations (such as balancing energy cost and usage with thermal comfort in commercial building structures and systems).

Rules-based and PID controllers and other forms of operational control cannot handle both occupant comfort constraints and energy usage. For these use cases rules-based and PID controllers typically require multiple trips to the site because the controls require expert tuning after a building energy management service is activated any time there is a significant change in operating conditions or constraints. The disclosed guided workflow(s) address this concern by functioning as a "pre-flight" checklist, guiding the Site Visit to ensure that the Data Collector conducting the visit verifies and collects the variables needed for model input, parameter configuration, and model configuration. The model functions as a "brain" that can be updated remotely and solve for new and emerging operating conditions or constraints via MPC.

As is illustrated in FIGS. 7 and 8, in some embodiments, the energy control model structure is stored within an operating environment that has read and write access to building equipment, drivers, and equipment which means software/code instructions can continually update the energy control model. This enables continuous, autonomous operation and model commissioning, thus largely eliminating a need to return to the site after the building energy management service has been activated.

As mentioned, a barrier to use of MPC approaches for operational control in buildings is the degree of cost and difficulty necessary to collect the values necessary to generate an energy control model that can accurately predict both energy usage and indoor air temperature for operational control. Building energy models in their customary usage are typically employed to evaluate tradeoffs in construction and system design decisions, allowing designers to ask questions such as "Should we install a heat pump or a dual expansion unit?", or "How much insulation should we use?" and to use the model to approximate the comfort/energy tradeoffs inherent in such design decisions.

In standard practice most mathematical energy models are not used for operational control. The comfort and energy savings produced by such models are often not sufficiently accurate when compared to actual measured operating energy or indoor air temperatures. Without significant model retuning and commissioning involving multiple additional trips to the site, expert analysis of energy bills, and highly bespoke rules-based and PID control logic, in common practice approaches to building energy models are typically too expensive to use in control applications for buildings.

In the standard approach to model data collection the Site Visit (or audit) is a long and expensive process for both the Data Collector and the customer. The sheer quantity and range of many building parameters are large. In a conventional approach, most of the parameter values are gathered during the Site Visit, or audit. Standard collection practices are carried out by a human Data Collector who gathers various media (paper, photographs, recordings) and then transforms or transcribes the values before entering them into either an open source (such as Energy Plus) or a proprietary energy modeling application.

The Site Visit, or audit, often takes more than one day to complete (typically 32-86 hours), and data must be both collected and transcribed in non-standard ways, resulting in disjointed, inaccurate, and expensive data cleaning at later stages in the modeling and building energy management process. The disclosed guided workflow is focused on collecting only a subset of the data required for parameter definition in the specific customer's use case. Streamlining the process in this way may allow even a Data Collector or field technician with less than one day of training to accurately complete a Site Visit in as little as 2-6 hours (for a 30,000 and 200,000 square foot campus, respectively.

Generating the Simplified Workflow for Data Collector (Stage 4) enables the dynamic and flexible control capability of MPC for operational control without the time, cost, or inconvenience of standard approaches to both operational control and model data collection. Generating the Simplified Workflow for Data Collector makes the Site Visit less chaotic, less time consuming, less complex, less expensive, and more likely to capture data that can be used to generate an energy control model that accurately predicts and continuously controls building energy and comfort. Guiding data collection through simplified workflows during the Site Visit step focuses Data Collector time on verifying the value of specific parameters, rather than first having to determine whether the parameters are necessary or available on-site, thereby increasing the accuracy of the outcome and reducing the time required for the Site Visit step.

As the Data Collector completes each step in the Data Collection Workflows, timestamps on each workflow step and the hourly rate, or computer cost of the identified Data Collector are stored with the Data Collection Workflows used (See FIG. 1(d)). As described herein, this time/cost information is then incorporated into logic used to select Data Collection Workflows for future sites. In some embodiments, the parameters/variables are also ranked by the difficulty of obtaining an accurate estimate as:

Easy: less than 1 minute;

Medium: less than 10 minutes; or

Hard: less than 60 minutes.

In some embodiments the rankings may also be used to provide guidance to the Data Collector about which values/variables to spend the most time on to obtain an accurate estimate.

In some cases, parameters that might be used in a model or control system are available via multiple methods, each with an associated cost in terms of time and resources. In the area of energy management, there are also a very large number of potentially useful parameters. Investigations conducted by the inventors during research and development of the disclosed approach included testing and collection of data using multiple collection methods. The inventors selected those methods that consistently provided faster, more consistent, and better results. For example, a data collection and processing flow that directed a data collection team to attempt to get data from multiple sources and/or to verify the data at multiple stages or steps of the system was utilized. This assisted in timing and understanding the difficulty of multiple collection methods and their respective accuracy.

Stage 5—Generate Inputs and Configuration Settings for an Energy Model

As is illustrated in FIGS. 7 and 8, in some embodiments the site data collected are used in at least two areas of an overall energy control model. These are (a) Metadata collected that describes the thermal footprint of the building and the equipment inside—this metadata is provided as a feed to the supervisory control algorithms (enabling the controls to more accurately predict the impact that each control decision will have on occupant thermal comfort in addition to energy use), and (b) the data points associated with an item of equipment are added automatically to configuration files that are used in an edge device as an ingress of data for the supervisory controls and an egress to send control updates from the supervisory control algorithms to the building or equipment associated with that point (as an example, see FIG. 7 and the portion of that figure associated with the "TimeSeries Data Bus" element). The data received may be stored in a historical timeseries database (as illustrated in FIG. 7) with a key that is part of the data point in the metadata database, as illustrated in FIG. 7 and the portion of that figure associated with the "Time Series Connection" element.

In some embodiments, the disclosed system and methods may comprise elements, components, or processes that are configured and operate to:

Obtain a Set of Possible Structure or Energy Management System Parameters—these may be obtained from information regarding a specific structure (collected on-site, obtained from a publicly available database, or obtained from plans or construction documents), or information regarding a class of structures (such as building requirements, public records or databases, or building codes), as examples;

Create Data Schema—generate a Brick[6] compliant ontology or graph schema format;

Construct Graph Database Using the Created Schema;

[6] Brick is an ontology-based metadata schema that captures the entities and relationships necessary for effective representations of buildings and their subsystems. Brick describes buildings in a machine-readable format to enable programmatic exploration of different operational, structural, and functional facets of a building.

Perform a Sensitivity Analysis to Reduce Set of Possible Structure or System Parameters—Evaluate the impact of removing one or more building structure or equipment parameters on the predictive accuracy of one or more models of energy consumption, air flow, or temperature distribution, as non-limiting examples;

Selected a Simplified Data Collection Workflow Based on the Reduced Set of System Parameters;

Collect Site Data and Place into Graph and/or Relational Database—In some embodiments, the site data may be collected (in whole or in part) in accordance with the process flow described in FIGS. 1(a)-1(g); and Generate Inputs and/or Configuration Settings for Energy Model(s) Based on Site Data in Database—Use the Collected Data and/or Data Obtained from External Database(s) to Generate Model Inputs, Constraints, or Configuration Parameters, as non-limiting examples.

The data collected in stages or steps 1-4 is transferred from the Data Collection Workflows through either an API or web interface, handled through a CEL Data Ontology Mapping Service and placed into a brick compliant metadata and/or time series database which is used to generate inputs and configuration settings for an energy control model. A high-level overview of this process is illustrated in FIGS. 1(h) and 8.

Collecting site data and placing into a graph database is recommended for compliance with the Brick ontology, and because graph databases provide graph models to represent relationships in data that enable algorithm-driven (and less expensive) building energy control model development; Prior to and following the reduction in the set of parameters (STAGE 3), a common data schema/structure is defined and constructed.

In one embodiment, a foundation of the database schema is the standard Brick ontology, which is an open-source effort to standardize semantic descriptions of the physical, logical, and virtual assets in buildings and the relationships between them, and an emerging ASHRAE standard. However, there are multiple parameters that influence building energy use and occupant comfort (e.g., specific building occupancy schedules) that are not part of this standard. To address this situation, the database schema may be augmented with additional schema to accommodate additional classes of data and information into a Common Information Model (CIM) as is illustrated in FIG. 8 "CEL Brick Data Ontology". This CIM allows each Data Collection Workflow to be interoperable with backend databases and eventual integration with energy control models and end uses and embodiments of such models—such as MPC.

As illustrated in FIG. 7, in some embodiments, the collected data may be used to construct a thermal model of a structure. In such cases, the model may be used to "predict" the rate of change of the structure's temperature with respect to set points and other measured and unmeasured disturbances. This prediction allows the disclosed approach to explore multiple possible set points to reach the optimal ones that satisfy a specific objective, and to efficiently generate the data to configure a model of energy consumption for a building or location.

Building (site) data is by nature hierarchical (e.g., a room is part of a building, and a building is a part of a site, etc.), but the relationships of the rooms as they are combined into heating/cooling zones, which equipment is connected to which zones, or which share walls (as examples) is important for accurately configuring a building energy control model that is capable of balancing occupant comfort with energy use. One difference between a graph database and a more traditional relational database is that a graph contains both nodes, which represent the data being stored (the type and attributes), as well as the edges, which represent the relationship of the nodes to one another. Use of a graph database such as Graphdb therefore makes storing, accessing, and visualizing complex data relationships faster. It has important implications for predicting complex building thermal dynamics using data. For example, knowing the relationship between the number of zones and spaces within a building is important for the development of a simplistic Resistance Capacitance Model used in operational MPC, or energy model controls. Using Graphdb to understand the relationships between heating and cooling zones made calculating impedance faster and more accurate. This is also important when predicting the resulting thermal behavior of buildings after making a control action—a key factor in why MPC improves thermal comfort as well as saving energy.

Combining both the Brick ontology and Graphdb also enables retrieval of complex time-series and telemetry data that can be used for quick and autonomous tuning of the energy control model (See FIG. 8, TimeSeries Connection). Entries referencing "Equipment" in the graph database, such as thermostats or air handling units as examples, can point to a relational database that records the time-varying/time-series data generated by that equipment, such as temperature, humidity, airflow, power consumption, as examples. Using the Brick ontology and graph database allows "traversal queries" based on the application of graph algorithms to find patterns, paths, and other relationships in this complex dataset that can then be used to update values for a reduced set of energy control model parameters thereby reducing data collection requirements, saving time and money.

A graph schema, also known as a graph data model or graph schema definition, is a formal description of the structure and properties of a graph database. It defines the types of nodes (vertices) and relationships (edges) that can exist in the graph, as well as the properties associated with each node and relationship. In a graph schema, nodes typically represent entities or objects, while relationships represent the connections or associations between those entities. The schema defines the labels or types of nodes and relationships, as well as the properties or attributes that can be associated with them.

As an example, consider a Brick compliant graph schema. It might define nodes of type "HVAC" with properties such as "ID", "name." It might also define relationships of type "controls" with properties that specify the control relationship between a system and a building component, for example: HVAC System A controls Temperature Sensor 1, Lighting System A controls Room 101.

Graph schemas can be defined using various formal coding languages, such as the property graph model or the RDF (Resource Description Framework) model. These languages provide syntax and semantics for specifying the graph schema and querying the graph database. Having a well-defined graph schema helps in organizing and querying the data effectively, providing a clear understanding of the graph's structure and enabling efficient retrieval of information.

The schema specifies the structure and attributes of the graph, enabling the database to enforce data consistency and integrity. The actual schema may vary depending on the specific requirements and structure of the building being modeled. Using the site data collected in the schema as inputs to a configure an energy control model that can be transferred unaltered to either a software control platform, or to a traditional building energy modeling software application as is illustrated in FIG. 8, enables a level of automation and scalability not typical to conventional approaches to energy modeling or control.

Some of the Data Collection Workflows conventionally used by building energy managers rely on defaults based on building age and climate zone, as well as default parameter values by building type. Research related to the disclosure found that that actual data collection efforts demonstrated that application of traversal queries and the Brick ontology can produce more targeted and accurate default values and assumptions that can be used in the energy control model configuration process, resulting in faster, more cost-effective, and better outcomes in terms of comfort and energy savings, an example of which is illustrated in FIG. 7.

As a non-limiting example, in the field the disclosed approach using a combination of reduced parameters, user/computer inputs, and choosing a simplified workflow resulted in a nearly 80% reduction in expert Energy Modeler time and allowed more work to be done by non-expert personnel. Overall, the approximate cost savings through combining these methods delivered quality data (data that produced an energy control model with 70-90% accuracy) for 27-56% less money and 17-40% fewer hours than in typical site data collection workflows. Larger secondary school campuses saw cost and time savings of greater than 50%.

System Backend

Figure 4:
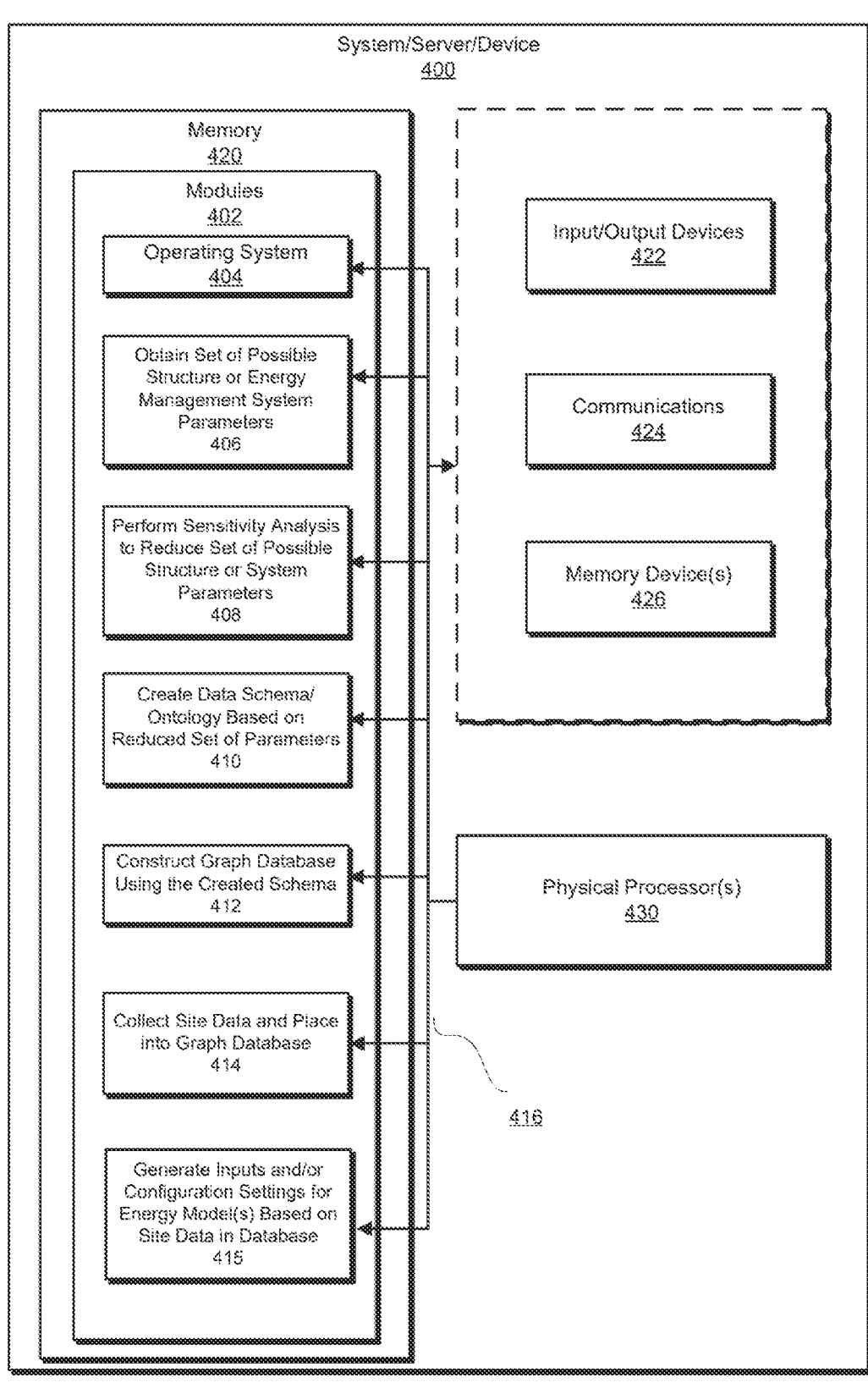
FIG. 4 is a diagram illustrating elements or components that may be present in a computer device, server, or system configured to implement a method, process, function, or operation in accordance with some embodiments.

FIG. 4 is a diagram illustrating elements, components, or processes that may be present in or executed by one or more of a computing device, server, platform, or system 400 configured to implement a method, process, function, or operation in accordance with some embodiments. In some embodiments, the disclosed system and methods may be implemented in the form of an apparatus or apparatuses (such as a server that is part of a system or platform, a client device, etc.) that includes a processing element and a set of executable instructions. The executable instructions may be part of a software application (or applications) and arranged into a software architecture.

In general, an embodiment of the disclosure may be implemented using a set of software instructions that are designed to be executed by a suitably programmed processing element (such as a GPU, TPU, QPU, state machine, CPU, microprocessor, processor, controller, or computing device, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

The modules and/or sub-modules may include a suitable computer-executable code or set of instructions, such as computer-executable code corresponding to a programming language. For example, programming language source code may be compiled into computer-executable code. Alternatively, or in addition, the programming language may be an interpreted programming language such as a scripting language.

As shown in FIG. 4, system 400 may represent one or more of a server, client device, platform, or other form of computing or data processing device. Modules 402 each contain a set of executable instructions, where when the set of instructions is executed by a suitable electronic processor (such as that indicated in the figure by "Physical Processor (s) 430"), system (or server, or device) 400 operates to perform a specific process, operation, function, or method.

Modules 402 may contain one or more sets of instructions for performing a method or function described with reference to the Figures, and the descriptions of the functions and operations provided in the specification. These modules may include those illustrated but may also include a greater number or fewer number than those illustrated. Further, the modules and the set of computer-executable instructions that are contained in the modules may be executed (in whole or in part) by the same processor or by more than a single processor. If executed by more than a single processor, the co-processors may be contained in different devices, for example a processor in a client device and a processor in a server.

Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing instructions. Bus or communications line 416 also permits processor(s) 430 to interact with other elements of system 400, such as input or output devices 422, communications elements 424 for exchanging data and information with devices external to system 400, and additional memory devices 426.

Each module or sub-module may correspond to a specific function, method, process, or operation that is implemented by execution of the instructions (in whole or in part) in the module or sub-module. Each module or sub-module may contain a set of computer-executable instructions that when executed by a programmed processor or co-processors cause the processor or co-processors (or a device, devices, server, or servers in which they are contained) to perform the specific function, method, process, or operation. As mentioned, an apparatus in which a processor or co-processor is contained may be one or both of a client device or a remote server or platform. Therefore, a module may contain instructions that are executed (in whole or in part) by the client device, the server or platform, or both. Such function, method, process, or operation may include those used to implement one or more aspects of the disclosed system and methods, such as for assisting with:

Obtain Set of Possible Structure or Energy Control Model Parameters (as suggested by module 406); May be obtained from information regarding a specific structure (collected on-site, obtained from a publicly available database, or obtained from plans or construction documents), or information regarding a class of structures (such as building requirements, public records or databases, or building codes, as examples);

Perform Sensitivity Analysis to Reduce Set of Possible Structure or System Parameters (as suggested by module 408); Evaluate impact of removal of one or more structure parameters to predictive accuracy of one or more models of energy consumption, air flow, or temperature distribution, as examples;

Create Data Schema/Ontology Based on Reduced Set of Parameters (as suggested by module 410); Brick compliant ontology or schema format may be used;

Construct Graph Database Using the Created Schema (as suggested by module 412); Collect Site Data and Place into Graph Database (as suggested by module 414, and the process flow illustrated and described with reference to FIG. 2); In some embodiments, the data may be collected (in whole or in part) in accordance with the process flow described with reference to FIG. 2 and the additional description herein; and Generate Inputs and/or Configuration Settings for Energy Model(s) Based on Site Data in Database (as suggested by module 415); Use Collected Data and/or Data Obtained from External Database to Generate Model Inputs, Constraints, or Configuration Parameters, as non-limiting examples.

Figure 5C:
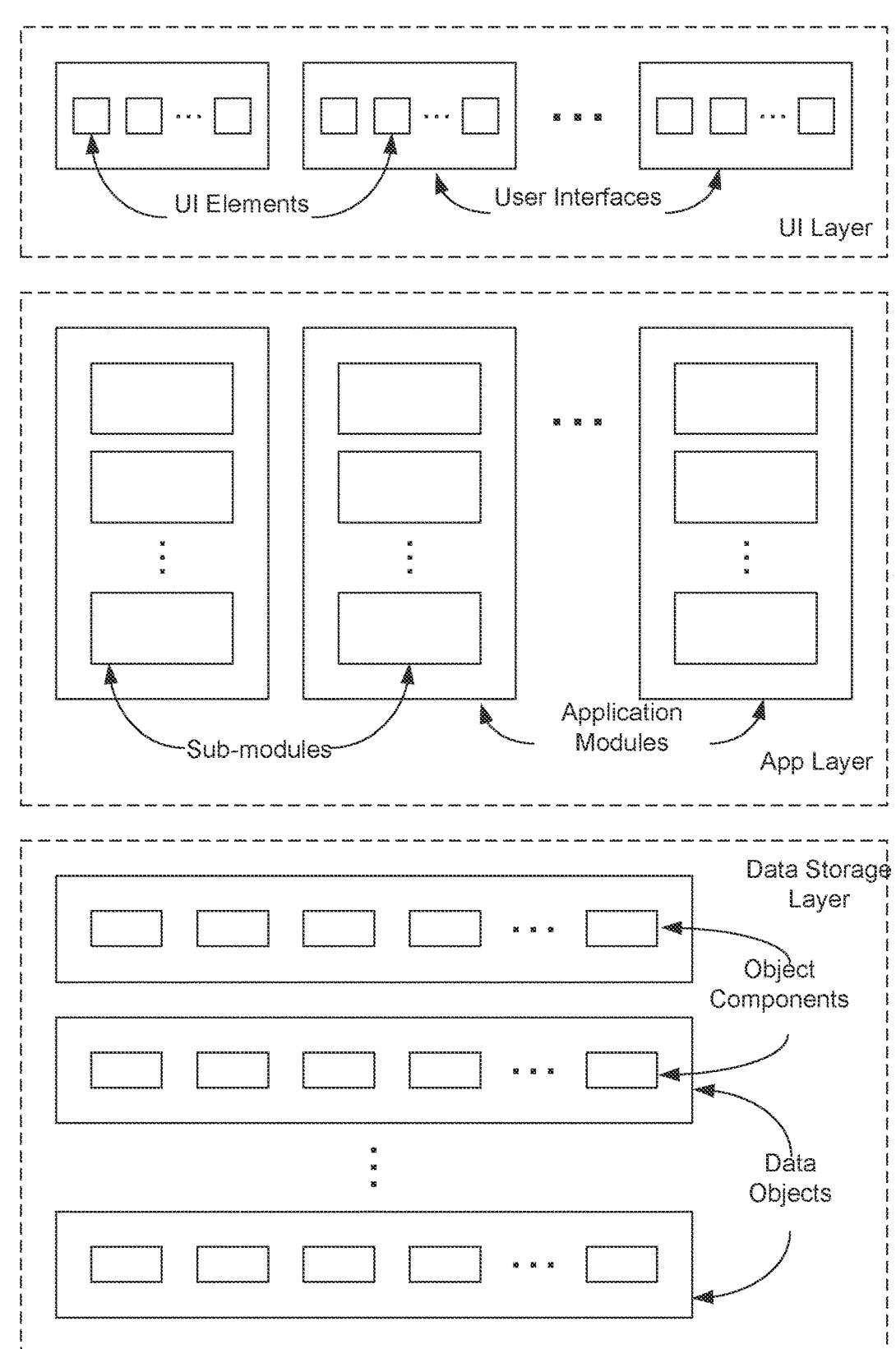

In some embodiments, the functionality and services provided by the system, apparatuses, and methods disclosed herein may be made available to multiple users by accessing an account maintained by a server or service platform. Such a server or service platform may be termed a form of Software-as-a-Service (SaaS). FIG. 5 is a diagram illustrating an architecture for a SaaS platform that may be used in implementing an embodiment of the systems, apparatuses, and methods disclosed herein. FIGS. 5(a)-5(c) illustrate further features of such an architecture.

In some embodiments, the system or services disclosed herein may be implemented as microservices, processes, workflows or functions performed in response to the submission of a set of input data. The microservices, processes, workflows or functions may be performed by a server, data processing element, platform, or system. In some embodiments, the data analysis and other services may be provided by a service platform located "in the cloud". In such embodiments, the platform may be accessible through APIs and SDKs. The functions, processes and capabilities disclosed herein and described with reference to one or more of the Figures may be provided as microservices within the platform. The interfaces to the microservices may be defined by REST and GraphQL endpoints. An administrative console may allow users or an administrator to securely access the underlying request and response data, manage accounts and access, and in some cases, modify the processing workflow or configuration.

Note that the architecture described in FIG. 5 (and FIGS. 5(a)-5(c)) may also be used to deliver other types of data processing services and provide access to other applications. For example, such an architecture may be used to provide one or more of the processes, functions, and operations disclosed herein. Although in some embodiments, a platform or system of the type illustrated in the Figure may be operated by a service provider to provide a specific set of services or applications, in other embodiments, the platform may be operated by a provider and a different entity may provide the applications or services for users through the platform.

In accordance with the advantages of an application service provider (ASP) hosted business service system, users of the services may comprise individuals, businesses, or organizations, as examples. A user may access the services using a suitable client, including but not limited to desktop computers, laptop computers, tablet computers, scanners, or smartphones. In general, a client device having access to the Internet may be used to provide data to the platform for processing and evaluation. Typically, a user interfaces with the service platform across the Internet or another suitable communications network or combination of networks. Examples of suitable client devices include desktop computers, smartphones, tablet computers, or laptop computers.

The platform or system shown in FIG. 5 may be hosted on a distributed computing system made up of at least one, but typically multiple, "servers." A server is a physical computer dedicated to providing data storage and an execution environment for one or more software applications or services to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server. A web server is most often a combination of hardware and the software that helps deliver content, commonly by hosting a website, to client web browsers that access the web server via the Internet.

The distributed computing service/platform (which may also be referred to as a multi-tenant data processing platform) may include multiple processing tiers, including a user interface tier, an application server tier, and a data storage tier. The user interface tier may maintain multiple user interfaces, including graphical user interfaces and/or web-based interfaces. The user interfaces may include a default user interface for the service to provide access to applications and data for a user of the service, as well as one or more user interfaces that have been specialized/customized in accordance with user specific requirements, and which may be accessed via one or more APIs.

The software architecture shown in FIG. 5 represents an example of an architecture which may be used to implement an embodiment of the disclosure. In general, an embodiment may be implemented using a set of software instructions that are designed to be executed by a suitably programmed processing element (such as a CPU, GPU, TPU, QPU, state machine, microprocessor, processor, controller, or other computing device). In a complex system such instructions are typically arranged into "modules" with each module performing a specific task, process, function, or operation. The entire set of modules may be controlled or coordinated in their operation by an operating system (OS) or other form of organizational platform.

In some embodiments, the example architecture in FIG. 5 may include one or more of the following services, elements, or processes:

User-interface (UI) (as suggested by process or service 502):

React website with a wide range of functionality primarily focused on collecting site-specific data and accurately describing locations via BRICK schema;

A user will login and authenticate using the Authentication service (504). Depending on the role of the user, different views and workflows are displayed/available. For example, a "Site Contact" can start the process of registering a site and uploading initial documentation and details. A "Data Collector" is authorized to submit and curate documents, as well as create and modify a location's building and infrastructure. A "Field Technician" can query building details and configure data collection from cloud and on-premises devices. A "Building Occupant" can see a subset of information, for example relevant thermostat and power savings information;

The UI presents various flows to indicate required information and help the user to provide it;

For data collection, the user is prompted to upload documents and describe equipment. The UI presents a form with required information. After the user has entered the information, the UI interacts with back-end APIs (506) to store the information;

For data visualization, the UI queries the backend API (508) to retrieve historical telemetry data that the UI can then visually graph;

Authentication/Authorization/Encryption (504):

Security layer for all API services;

Authentication—User and device accounts with OAuth2 token;

Authorization—Variety of user roles to allow/limit access to various APIs, parts of the UI;

Example Roles: Admin, Account Manager, Field Technician, Data Auditor, Facilities Manager, or Room Manager;

Encryption—Standard HTTPS/TLS encryption;

Metadata Services (506):

Provides RESTful API service with basic CRUD functionality for storing and retrieving data objects from the (CEL extended) BRICK ontology;

Uses SPARQL to translate requests for graph objects and attributes stored in Graph Database (600) in to/from standard data objects for API;

Provides backing API for site data collection;

Historian Services (508):

Service for collecting and retrieving telemetry/timescale data;

Appends new data to timescale database (600);

Provides RESTful API service for querying current and historical telemetry data;

Functionality for retrieving various time ranges, intervals, data interpolation/aggregation, as non-limiting examples;

Provides service for accumulating telemetry data and storing to customer-specific timescale databases for later retrieval;

Keeps snapshot of current and last values for all collected points;

Device Services (510):

Device specific services for supported thermostats and devices (cloud connected or on-premise) for data collection and/or control;

Cloud Connected Devices;

Service specific code for each third-party service. Handles device discovery/onboarding, secure credential/token storage, translates device-specific telemetry fetch and control operations to standard/common interface;

On-Premises devices;

Provides on-premises gateway (512) Linux device which maintains persistent connection to MQTT server in cloud (AWS IOT);

Field programmable/Field updatable;

Provides access to on-premises IP-based devices without having to expose devices to the internet;

Code for monitoring, querying, updating variety of BAS buses, e.g., BACnet, Modbus;

Has device specific code for discovering and onboarding supported devices (t-stats, energy meters, BACNet devices, MODBus, z-wave, Zigbee);

Code for periodically querying device state (and sending via MQTT), tracking user-overrides;

Code for receiving control updates and translating to device specific control calls (and interpreting responses);

Capable of locally storing telemetry and running Model Predictive Control (MPC) and supervisory control when disconnected from internet/above services;

Data Storage (514):

Graph Database;

Graph Database (e.g., AWS Neptune) using an extended version of the BRICK ontology to store details about site and building equipment variables, while also abstracting their properties and relationships for use in multiple building energy management services and applications;

Allows web of connections to handle the fluid nature of describing a building;

Provides graph models to represent relationships in data and to efficiently perform "traversal queries" that reveal patterns, paths, points of failure, and other ways that building and equipment variables interact to impact energy use and building occupant comfort;

Includes nodes or links to building units, equipment, and points associated with accessible devices and their available data;

Relational Database(s);

Used for storing data that does not easily conform or take advantage of a graph database, such as schedules, documents;

Timescale Database(s);

Timescale database for efficiently storing time-based telemetry.

Note that although FIGS. 5, and 5(*a*)-5(*c*) illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide one or more of the processes, functions, and operations disclosed herein. Although in some embodiments, a platform or system of the type illustrated in the Figures may be operated by a service provider to provide a specific set of services or applications, in other embodiments, the platform may be operated by a provider and a different entity may provide the applications or services for users through the platform.

FIG. 5(*a*) is a diagram illustrating a system in which an embodiment may be implemented or through which an embodiment of the services disclosed herein may be accessed. In accordance with the advantages of an application service provider (ASP) hosted business service system (such as a multi-tenant data processing platform), users of the services may comprise individuals, businesses, or organizations, as examples. A user may access the services using a suitable client, including but not limited to desktop computers, laptop computers, tablet computers, scanners, or smartphones. In general, a client device having access to the Internet may be used to provide data to the platform for processing and evaluation. A user interfaces with the service platform across the Internet or another suitable communications network or combination of networks. Examples of suitable client devices include desktop computers, smartphones, tablet computers, or laptop computers.

The system of FIG. 5(*a*) which may be hosted by a third party, may include a set of data analysis and other services to assist in collecting data for and configuring an energy management model or system, and a web interface server, coupled as shown. Either or both the data analysis and other services and the web interface server may be implemented on one or more different hardware systems and components, even though represented as singular units in FIG. 5(*a*).

The provided services may include one or more functions or operations for the collection, processing, and storage of data in accordance with a schema or ontology and the use of that stored data as inputs to one or more models or systems used to monitor and manage the energy consumption of a structure or structures.

As non-limiting examples, in some embodiments, the set of functions, operations or services made available through the platform or system may include:

Account Management services, such as:

a process or service to authenticate a user wishing to utilize the data collection, data processing, or model configuration services available through access to the SaaS platform;

a process or service to generate a container or instantiation of the data analysis and related services for that user;

Obtain Set of Possible Structure or Energy Management System Parameters and Perform Sensitivity Analysis services, such as:

May be obtained from information regarding a specific structure (collected on-site, obtained from a publicly available database, or obtained from plans or construction documents), or information regarding a class of structures (such as building requirements, public records or databases, or building codes, as examples);

Perform Sensitivity Analysis to Reduce Set of Possible Structure or System Parameters;

Evaluate impact of removal of one or more structure parameters to predictive accuracy of one or more models of energy consumption, air flow, or temperature distribution, as examples;

Create Data Schema and Associated Graph Database services, such as:

Create Data Schema/Ontology Based on Reduced Set of Parameters;

Brick compliant ontology or schema format may be used; Construct Graph Database Using the Created Schema;

Collect Site Data and Place into Graph Database services, such as;

In some embodiments, the data may be collected (in whole or in part) in accordance with the process flows disclosed and/or described herein; and Generate Inputs and/or Configuration Settings for Energy Model(s) Based on Site Data in Database;

Use Collected Data and/or Data Obtained from External Database to Generate Model Inputs, Constraints, or Configuration Parameters, as non-limiting examples; and Administrative services, such as:

a process or services to provide platform and services administration—for example, to enable the provider of the services and/or the platform to administer and configure the processes and services provided to users.

FIG. 5(b) is a diagram illustrating elements or components of an example operating environment in which an embodiment may be implemented. As shown, a variety of clients incorporating and/or incorporated into a variety of computing devices may communicate with a multi-tenant service platform through one or more networks. For example, a client may incorporate and/or be incorporated into a client application (e.g., software) implemented at least in part by one or more of the computing devices. Examples of suitable computing devices include personal computers, server computers, desktop computers, laptop computers, notebook computers, tablet computers or personal digital assistants (PDAs), smart phones, cell phones, and consumer electronic devices incorporating one or more computing device components (such as one or more electronic processors, microprocessors, central processing units (CPU), TPUs, GPUs, QPUs, state machines, or controllers). Examples of suitable networks include networks utilizing wired and/or wireless communication technologies and networks operating in accordance with any suitable networking and/or communication protocol (e.g., the Internet).

The distributed computing service/platform (which may also be referred to as a multi-tenant data processing platform) may include multiple processing tiers, including a user interface tier, an application server tier, and a data storage tier. The user interface tier may maintain multiple user interfaces, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as examples. Each application server or processing element shown in the figure may be implemented with a set of computers and/or components including computer servers and processors, and may perform various functions, methods, processes, or operations as determined by the execution of a software application or set of instructions. The data storage tier may include one or more datastores, which may include a Service Datastore and one or more Tenant Datastores 626. Datastores may be implemented with a suitable data storage technology, including structured query language (SQL) based relational database management systems (RDBMS).

The illustrated Service Platform may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by the execution of one or more modules of software code/instructions by one or more servers that are part of the platform's Application Server Tier. As noted, the platform system shown in FIG. 5(b) may be hosted on a distributed computing system made up of at least one, but typically multiple, "servers."

FIG. 5(c) is a diagram illustrating additional details of the elements or components of the multi-tenant distributed computing service platform of FIG. 5(b), with which an embodiment may be implemented. The software architecture shown in FIG. 5(c) represents an example of an architecture which may be used to implement an embodiment. In general, an embodiment may be implemented using a set of software instructions that are designed to be executed by a suitably programmed processing element (such as a CPU, GPU, TPU, QPU, state machine, microprocessor, processor, controller, or computing device). In a complex system such instructions are typically arranged into "modules" with each module performing a specific task, process, function, or operation. The entire set of modules may be controlled or coordinated in their operation by an operating system (OS) or other form of organizational platform.

The example architecture of FIG. 5(c) includes a user interface (UI) layer or tier having one or more user interfaces. Examples of such user interfaces include graphical user interfaces and application programming interfaces (APIs). Each user interface may include one or more interface elements. Users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer may include one or more application modules, each having one or more sub-modules. Each application module or sub-module may correspond to a function, method, process, or operation that is implemented by the module or sub-module (e.g., a function or process related to providing data processing and services to a user of the platform). Such function, method, process, or operation may include those used to implement one or more aspects of the disclosed system and methods, such as for one or more of the processes or functions described with reference to the Figures:

Obtain Set of Possible Structure or Energy Management System Parameters;

May be obtained from information regarding a specific structure (collected on-site, obtained from a publicly available database, or obtained from plans or construction documents), or information regarding a class of structures (such as building requirements, public records or databases, or building codes, as examples);

Perform Sensitivity Analysis to Reduce Set of Possible Structure or System Parameters;

Evaluate impact of removal of one or more structure parameters to predictive accuracy of one or more models of energy consumption, air flow, or temperature distribution, as examples;

Create Data Schema/Ontology Based on Reduced Set of Parameters;

Brick compliant ontology or schema format may be used;

Construct Graph Database Using the Created Schema;

Collect Site Data and Place into Graph Database;

In some embodiments, the data may be collected (in whole or in part) in accordance with the process flow described with reference to the figures and the additional description herein; and Generate Inputs and/or Configuration Settings for Energy Model(s) Based on Site Data in Database;

Use Collected Data and/or Data Obtained from External Database to Generate Model Inputs, Constraints, or Configuration Parameters, as non-limiting examples.

The application modules and/or sub-modules may include any suitable computer-executable code or set of instructions (e.g., as would be executed by a suitably programmed processor, microprocessor, GPU, TPU, QPU, state machine, or CPU, as examples), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

The data storage layer may include one or more data objects each having one or more data object components, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each datastore in the data storage layer may include each data object. Alternatively, different datastores may include different sets of data objects. Such sets may be disjoint or overlapping.

Note that the example computing environments depicted in FIGS. 5, and 5(a)-5(c) are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, or data review, and which have user interfaces or user interface components that can be configured to present an interface to a user.

Although further examples below may reference the example computing environment depicted in FIGS. 5, and 5(a)-5(c), it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

The disclosure includes one or more of the following clauses or embodiments:

1. A method of data collection for use by an energy control model for a structure, comprising:

identifying an initial set of parameters required to generate an energy control model for the structure;

reducing the initial set of parameters based on a sensitivity analysis to produce a reduced set of parameters;

selecting a site Data Collection Workflow based on the reduced set of parameters;

collecting site data at the structure in accordance with the site Data Collection Workflow; and storing the collected site data in a database for use by the energy control model for the structure.

2. The method of clause 1, wherein collection of the site data further comprises one or more of the stages of:

defining required values/variables for the initial set of parameters;

assessing site data collection requirements for collecting values/variables for the initial set of parameters;

assembling the site data collection requirements for collecting values/variables into data collection workflows;

using a sensitivity analysis to produce a reduced set of parameters; and generating a simplified data collection workflow to gather values/variables for the reduced set of parameters.

3. The method of clause 1, wherein storing the site data collected in a database for use by the energy control model further comprises one or more of the stages of:

applying an ontology to the initial and reduced set of parameters;

creating a data schema based on the ontology;

constructing a graph database using the created data schema; and placing collected site data into one or more of the schema categories in the ontology.

4. The method of clause 1, further comprising obtaining some of the reduced set of parameters from customer input prior to selecting the site Data Collection Workflow.

5. The method of clause 1, wherein the sensitivity analysis comprises consideration of one or more of energy, thermal comfort, time, and cost to collect.

6. The method of clause 1, wherein the energy control model comprises a thermodynamic model providing occupant comfort.

7. The method of clause 1, wherein the data schema is BRICK compliant.

8. A system, comprising:

one or more electronic processors configured to execute a set of computer-executable instructions; and one or more non-transitory electronic data storage media containing the set of computer-executable instructions, wherein when executed, the instructions cause the one or more electronic processors to identify an initial set of structure parameters;

reduce the initial set of parameters based on a sensitivity analysis;

based on the reduced set of parameters, develop an ontology for the parameters;

create a data schema based on the ontology;

construct a graph database using the created data schema;

select a simplified site Data Collection Workflow based on the reduced set of parameters and user inputs;

collect site data and place at least a portion of the site data into an appropriate element of the graph database, wherein the site data includes data for the structure; and generate inputs and/or configuration settings for an energy control model for the structure based on the site data in the database.

9. The system of clause 8, wherein collection of the site data further comprises one or more of:

defining required values/variables for the initial set of parameters;

assessing site data collection requirements for collecting values/variables for the initial set of parameters;

assembling the site data collection requirements for collecting values/variables into data collection workflows;

using a sensitivity analysis to produce a reduced set of parameters; and generating a simplified data collection workflow to gather values/variables for the reduced set of parameters.

10. The system of clause 8, wherein the sensitivity analysis comprises consideration of one or more of energy, thermal comfort, time, and cost to collect.

11. The system of clause 8, wherein the energy control model comprises a thermodynamic model providing occupant comfort.

12. The system of clause 8, wherein the data schema is BRICK compliant.

13. The system of clause 8, further comprising one or more sensors arranged to collect data regarding conditions in the structure, wherein the data collected by the sensors is provided to the energy control model.

14. The system of clause 13, wherein the sensors comprise one or more of a sensor to measure temperature, a sensor to measure humidity, a sensor to measure $CO_2$, and a sensor to measure air flow.

15. One or more non-transitory computer-readable media comprising a set of computer-executable instructions that when executed by one or more programmed electronic processors, cause the processors to:

identify an initial set of structure parameters;

reduce the initial set of parameters based on a sensitivity analysis;

based on the reduced set of parameters, develop an ontology for the parameters;

create a data schema based on the ontology;

construct a graph database using the created data schema;

select a simplified site Data Collection Workflow based on the reduced set of parameters and user inputs;

collect site data and place at least a portion of the site data into an appropriate element of the graph database, wherein the site data includes data for the structure; and generate inputs and/or configuration settings for an energy control model for the structure based on the site data in the database.

16. The one or more non-transitory computer-readable media of clause 15, wherein the sensitivity analysis comprises consideration of one or more of energy, thermal comfort, time, and cost to collect.

17. The one or more non-transitory computer-readable media of clause 15, wherein the energy control model comprises a thermodynamic model providing occupant comfort.

18. The one or more non-transitory computer-readable media of clause 15, wherein the data schema is BRICK compliant.

19. The one or more non-transitory computer-readable media of clause 15, wherein the computer-executable instructions further cause the processors to receive data from one or more sensors arranged to collect data regarding conditions in the structure, wherein the data collected by the sensors is provided to the energy control model.

20. The one or more non-transitory computer-readable media of clause 19, wherein the sensors comprise one or more of a sensor to measure temperature, a sensor to measure humidity, a sensor to measure $CO_2$, and a sensor to measure air flow.

21. The method of clause 1, further comprising providing one or more outputs generated by the energy control model to an actuator to control a heating or cooling function of the structure.

22. The system of clause 8, further comprising a data connection between the energy control model and an actuator to control a heating or cooling function of the structure, wherein one or more outputs generated by the energy control model are provided to the actuator.

23. The one or more non-transitory computer-readable media of clause 15, wherein the computer-executable instructions further cause the processors to provide one or more outputs generated by the energy control model to an actuator to control a heating or cooling function of the structure.

Embodiments as disclosed and/or described herein above can be implemented in the form of control logic using computer software in a modular or integrated manner. Based on the disclosure and teachings provided herein, a person of ordinary skill in the art will know and appreciate other ways and/or methods to implement one or more embodiments using hardware and a combination of hardware and software.

In some embodiments, certain of the methods, models or functions disclosed and/or described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions over a network (e.g., the Internet). The set of instructions or an application may be utilized by an end-user through access to a SaaS platform or a service provided through such a platform.

Any of the software components, processes or functions disclosed and/or described herein may be implemented as software code to be executed by a processor using a suitable computer language such as Python, Java, JavaScript, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is a medium suitable for the storage of data or an instruction set aside from a transitory waveform. Such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as a display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar device or form of memory based on similar technologies. Such computer-readable storage media allow the processing element or processor to access computer-executable process steps or application programs, stored on removable and non-removable memory media, to off-load data from a device or to upload data to a device. As mentioned, with regards to the embodiments disclosed and/or described herein, a non-transitory computer-readable medium may include almost any structure, technology, or method apart from a transitory waveform or similar medium.

One or more embodiments of the disclosure are described herein with reference to block diagrams of systems, and/or to flowcharts or flow diagrams of functions, operations, processes, or methods. One or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not need to be performed in the order presented or may not need to be performed at all.

The computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods disclosed and/or described herein. The computer-executable program instructions may be stored in (or on) a computer-readable memory that can direct a computer or other programmable data processing apparatus to function in a specific manner, such that the instructions stored in (or on) the computer-readable memory produce an article of manufacture including instruction means that implement one or more of the functions, operations, processes, or methods disclosed and/or described herein.

While embodiments of the disclosure have been described in connection with what is presently considered to be the most practical implementation, the disclosed and/or described approach is not limited to those embodiments. Instead, the disclosed and/or described embodiments are intended to cover various modifications and equivalent arrangements included within the scope of the appended claims. Although specific terms are employed herein, they are used in a generic and descriptive sense and not for purposes of limitation.

This written description includes one or more examples describing implementations of the disclosed approach to enable a person skilled in the art to practice one or more embodiments of the disclosure, including making and using a device or system and performing an incorporated method. The patentable scope of embodiments of the disclosure is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar references in the specification and in the claims are to be construed to cover both the singular and the plural, unless otherwise indicated herein or clearly contradicted by context. The terms "having," "including," "containing" and similar references in the specification and in the claims are to be construed as open-ended terms (e.g., meaning "including, but not limited to,") unless otherwise noted.

Recitation of ranges of values herein are intended to serve as a shorthand method of referring individually to each separate value inclusively falling within the range, unless otherwise indicated herein, and each separate value is incorporated into the specification as if it were individually recited herein. Methods or processes disclosed and/or described herein may be performed in any suitable order unless otherwise indicated herein or clearly contradicted by context. The use of examples, or exemplary language (e.g., "such as") herein is intended to illuminate embodiments of the disclosure and does not pose a limitation to the scope of the claims unless otherwise indicated. No language in the specification should be construed as indicating any non-claimed element as essential to each embodiment of the disclosure.

As used herein (i.e., the claims, figures, and specification), the term "or" is used inclusively to refer to items in the alternative and in combination.

Different arrangements of the components or operations illustrated in the drawings or disclosed and/or described herein, as well as components and steps not shown or explicitly described may be possible. Similarly, some features and sub-combinations may be useful and may be implemented without reference to other features and sub-combinations. Embodiments of the disclosure are described for illustrative and not for restrictive purposes, and alternative embodiments may be apparent. Accordingly, the disclosure is not limited to the embodiments described and/or illustrated in the drawings, and other embodiments and modifications may be made without departing from the scope of the claims.

What is claimed is:

1. A method of data collection for use by an energy control model for a structure, comprising:
   identifying an initial set of parameters required to generate an energy control model for the structure;
   reducing the initial set of parameters based on a sensitivity analysis to produce a reduced set of parameters;
   selecting a site Data Collection Workflow based on the reduced set of parameters;
   collecting site data at the structure in accordance with the site Data Collection Workflow;
   storing the collected site data in a database for use by the energy control model for the structure; and
   providing one or more outputs generated by the energy control model to an actuator to control a heating or cooling function of the structure.

2. The method of claim 1, wherein collection of the site data further comprises one or more of the stages of:
   defining required values/variables for the initial set of parameters;
   assessing site data collection requirements for collecting values/variables for the initial set of parameters;
   assembling the site data collection requirements for collecting values/variables into data collection workflows;
   using a sensitivity analysis to produce a reduced set of parameters; and
   generating a simplified data collection workflow to gather values/variables for the reduced set of parameters.

3. The method of claim 1, wherein storing the site data collected in a database for use by the energy control model further comprises one or more of the stages of:

applying an ontology to the initial and reduced set of parameters;
creating a data schema based on the ontology;
constructing a graph database using the created data schema; and
placing collected site data into one or more of the schema categories in the ontology.

4. The method of claim 1, further comprising obtaining some of the reduced set of parameters from customer input prior to selecting the site Data Collection Workflow.

5. The method of claim 1, wherein the sensitivity analysis comprises consideration of one or more of energy, thermal comfort, time, and cost to collect.

6. The method of claim 1, wherein the energy control model comprises a thermodynamic model providing occupant comfort.

7. The method of claim 1, wherein the data schema is BRICK compliant.

8. A system, comprising:
   one or more electronic processors configured to execute a set of computer-executable instructions; and
   one or more non-transitory electronic data storage media containing the set of computer-executable instructions, wherein when executed, the instructions cause the one or more electronic processors to
   identify an initial set of structure parameters;
   reduce the initial set of parameters based on a sensitivity analysis;
   based on the reduced set of parameters, develop an ontology for the parameters;
   create a data schema based on the ontology;
   construct a graph database using the created data schema;
   select a simplified site Data Collection Workflow based on the reduced set of parameters and user inputs;
   collect site data and place at least a portion of the site data into an appropriate
   element of the graph database, wherein the site data includes data for the structure; and
   generate inputs and/or configuration settings for an energy control model for the structure based on the site data in the database; and
   a data connection between the energy control model and an actuator to control a heating or cooling function of the structure, wherein one or more outputs generated by the energy control model are provided to the actuator.

9. The system of claim 8, wherein collection of the site data further comprises one or more of:
   defining required values/variables for the initial set of parameters;
   assessing site data collection requirements for collecting values/variables for the initial set of parameters;
   assembling the site data collection requirements for collecting values/variables into data collection workflows;
   using a sensitivity analysis to produce a reduced set of parameters; and
   generating a simplified data collection workflow to gather values/variables for the reduced set of parameters.

10. The system of claim 8, wherein the sensitivity analysis comprises consideration of one or more of energy, thermal comfort, time, and cost to collect.

11. The system of claim 8, wherein the energy control model comprises a thermodynamic model providing occupant comfort.

12. The system of claim 8, wherein the data schema is BRICK compliant.

13. The system of claim 8, further comprising one or more sensors arranged to collect data regarding conditions in the structure, wherein the data collected by the sensors is provided to the energy control model.

14. The system of claim 13, wherein the sensors comprise one or more of a sensor to measure temperature, a sensor to measure humidity, a sensor to measure $CO_2$, and a sensor to measure air flow.

15. One or more non-transitory computer-readable media comprising a set of computer-executable instructions that when executed by one or more programmed electronic processors, cause the processors to:

identify an initial set of structure parameters;

reduce the initial set of parameters based on a sensitivity analysis;

based on the reduced set of parameters, develop an ontology for the parameters;

create a data schema based on the ontology;

construct a graph database using the created data schema;

select a simplified site Data Collection Workflow based on the reduced set of parameters and user inputs;

collect site data and place at least a portion of the site data into an appropriate element of the graph database, wherein the site data includes data for the structure;

generate inputs and/or configuration settings for an energy control model for the structure based on the site data in the database; and provide one or more outputs generated by the energy control model to an actuator to control a heating or cooling function of the structure.

16. The one or more non-transitory computer-readable media of claim 15, wherein the sensitivity analysis comprises consideration of one or more of energy, thermal comfort, time, and cost to collect.

17. The one or more non-transitory computer-readable media of claim 15, wherein the energy control model comprises a thermodynamic model providing occupant comfort.

18. The one or more non-transitory computer-readable media of claim 15, wherein the data schema is BRICK compliant.

19. The one or more non-transitory computer-readable media of claim 15, wherein the computer-executable instructions further cause the processors to receive data from one or more sensors arranged to collect data regarding conditions in the structure, wherein the data collected by the sensors is provided to the energy control model.

20. The one or more non-transitory computer-readable media of claim 19, wherein the sensors comprise one or more of a sensor to measure temperature, a sensor to measure humidity, a sensor to measure $CO_2$, and a sensor to measure air flow.

* * * * *